US00RE48047E

(19) United States
(12) Reissued Patent
Sliski et al.

(10) Patent Number: US RE48,047 E
(45) Date of Reissued Patent: Jun. 9, 2020

(54) PROGRAMMABLE RADIO FREQUENCY WAVEFORM GENERATOR FOR A SYNCHROCYCLOTRON

(71) Applicant: Mevion Medical Systems, Inc., Littleton, MA (US)

(72) Inventors: Alan Sliski, Lincoln, MA (US); Kenneth Gall, Somerville, MA (US)

(73) Assignee: Mevion Medical Systems, Inc., Littleton, MA (US)

(21) Appl. No.: 15/429,078

(22) Filed: Feb. 9, 2017

Related U.S. Patent Documents

Reissue of:
(64) Patent No.: 8,952,634
Issued: Feb. 10, 2015
Appl. No.: 12/603,934
Filed: Oct. 22, 2009

U.S. Applications:
(63) Continuation of application No. 12/011,466, filed on Jan. 25, 2008, now Pat. No. 7,626,347, which is a
(Continued)

(51) Int. Cl.
*H05H 15/00* (2006.01)
*H05H 13/02* (2006.01)

(52) U.S. Cl.
CPC ..... *H05H 13/02* (2013.01)

(58) Field of Classification Search
USPC ..... 315/503
See application file for complete search history.

(56) References Cited

U.S. PATENT DOCUMENTS 2,280,606 A 4/1942 Van et al.
2,492,324 A 12/1949 Salisbury
(Continued)

FOREIGN PATENT DOCUMENTS

AU 2005267078 A1 2/2006
AU 2005267078 7/2009
(Continued)

OTHER PUBLICATIONS

US 8,581,524 B2, 11/2013, O'Neil et al. (withdrawn)
(Continued)

*Primary Examiner* — Angela M Lie
(74) *Attorney, Agent, or Firm* — Burns & Levinson LLP.

(57) ABSTRACT

A synchrocyclotron [comprises] *includes* a resonant circuit that includes electrodes having a gap therebetween across the magnetic field. An oscillating voltage input, having a variable amplitude and frequency determined by a programmable digital waveform generator generates an oscillating electric field across the gap. The synchrocyclotron can include a variable capacitor in circuit with the electrodes to vary the resonant frequency. The synchrocyclotron can further include an injection electrode and an extraction electrode having voltages controlled by the programmable digital waveform generator. The synchrocyclotron can further include a beam monitor. The synchrocyclotron can detect resonant conditions in the resonant circuit by measuring the voltage [and or] *and/or* current in the resonant circuit, driven by the input voltage, and adjust the capacitance of the variable capacitor or the frequency of the input voltage to maintain the resonant conditions. The programmable waveform generator can adjust at least one of the oscillating voltage input, the voltage on the injection electrode and the voltage on the extraction electrode according to beam intensity and in response to changes in resonant conditions.

109 Claims, 10 Drawing Sheets

Related U.S. Application Data continuation of application No. 11/371,622, filed on Mar. 9, 2006, now Pat. No. 7,402,963, which is a continuation of application No. 11/187,633, filed on Jul. 21, 2005, now abandoned.

(60) Provisional application No. 60/590,089, filed on Jul. 21, 2004.

(56) References Cited

U.S. PATENT DOCUMENTS 2,615,129 A * 10/1952 McMillan ..... H05H 13/02 313/62
2,616,042 A * 10/1952 Weeks ..... 315/502
2,659,000 A * 11/1953 Salisbury ..... 315/502
2,701,304 A 12/1955 Dickinson
2,789,222 A * 4/1957 Marvin et al. ..... 315/502
3,175,131 A 3/1965 Burleigh et al.
3,432,721 A 3/1969 Naydan et al.
3,582,650 A 6/1971 Avery
3,679,899 A 7/1972 Dimeff
3,689,847 A 9/1972 Verster
3,757,118 A 9/1973 Hodge et al.
3,868,522 A 2/1975 Bigham et al.
3,886,367 A 5/1975 Castle
3,925,676 A 12/1975 Bigham et al.
2,958,327 A 5/1976 Marancik et al.
3,955,089 A 5/1976 McIntyre et al.
3,958,327 A 5/1976 Marancik et al.
3,992,625 A 11/1976 Schmidt et al.
4,038,622 A 7/1977 Purcell
4,047,068 A 9/1977 Ress et al.
4,112,306 A 9/1978 Nunan
4,129,784 A 12/1978 Tschunt et al.
4,139,777 A 2/1979 Rautenbach
4,197,510 A 4/1980 Szu
4,220,866 A 9/1980 Symmons et al.
4,230,129 A 10/1980 LeVeen
4,256,966 A 3/1981 Heinz
4,293,772 A 10/1981 Stieber
4,336,505 A 6/1982 Meyer
4,342,060 A 7/1982 Gibson
4,345,210 A 8/1982 Tran
4,353,033 A 10/1982 Karasawa
4,425,506 A 1/1984 Brown et al.
4,490,616 A 12/1984 Cipollina et al.
4,507,614 A 3/1985 Prono et al.
4,507,616 A 3/1985 Blosser et al.
4,589,126 A 5/1986 Augustsson et al.
4,598,208 A 7/1986 Brunelli et al.
4,628,523 A 12/1986 Heflin
4,633,125 A 12/1986 Blosser et al.
4,641,057 A * 2/1987 Blosser et al. ..... 313/62
4,641,104 A 2/1987 Blosser et al.
4,651,007 A 3/1987 Perusek et al.
4,680,565 A 7/1987 Jahnke
4,705,955 A 11/1987 Mileikowsky
4,710,722 A 12/1987 Jahnke
4,726,046 A 2/1988 Nunan
4,734,653 A 3/1988 Jahnke
4,736,173 A 4/1988 Basil, Jr. et al.
4,737,727 A 4/1988 Yamada et al.
4,739,173 A 4/1988 Blosser et al.
4,745,367 A * 5/1988 Dustmann et al. ..... 315/503
4,754,147 A 6/1988 Maughan et al.
4,763,483 A 8/1988 Olsen
4,767,930 A 8/1988 Stieber et al.
4,769,623 A 9/1988 Marsing et al.
4,771,208 A 9/1988 Jongen et al.
4,783,634 A 11/1988 Yamamoto et al.
4,808,941 A 2/1989 Marsing
4,812,658 A 3/1989 Koehler
4,843,333 A 6/1989 Marsing et al.
4,845,371 A 7/1989 Stieber
4,865,284 A 9/1989 Gosis et al.
4,868,843 A 9/1989 Nunan
4,868,844 A 9/1989 Nunan
4,870,287 A 9/1989 Cole et al.
4,880,985 A 11/1989 Jones
4,894,541 A 1/1990 Ono
4,896,206 A 1/1990 Denham
4,902,993 A 2/1990 Krevet
4,904,949 A 2/1990 Wilson
4,905,267 A 2/1990 Miller et al.
4,917,344 A 4/1990 Prechter et al.
4,943,781 A 7/1990 Wilson et al.
4,945,478 A 7/1990 Merickel et al.
4,968,915 A 11/1990 Wilson et al.
4,987,309 A 1/1991 Klasen et al.
4,992,744 A 2/1991 Fujita et al.
4,996,496 A 2/1991 Kitamura et al.
5,006,759 A 4/1991 Krispel
5,010,562 A 4/1991 Hernandez et al.
5,012,111 A 4/1991 Ueda
5,017,789 A 5/1991 Young et al.
5,017,882 A 5/1991 Finlan
5,036,290 A 7/1991 Sonobe et al.
5,039,057 A 8/1991 Prechter et al.
5,039,867 A 8/1991 Nishihara et al.
5,046,078 A 9/1991 Hernandez et al.
5,072,123 A 12/1991 Johnsen
5,111,042 A 5/1992 Sullivan et al.
5,111,173 A 5/1992 Matsuda et al.
5,117,194 A 5/1992 Nakanishi et al.
5,117,212 A 5/1992 Yamamoto et al.
5,117,829 A 6/1992 Miller et al.
5,148,032 A 9/1992 Hernandez
5,166,531 A 11/1992 Huntzinger
5,189,687 A 2/1993 Bova et al.
5,191,706 A 3/1993 Cosden
5,240,218 A 8/1993 Dye
5,260,579 A 11/1993 Yasuda et al.
5,260,581 A 11/1993 Lesyna et al.
5,278,533 A 1/1994 Kawaguchi
5,285,166 A 2/1994 Hiramoto et al.
5,297,037 A 3/1994 Ifuku
5,317,164 A 5/1994 Kurokawa
5,336,891 A 8/1994 Crewe
5,341,104 A 8/1994 Anton et al.
5,349,198 A 9/1994 Takanaka
5,365,742 A 11/1994 Boffito et al.
5,374,913 A 12/1994 Pissantezky et al.
5,382,914 A 1/1995 Hamm et al.
5,401,973 A 3/1995 McKeown et al.
5,405,235 A 4/1995 Lebre et al.
5,434,420 A 7/1995 McKeown et al.
5,440,133 A 8/1995 Moyers et al.
5,451,794 A 9/1995 McKeown et al.
5,461,773 A 10/1995 Kawaguchi
5,463,291 A 10/1995 Carroll et al.
5,464,411 A 11/1995 Schulte et al.
5,492,922 A 2/1996 Palkowitz
5,511,549 A 4/1996 Legg et al.
5,521,469 A * 5/1996 Laisne ..... 315/502
5,538,942 A 7/1996 Koyama et al.
5,549,616 A 8/1996 Schulte et al.
5,561,697 A 10/1996 Takafuji et al.
5,585,642 A 12/1996 Britton et al.
5,633,747 A 5/1997 Nikoonahad
5,635,721 A 6/1997 Bardi et al.
5,668,371 A 9/1997 Deasy et al.
5,672,878 A 9/1997 Yao
5,691,679 A 11/1997 Ackermann et al.
5,726,448 A 3/1998 Smith et al.
5,727,554 A 3/1998 Kalend et al.
5,730,745 A 3/1998 Schulte et al.
5,744,919 A * 4/1998 Mishin ..... H05H 9/00 315/500
5,751,781 A 5/1998 Brown et al.
5,778,047 A 7/1998 Mansfield et al.
5,783,914 A 7/1998 Hiramoto et al.
5,784,431 A 7/1998 Kalend et al.
5,797,924 A 8/1998 Schulte et al.
5,811,944 A 9/1998 Sampayan et al.

(56) References Cited

U.S. PATENT DOCUMENTS 5,818,058 A 10/1998 Nakanishi et al.
5,821,705 A 10/1998 Caporaso et al.
5,825,845 A 10/1998 Blair et al.
5,841,237 A 11/1998 Alton
5,846,043 A 12/1998 Spath
5,851,182 A 12/1998 Sahadevan
5,866,912 A 2/1999 Slater et al.
5,874,811 A * 2/1999 Finlan et al. ..... 315/502
5,895,926 A 4/1999 Britton et al.
5,917,293 A * 6/1999 Saito et al. ..... 315/505
5,920,601 A 7/1999 Nigg et al.
5,929,458 A 7/1999 Nemezawa et al.
5,963,615 A 10/1999 Egley et al.
5,993,373 A 11/1999 Nonaka et al.
6,008,499 A 12/1999 Hiramoto et al.
6,034,377 A 3/2000 Pu
6,057,655 A * 5/2000 Jongen ..... 315/502
6,061,426 A 5/2000 Linders et al.
6,064,807 A 5/2000 Arai et al.
6,066,851 A 5/2000 Madono et al.
6,080,992 A 6/2000 Nonaka et al.
6,087,670 A 7/2000 Hiramoto et al.
6,094,760 A 8/2000 Nonaka et al.
6,118,848 A 9/2000 Reiffel
6,140,021 A 10/2000 Nakasuji et al.
6,144,875 A 11/2000 Schweikard et al.
6,158,708 A 12/2000 Egley et al.
6,207,952 B1 3/2001 Kan et al.
6,219,403 B1 4/2001 Nishihara
6,222,905 B1 4/2001 Yoda et al.
6,241,671 B1 6/2001 Ritter et al.
6,246,066 B1 6/2001 Yuehu
6,256,591 B1 7/2001 Yoda et al.
6,265,837 B1 7/2001 Akiyama et al.
6,268,610 B1 7/2001 Pu
6,278,239 B1 8/2001 Caporaso et al.
6,279,579 B1 8/2001 Riaziat et al.
6,307,914 B1 10/2001 Kunieda et al.
6,316,776 B1 11/2001 Hiramoto et al.
6,366,021 B1 4/2002 Meddaugh et al.
6,369,585 B2 4/2002 Yao
6,380,545 B1 4/2002 Yan
6,407,505 B1 6/2002 Bertsche
6,414,614 B1 * 7/2002 Melanson ..... H03F 1/32 330/10
6,417,634 B1 7/2002 Bergstrom
6,433,336 B1 8/2002 Jongen et al.
6,433,349 B2 8/2002 Akiyama et al.
6,433,494 B1 * 8/2002 Kulish et al. ..... 315/500
6,441,569 B1 * 8/2002 Janzow ..... 315/502
6,443,349 B1 9/2002 Van Der Burg
6,465,957 B1 10/2002 Whitham et al.
6,472,834 B2 10/2002 Hiramoto et al.
6,476,403 B1 11/2002 Dolinskii et al.
6,492,922 B1 12/2002 New
6,493,424 B2 12/2002 Whitham
6,498,444 B1 12/2002 Hanna et al.
6,501,981 B1 12/2002 Schweikard et al.
6,519,316 B1 2/2003 Collins
6,576,916 B2 * 6/2003 Smith et al. ..... 250/493.1
6,593,696 B2 7/2003 Ding et al.
6,594,336 B2 7/2003 Nishizawa et al.
6,600,164 B1 7/2003 Badura et al.
6,617,598 B1 9/2003 Matsuda
6,621,889 B1 9/2003 Mostafavi
6,627,875 B2 * 9/2003 Afeyan ..... G01N 30/72 250/282
6,639,234 B1 10/2003 Badura et al.
6,646,383 B2 11/2003 Bertsche et al.
6,670,618 B1 12/2003 Hartmann et al.
6,683,318 B1 1/2004 Haberer et al.
6,683,426 B1 * 1/2004 Kleeven ..... 315/502
6,693,283 B2 2/2004 Eickhoff et al.
6,703,613 B2 * 3/2004 Kaji ..... G01N 23/2251 250/305
6,710,362 B2 3/2004 Kraft et al.
6,713,773 B1 3/2004 Lyons et al.
6,713,976 B1 3/2004 Zumoto et al.
6,717,162 B1 4/2004 Jongen
6,736,831 B1 5/2004 Hartmann et al.
6,745,072 B1 6/2004 Badura et al.
6,769,806 B2 8/2004 Moyers
6,774,383 B2 8/2004 Norimine et al.
6,777,689 B2 8/2004 Nelson
6,777,700 B2 8/2004 Yanagisawa et al.
6,780,149 B1 8/2004 Schulte
6,799,068 B1 9/2004 Hartmann et al.
6,800,866 B2 10/2004 Amemiya et al.
6,803,591 B2 10/2004 Muramatsu et al.
6,814,694 B1 11/2004 Pedroni
6,819,117 B2 * 11/2004 Wilsher ..... G01R 35/005 324/601
6,822,244 B2 11/2004 Beloussov et al.
6,853,142 B2 2/2005 Chistyakov
6,853,703 B2 2/2005 Svatos et al.
6,864,770 B2 3/2005 Nemoto et al.
6,865,254 B2 3/2005 Nafstadius
6,873,123 B2 3/2005 Marchand et al. .... H05H 13/00 250/396 R
6,891,177 B1 5/2005 Kraft et al.
6,891,924 B1 5/2005 Yoda et al.
6,894,300 B2 5/2005 Reimoser et al.
6,897,451 B2 5/2005 Kaercher et al.
6,902,646 B2 * 6/2005 Mahoney ..... H01J 37/32935 118/712
6,914,396 B1 7/2005 Symons et al.
6,936,832 B2 8/2005 Norimine et al.
6,953,943 B2 10/2005 Yanagisawa et al.
6,965,116 B1 11/2005 Wagner et al.
6,969,194 B1 11/2005 Nafstadius
6,979,832 B2 12/2005 Yanagisawa et al.
6,984,835 B2 1/2006 Harada
6,992,312 B2 1/2006 Yanagisawa et al.
6,993,112 B2 1/2006 Hesse
7,008,105 B2 3/2006 Amann et al.
7,011,447 B2 3/2006 Moyers
7,012,267 B2 3/2006 Moriyama et al.
7,014,361 B1 3/2006 Ein-Gal
7,026,636 B2 4/2006 Yanagisawa et al.
7,038,403 B2 * 5/2006 Mastrangeli et al. ..... 315/502
7,041,479 B2 5/2006 Swartz et al.
7,045,781 B2 5/2006 Adamec et al.
7,049,613 B2 5/2006 Yanagisawa et al.
7,053,389 B2 5/2006 Yanagisawa et al.
7,054,801 B2 5/2006 Sakamoto et al.
7,060,997 B2 6/2006 Norimine et al.
7,071,479 B2 7/2006 Yanagisawa et al.
7,073,508 B2 7/2006 Moyers
7,081,619 B2 7/2006 Bashkirov et al.
7,084,410 B2 8/2006 Beloussov et al.
7,091,478 B2 8/2006 Haberer
7,102,144 B2 9/2006 Matsuda et al.
7,122,811 B2 10/2006 Matsuda et al.
7,122,966 B2 10/2006 Norling et al.
7,122,978 B2 10/2006 Nakanishi et al.
7,135,678 B2 11/2006 Wang et al.
7,138,771 B2 11/2006 Bechthold et al.
7,154,107 B2 12/2006 Yanagisawa et al.
7,154,108 B2 12/2006 Tadokoro et al.
7,154,991 B2 12/2006 Earnst et al.
7,162,005 B2 1/2007 Bjorkholm
7,173,264 B2 2/2007 Moriyama et al.
7,173,265 B2 2/2007 Miller et al.
7,173,385 B2 2/2007 Caporaso et al.
7,186,991 B2 3/2007 Kato et al.
7,193,227 B2 3/2007 Hiramoto et al.
7,199,382 B2 4/2007 Rigney et al.
7,208,748 B2 4/2007 Sliski et al.
7,212,608 B2 5/2007 Nagamine et al.
7,212,609 B2 5/2007 Nagamine et al.
7,221,733 B1 5/2007 Takai et al.
7,227,161 B2 6/2007 Matsuda et al.
7,247,869 B2 7/2007 Tadokoro et al.
7,257,191 B2 8/2007 Sommer

(56) References Cited

U.S. PATENT DOCUMENTS 7,259,529 B2 8/2007 Tanaka
7,262,424 B2 8/2007 Moriyama et al.
7,262,565 B2 * 8/2007 Fujisawa ..... 315/502
7,274,018 B2 9/2007 Adamec et al.
7,280,633 B2 10/2007 Cheng et al.
7,295,649 B2 11/2007 Johnsen
7,297,967 B2 11/2007 Yanagisawa et al.
7,301,162 B2 11/2007 Matsuda et al.
7,307,264 B2 12/2007 Brusasco et al.
7,317,192 B2 1/2008 Ma
7,318,805 B2 1/2008 Schweikard et al.
7,319,231 B2 1/2008 Moriyama et al.
7,319,336 B2 1/2008 Baur et al.
7,323,682 B2 * 1/2008 McCauley ..... H01J 49/147 250/286
7,331,713 B2 2/2008 Moyers
7,332,880 B2 2/2008 Ina et al.
7,345,291 B2 3/2008 Kats
7,345,292 B2 3/2008 Moriyama et al.
7,348,557 B2 3/2008 Armit
7,348,579 B2 3/2008 Pedroni
7,351,988 B2 4/2008 Naumann et al.
7,355,189 B2 4/2008 Yanagisawa et al.
7,368,740 B2 5/2008 Beloussov et al.
7,372,053 B2 5/2008 Yamashita et al.
7,378,672 B2 5/2008 Harada
7,381,979 B2 6/2008 Yamashita et al.
7,397,054 B2 7/2008 Natori et al.
7,397,901 B1 7/2008 Johnsen
7,398,309 B2 7/2008 Baumann et al.
7,402,822 B2 7/2008 Guertin et al.
7,402,823 B2 7/2008 Guertin et al.
7,402,824 B2 7/2008 Guertin et al.
7,402,963 B2 7/2008 Sliski
7,405,407 B2 7/2008 Hiramoto et al.
7,425,717 B2 9/2008 Matsuda et al.
7,432,516 B2 10/2008 Peggs et al.
7,439,528 B2 10/2008 Nishiuchi et al.
7,446,328 B2 11/2008 Rigney et al.
7,446,490 B2 11/2008 Jongen et al.
7,449,701 B2 11/2008 Fujimaki et al.
7,453,076 B2 11/2008 Welch et al.
7,456,415 B2 11/2008 Yanagisawa et al.
7,465,944 B2 12/2008 Ueno et al.
7,466,085 B2 12/2008 Nutt
7,468,506 B2 12/2008 Rogers et al.
7,473,913 B2 1/2009 Hermann et al.
7,476,867 B2 1/2009 Fritsch et al.
7,476,883 B2 1/2009 Nutt
7,482,606 B2 1/2009 Groezinger et al.
7,491,161 B2 2/2009 Taguchi
7,492,556 B2 2/2009 Atkins et al.
7,507,975 B2 3/2009 Mohr
7,518,108 B2 4/2009 Frey et al.
7,525,104 B2 4/2009 Harada
7,541,905 B2 6/2009 Antaya
7,547,901 B2 6/2009 Guertin et al.
7,554,096 B2 6/2009 Ward et al.
7,554,097 B2 6/2009 Ward et al.
7,555,103 B2 6/2009 Johnsen
7,557,358 B2 7/2009 Ward et al.
7,557,359 B2 7/2009 Ward et al.
7,557,360 B2 7/2009 Ward et al.
7,557,361 B2 7/2009 Ward et al.
7,560,715 B2 7/2009 Pedroni
7,560,717 B2 7/2009 Matsuda et al.
7,567,694 B2 7/2009 Lu et al.
7,574,251 B2 8/2009 Lu et al.
7,576,499 B2 8/2009 Caporaso et al.
7,579,603 B2 8/2009 Birgy et al.
7,579,610 B2 8/2009 Grozinger et al.
7,582,866 B2 9/2009 Furuhashi et al.
7,582,885 B2 9/2009 Katagiri et al.
7,582,886 B2 9/2009 Trbojevic
7,586,112 B2 9/2009 Chiba et al.
7,598,497 B2 10/2009 Yamamoto et al.
7,609,009 B2 10/2009 Tanaka et al.
7,609,809 B2 10/2009 Kapatoes et al.
7,609,811 B1 10/2009 Siljamaki et al.
7,615,942 B2 11/2009 Sanders et al.
7,626,347 B2 12/2009 Sliski et al.
7,627,267 B2 12/2009 Saiki
7,629,598 B2 12/2009 Harada
7,639,853 B2 12/2009 Olivera et al.
7,639,854 B2 12/2009 Schnarr et al.
7,643,661 B2 1/2010 Ruchala et al.
7,656,258 B1 2/2010 Antaya et al.
7,659,521 B2 2/2010 Pedroni
7,659,528 B2 2/2010 Uematsu
7,668,291 B2 2/2010 Nord et al.
7,672,429 B2 3/2010 Urano et al.
7,679,073 B2 3/2010 Urano et al.
7,682,078 B2 3/2010 Rietzel
7,692,166 B2 4/2010 Muraki et al.
7,692,168 B2 4/2010 Moriyama et al.
7,696,499 B2 4/2010 Miller et al.
7,696,847 B2 4/2010 Antaya
7,701,677 B2 4/2010 Schultz et al.
7,709,818 B2 5/2010 Matsuda et al.
7,710,051 B2 5/2010 Caporaso et al.
7,718,982 B2 5/2010 Sliski et al.
7,728,311 B2 6/2010 Gall
7,746,978 B2 6/2010 Cheng et al.
7,755,305 B2 7/2010 Umezawa et al.
7,759,642 B2 7/2010 Nir
7,763,867 B2 7/2010 Birgy et al.
7,767,988 B2 8/2010 Kaiser et al.
7,770,231 B2 8/2010 Prater et al.
7,772,577 B2 8/2010 Saito et al.
7,773,723 B2 8/2010 Nord et al.
7,773,788 B2 8/2010 Lu et al.
7,778,488 B2 8/2010 Nord et al.
7,783,010 B2 8/2010 Clayton
7,784,127 B2 8/2010 Kuro et al.
7,786,451 B2 8/2010 Ward et al.
7,786,452 B2 8/2010 Ward et al.
7,789,560 B2 9/2010 Moyers
7,791,051 B2 9/2010 Beloussov et al.
7,796,731 B2 9/2010 Nord et al.
7,801,269 B2 9/2010 Cravens et al.
7,801,270 B2 9/2010 Nord et al.
7,801,988 B2 9/2010 Baumann et al.
7,807,982 B2 10/2010 Nishiuchi et al.
7,809,107 B2 10/2010 Nord et al.
7,812,319 B2 10/2010 Diehl et al.
7,812,326 B2 10/2010 Grozinger et al.
7,816,657 B2 10/2010 Hansmann et al.
7,817,778 B2 10/2010 Nord et al.
7,817,836 B2 10/2010 Chao et al.
7,834,334 B2 11/2010 Grozinger et al.
7,834,336 B2 11/2010 Boeh et al.
7,835,494 B2 11/2010 Nord et al.
7,835,502 B2 11/2010 Spence et al.
7,839,972 B2 11/2010 Ruchala et al.
7,839,973 B2 11/2010 Nord et al.
7,848,488 B2 12/2010 Mansfield
7,857,756 B2 12/2010 Warren et al.
7,860,216 B2 12/2010 Jongen et al.
7,860,550 B2 12/2010 Saracen et al.
7,868,301 B2 1/2011 Diehl
7,875,861 B2 1/2011 Huttenberger et al.
7,875,868 B2 1/2011 Moriyama et al.
7,881,431 B2 2/2011 Aoi et al.
7,894,574 B1 2/2011 Nord et al.
7,906,769 B2 3/2011 Blasche et al.
7,914,734 B2 3/2011 Livingston
7,919,765 B2 4/2011 Timmer
7,920,040 B2 4/2011 Antaya et al.
7,920,675 B2 4/2011 Lomax et al.
7,928,415 B2 4/2011 Bert et al.
7,934,869 B2 5/2011 Ivanov et al.
7,940,881 B2 5/2011 Jongen et al.
7,943,913 B2 5/2011 Balakin
7,947,969 B2 5/2011 Pu

(56) References Cited

U.S. PATENT DOCUMENTS

| | | | |
|---|---|---|---|
| 7,949,096 | B2 | 5/2011 | Cheng et al. |
| 7,950,587 | B2 | 5/2011 | Henson et al. |
| 7,960,710 | B2 | 6/2011 | Kruip et al. |
| 7,961,844 | B2 | 6/2011 | Takeda et al. |
| 7,977,648 | B2 | 7/2011 | Westerly et al. |
| 7,977,656 | B2 | 7/2011 | Fujimaki et al. |
| 7,977,657 | B2 | 7/2011 | Flynn et al. |
| 7,982,198 | B2 | 7/2011 | Nishiuchi et al. |
| 7,982,416 | B2 | 7/2011 | Tanaka et al. |
| 7,984,715 | B2 | 7/2011 | Moyers |
| 7,986,768 | B2 | 7/2011 | Nord et al. |
| 7,987,053 | B2 | 7/2011 | Schaffner |
| 7,989,785 | B2 | 8/2011 | Emhofer et al. |
| 7,990,524 | B2 | 8/2011 | Jureller et al. |
| 7,997,553 | B2 | 8/2011 | Sloan et al. |
| 8,002,466 | B2 | 8/2011 | Von Neubeck et al. |
| 8,003,964 | B2 | 8/2011 | Stark et al. |
| 8,009,803 | B2 | 8/2011 | Nord et al. |
| 8,009,804 | B2 | 8/2011 | Siljamaki et al. |
| 8,039,822 | B2 | 10/2011 | Rietzel |
| 8,041,006 | B2 | 10/2011 | Boyden et al. |
| 8,044,364 | B2 | 10/2011 | Yamamoto |
| 8,049,187 | B2 | 11/2011 | Tachikawa |
| 8,053,508 | B2 | 11/2011 | Korkut et al. |
| 8,053,739 | B2 | 11/2011 | Rietzel |
| 8,053,745 | B2 | 11/2011 | Moore |
| 8,053,746 | B2 | 11/2011 | Timmer et al. |
| 8,063,381 | B2 | 11/2011 | Tsoupas et al. |
| 8,067,748 | B2 | 11/2011 | Balakin |
| 8,069,675 | B2 | 12/2011 | Radovinsky et al. |
| 8,071,966 | B2 | 12/2011 | Kaiser et al. |
| 8,080,801 | B2 | 12/2011 | Safai |
| 8,085,899 | B2 | 12/2011 | Nord et al. |
| 8,089,054 | B2 | 1/2012 | Balakin |
| 8,093,564 | B2 | 1/2012 | Balakin |
| 8,093,568 | B2 | 1/2012 | Mackie et al. |
| 8,111,125 | B2 | 2/2012 | Antaya et al. |
| 8,129,699 | B2 | 3/2012 | Balakin |
| 8,144,832 | B2 | 3/2012 | Balakin |
| 8,153,989 | B2 | 4/2012 | Tachikawa et al. |
| 8,173,981 | B2 | 5/2012 | Trbojevic |
| 8,188,688 | B2 | 5/2012 | Balakin |
| 8,198,607 | B2 | 6/2012 | Balakin |
| 8,222,613 | B2 | 7/2012 | Tajiri et al. |
| 8,227,768 | B2 | 7/2012 | Smick et al. |
| 8,232,536 | B2 | 7/2012 | Harada |
| 8,288,742 | B2 | 10/2012 | Balakin |
| 8,291,717 | B2 | 10/2012 | Radovinsky et al. |
| 8,294,127 | B2 | 10/2012 | Tachibana |
| 8,304,725 | B2 | 11/2012 | Komuro et al. |
| 8,304,750 | B2 | 11/2012 | Preikszas et al. |
| 8,309,941 | B2 | 11/2012 | Balakin |
| 8,330,132 | B2 | 12/2012 | Guertin et al. |
| 8,334,520 | B2 | 12/2012 | Otaka et al. |
| 8,335,397 | B2 | 12/2012 | Takane et al. |
| 8,344,340 | B2 | 1/2013 | Gall et al. |
| 8,350,214 | B2 | 1/2013 | Otaki et al. |
| 8,368,038 | B2 | 2/2013 | Balakin |
| 8,368,043 | B2 | 2/2013 | Havelange et al. |
| 8,373,143 | B2 | 2/2013 | Balakin |
| 8,373,145 | B2 | 2/2013 | Balakin |
| 8,373,146 | B2 | 2/2013 | Balakin |
| 8,378,299 | B2 | 2/2013 | Frosien |
| 8,378,321 | B2 | 2/2013 | Balakin |
| 8,382,943 | B2 | 2/2013 | Clark |
| 8,389,949 | B2 | 3/2013 | Harada et al. |
| 8,399,866 | B2 | 3/2013 | Balakin |
| 8,405,042 | B2 | 3/2013 | Honda et al. |
| 8,405,056 | B2 | 3/2013 | Amaldi et al. |
| 8,415,643 | B2 | 4/2013 | Balakin |
| 8,416,918 | B2 | 4/2013 | Nord et al. |
| 8,421,041 | B2 | 4/2013 | Balakin |
| 8,426,833 | B2 | 4/2013 | Trbojevic |
| 8,436,323 | B2 | 5/2013 | Iseki et al. |
| 8,440,987 | B2 | 5/2013 | Stephani et al. |
| 8,445,872 | B2 | 5/2013 | Behrens et al. |
| 8,466,441 | B2 | 6/2013 | Iwata et al. |
| 8,472,583 | B2 | 6/2013 | Star-Lack et al. |
| 8,483,357 | B2 | 7/2013 | Siljamaki et al. |
| 8,487,278 | B2 | 7/2013 | Balakin |
| 8,552,406 | B2 | 10/2013 | Phaneuf et al. |
| 8,552,408 | B2 | 10/2013 | Hanawa et al. |
| 8,569,717 | B2 | 10/2013 | Balakin |
| 8,575,563 | B2 | 11/2013 | Cameron et al. |
| 8,581,215 | B2 | 11/2013 | Balakin |
| 8,581,523 | B2 | 11/2013 | Gall et al. |
| 8,581,525 | B2 | 11/2013 | Antaya et al. |
| 8,637,833 | B2 | 1/2014 | Balakin |
| 8,653,314 | B2 | 2/2014 | Pelati et al. |
| 8,653,473 | B2 | 2/2014 | Yajima |
| 8,766,218 | B2 | 7/2014 | Jongen |
| 8,791,435 | B2 | 7/2014 | Balakin |
| 8,901,509 | B2 | 12/2014 | Balakin |
| 8,905,908 | B2 | 12/2014 | Matsuguma et al. |
| 8,907,311 | B2 | 12/2014 | Gall et al. |
| 8,952,634 | B2 | 2/2015 | Sliski et al. |
| 8,963,112 | B1 | 2/2015 | Balakin |
| 8,970,137 | B2 | 3/2015 | Gall et al. |
| 8,975,816 | B2 | 3/2015 | Scheitrum et al. |
| 9,012,866 | B2 | 4/2015 | Benna et al. |
| 9,028,384 | B2 | 5/2015 | Iikura |
| 9,044,600 | B2 | 6/2015 | Balakin |
| 9,056,199 | B2 | 6/2015 | Balakin |
| 9,176,468 | B2 | 11/2015 | Ueno et al. |
| 9,451,688 | B2 | 9/2016 | Jongen |
| 9,452,301 | B2 | 9/2016 | Gall et al. |
| 9,723,705 | B2 | 8/2017 | Gall et al. |
| 2002/0172317 | A1 | 11/2002 | Maksimchuk et al. |
| 2003/0048080 | A1 | 3/2003 | Amemiya et al. |
| 2003/0125622 | A1 | 7/2003 | Schweikard et al. |
| 2003/0136924 | A1 | 7/2003 | Kraft et al. |
| 2003/0146759 | A1 | 8/2003 | Bashkirov et al. |
| 2003/0152197 | A1 | 8/2003 | Moyers |
| 2003/0163015 | A1 | 8/2003 | Yanagisawa et al. |
| 2003/0183779 | A1 | 10/2003 | Norimine et al. |
| 2003/0234369 | A1 | 12/2003 | Glukhoy |
| 2004/0000650 | A1 | 1/2004 | Yanagisawa et al. |
| 2004/0017888 | A1 | 1/2004 | Seppi et al. |
| 2004/0056212 | A1 | 3/2004 | Yanagisawa et al. |
| 2004/0061077 | A1 | 4/2004 | Muramatsu et al. |
| 2004/0061078 | A1 | 4/2004 | Muramatsu et al. |
| 2004/0085023 | A1 | 5/2004 | Chistyakov |
| 2004/0098445 | A1 | 5/2004 | Baumann et al. |
| 2004/0111134 | A1 | 6/2004 | Muramatsu et al. |
| 2004/0118081 | A1 | 6/2004 | Reimoser et al. |
| 2004/0149934 | A1 | 8/2004 | Yanagisawa et al. |
| 2004/0159795 | A1 | 8/2004 | Kaercher et al. |
| 2004/0173763 | A1 | 9/2004 | Moriyama et al. |
| 2004/0174958 | A1 | 9/2004 | Moriyama et al. |
| 2004/0183033 | A1 | 9/2004 | Moriyama et al. |
| 2004/0183035 | A1 | 9/2004 | Yanagisawa et al. |
| 2004/0200982 | A1 | 10/2004 | Moriyama et al. |
| 2004/0200983 | A1 | 10/2004 | Fujimaki et al. |
| 2004/0213381 | A1 | 10/2004 | Harada |
| 2004/0227104 | A1 | 11/2004 | Matsuda et al. |
| 2004/0232356 | A1 | 11/2004 | Norimine et al. |
| 2004/0240626 | A1 | 12/2004 | Moyers |
| 2005/0058245 | A1 | 3/2005 | Ein-Gal |
| 2005/0089141 | A1 | 4/2005 | Brown |
| 2005/0161618 | A1 | 7/2005 | Pedroni |
| 2005/0184686 | A1 | 8/2005 | Caporaso et al. |
| 2005/0228255 | A1 | 10/2005 | Saracen et al. |
| 2005/0234327 | A1 | 10/2005 | Saracen et al. |
| 2005/0238134 | A1 | 10/2005 | Brusasco et al. |
| 2005/0247890 | A1 | 11/2005 | Norimine et al. |
| 2006/0017015 | A1 | 1/2006 | Sliski et al. |
| 2006/0067468 | A1 | 3/2006 | Rietzel |
| 2006/0126792 | A1 | 6/2006 | Li |
| 2006/0145088 | A1 | 7/2006 | Ma |
| 2006/0170381 | A1 | 8/2006 | Amaldi et al. |
| 2006/0173294 | A1 | 8/2006 | Ein-Gal |
| 2006/0175991 | A1 | 8/2006 | Fujisawa |
| 2006/0273264 | A1 | 12/2006 | Nakayama et al. |
| 2006/0284562 | A1 | 12/2006 | Hruby et al. |

(56) References Cited

U.S. PATENT DOCUMENTS

| | | | |
|---|---|---|---|
| 2007/0001128 | A1 | 1/2007 | Sliski et al. |
| 2007/0013273 | A1 | 1/2007 | Albert et al. |
| 2007/0014654 | A1 | 1/2007 | Haverfield et al. |
| 2007/0023699 | A1 | 2/2007 | Yamashita et al. |
| 2007/0029510 | A1 | 2/2007 | Hermann et al. |
| 2007/0051904 | A1 | 3/2007 | Kaiser et al. |
| 2007/0061937 | A1 | 3/2007 | Gall |
| 2007/0092812 | A1 | 4/2007 | Caporaso et al. |
| 2007/0114945 | A1 | 5/2007 | Mattaboni et al. |
| 2007/0133752 | A1 | 6/2007 | Ein-Gal |
| 2007/0145916 | A1 | 6/2007 | Caporaso et al. |
| 2007/0170994 | A1 | 7/2007 | Peggs et al. |
| 2007/0171015 | A1 | 7/2007 | Antaya |
| 2007/0181519 | A1 | 8/2007 | Khoshnevis |
| 2007/0252093 | A1 | 11/2007 | Fujimaki et al. |
| 2007/0284548 | A1 | 12/2007 | Kaiser et al. |
| 2008/0067452 | A1 | 3/2008 | Moriyama et al. |
| 2008/0078937 | A1 | 4/2008 | Tsuchiya et al. |
| 2008/0093567 | A1 | 4/2008 | Gall |
| 2008/0218102 | A1 | 9/2008 | Sliski |
| 2008/0234531 | A1 | 9/2008 | Welch et al. |
| 2008/0270517 | A1 | 10/2008 | Baumann et al. |
| 2009/0096179 | A1 | 4/2009 | Stark et al. |
| 2009/0101832 | A1 | 4/2009 | Diehl |
| 2009/0140671 | A1 | 6/2009 | O'Neal et al. |
| 2009/0140672 | A1 | 6/2009 | Gall et al. |
| 2009/0200483 | A1 | 8/2009 | Gall et al. |
| 2009/0230299 | A1 | 9/2009 | Shichi et al. |
| 2009/0236545 | A1 | 9/2009 | Timmer |
| 2009/0296885 | A1 | 12/2009 | Boeh et al. |
| 2009/0309046 | A1 | 12/2009 | Balakin |
| 2009/0314960 | A1 | 12/2009 | Balakin |
| 2009/0321665 | A1 | 12/2009 | Timmer et al. |
| 2010/0006770 | A1 | 1/2010 | Balakin |
| 2010/0027745 | A1 | 2/2010 | Balakin |
| 2010/0038552 | A1 | 2/2010 | Trbojevic |
| 2010/0045213 | A1 | 2/2010 | Sliski et al. |
| 2010/0046697 | A1 | 2/2010 | Balakin |
| 2010/0051833 | A1 | 3/2010 | Guertin et al. |
| 2010/0192303 | A1 | 8/2010 | Miller et al. |
| 2010/0209335 | A1 | 8/2010 | Mills |
| 2010/0230617 | A1 | 9/2010 | Gall |
| 2010/0308235 | A1 | 12/2010 | Sliski et al. |
| 2011/0006212 | A1 | 1/2011 | Shchory et al. |
| 2011/0220809 | A1 | 9/2011 | Yajima et al. |
| 2011/0233423 | A1 | 9/2011 | Balakin |
| 2011/0240874 | A1 | 10/2011 | Iwata |
| 2011/0284760 | A1 | 11/2011 | Balakin |
| 2011/0299919 | A1 | 12/2011 | Stark et al. |
| 2012/0014501 | A1 | 1/2012 | Pelc et al. |
| 2012/0081041 | A1 | 4/2012 | Cheung et al. |
| 2012/0126140 | A1 | 5/2012 | Gall et al. |
| 2012/0217903 | A1 | 8/2012 | Tanaka et al. |
| 2012/0313003 | A1 | 12/2012 | Trbojevic |
| 2013/0053616 | A1 | 2/2013 | Gall et al. |
| 2013/0127375 | A1 | 5/2013 | Sliski et al. |
| 2013/0131424 | A1 | 5/2013 | Sliski et al. |
| 2013/0193352 | A1 | 8/2013 | Bert et al. |
| 2013/0237425 | A1 | 9/2013 | Leigh et al. |
| 2013/0249443 | A1 | 9/2013 | Antaya et al. |
| 2014/0028220 | A1 | 1/2014 | Bromberg et al. |
| 2014/0042934 | A1 | 2/2014 | Tsutsui |
| 2014/0062344 | A1 | 3/2014 | Gall et al. |
| 2014/0094643 | A1 | 4/2014 | Gall et al. |
| 2014/0097920 | A1 | 4/2014 | Goldie et al. |
| 2015/0009917 | A1 | 1/2015 | Cho et al. |
| 2015/0009918 | A1 | 1/2015 | Yeoum et al. |
| 2015/0161793 | A1 | 6/2015 | Takahashi |
| 2017/0028224 | A1 | 2/2017 | Gall et al. |

FOREIGN PATENT DOCUMENTS

| | | | |
|---|---|---|---|
| CA | 2629333 | | 5/2007 |
| CA | 2629333 | A1 | 5/2007 |
| CN | 1377521 | A | 10/2002 |
| CN | 1537657 | A | 10/2004 |
| CN | 1631061 | A | 6/2005 |
| CN | 1816243 | A | 8/2006 |
| CN | 101061759 | | 10/2007 |
| CN | 101061759 | A | 10/2007 |
| CN | 101361156 | A | 2/2009 |
| CN | 101932361 | | 12/2010 |
| CN | 101932361 | A | 12/2010 |
| CN | 101933405 | | 12/2010 |
| CN | 101933405 | A | 12/2010 |
| CN | 101933406 | | 12/2010 |
| CN | 101933406 | A | 12/2010 |
| CN | 102036461 | | 4/2011 |
| CN | 102036461 | A | 4/2011 |
| CN | 101061759 | | 5/2011 |
| CN | 2005800245224 | | 5/2011 |
| CN | 102172106 | A | 8/2011 |
| CN | 2010105813842 | | 11/2012 |
| CN | 104244562 | A | 12/2014 |
| CN | 104812443 | A | 7/2015 |
| CN | 104812444 | A | 7/2015 |
| CN | 104822417 | A | 8/2015 |
| DE | 2753397 | | 6/1978 |
| DE | 2753397 | A1 | 6/1978 |
| DE | 2753397 | | 9/1978 |
| DE | 3148100 | | 6/1983 |
| DE | 3148100 | A1 | 6/1983 |
| DE | 35 30 446 | | 8/1984 |
| DE | 3530446 | | 3/1986 |
| DE | 3530446 | A1 | 3/1986 |
| DE | 31 48 100 | | 6/1986 |
| DE | 4101094 | C1 | 5/1992 |
| DE | 4411171 | | 10/1995 |
| DE | 4411171 | A1 | 10/1995 |
| EP | 0044153 | | 1/1982 |
| EP | 0044153 | A1 | 1/1982 |
| EP | 0 194 728 | | 9/1986 |
| EP | 0194728 | A1 | 9/1986 |
| EP | 0208163 | A1 | 1/1987 |
| EP | 0 221 987 | | 5/1987 |
| EP | 0221987 | A1 | 5/1987 |
| EP | 0222786 | A1 | 5/1987 |
| EP | 0276123 | A2 | 7/1988 |
| EP | 0 277 521 | | 8/1988 |
| EP | 0277521 | A2 | 8/1988 |
| EP | 0 208 163 | | 1/1989 |
| EP | 0306966 | A2 | 3/1989 |
| EP | 0 222 786 | | 7/1990 |
| EP | 0388123 | A2 | 9/1990 |
| EP | 0 221 987 | | 1/1991 |
| EP | 0465597 | A1 | 1/1992 |
| EP | 0 499 253 | | 8/1992 |
| EP | 0499253 | A2 | 8/1992 |
| EP | 0 306 966 | | 4/1995 |
| EP | 0 388 123 | | 5/1995 |
| EP | 0 465 597 | | 5/1997 |
| EP | 0776595 | A1 | 6/1997 |
| EP | 0 911 064 | | 6/1998 |
| EP | 0 864 337 | | 9/1998 |
| EP | 0864337 | A2 | 9/1998 |
| EP | 0 776 595 | | 12/1998 |
| EP | 0911064 | A2 | 4/1999 |
| EP | 1 069 809 | | 1/2001 |
| EP | 1069809 | A1 | 1/2001 |
| EP | 1 153 398 | | 4/2001 |
| EP | 1 153 398 | | 11/2001 |
| EP | 1153398 | A1 | 11/2001 |
| EP | 1265462 | A1 | 12/2002 |
| EP | 1 348 465 | | 1/2003 |
| EP | 1 294 445 | | 3/2003 |
| EP | 1294445 | A2 | 3/2003 |
| EP | 1 348 465 | | 10/2003 |
| EP | 1348465 | A1 | 10/2003 |
| EP | 1 358 908 | | 11/2003 |
| EP | 1358908 | A1 | 11/2003 |
| EP | 1 371 390 | | 12/2003 |
| EP | 1371390 | A1 | 12/2003 |
| EP | 1 402 923 | | 3/2004 |
| EP | 1402923 | A1 | 3/2004 |

(56) References Cited

FOREIGN PATENT DOCUMENTS

| | | | |
|---|---|---|---|
| EP | 0 911 064 | | 6/2004 |
| EP | 1 430 932 | | 6/2004 |
| EP | 1430932 | A1 | 6/2004 |
| EP | 1 454 653 | | 9/2004 |
| EP | 1 454 654 | | 9/2004 |
| EP | 1 454 655 | | 9/2004 |
| EP | 1 454 656 | | 9/2004 |
| EP | 1 454 657 | | 9/2004 |
| EP | 1454653 | A1 | 9/2004 |
| EP | 1454654 | A2 | 9/2004 |
| EP | 1454655 | A2 | 9/2004 |
| EP | 1454656 | A2 | 9/2004 |
| EP | 1454657 | A2 | 9/2004 |
| EP | 1 477 206 | | 11/2004 |
| EP | 1477206 | A1 | 11/2004 |
| EP | 1 605 742 | | 12/2005 |
| EP | 1605742 | A1 | 12/2005 |
| EP | 1 738 798 | | 1/2007 |
| EP | 1738798 | A2 | 1/2007 |
| EP | 1 371 390 | | 3/2007 |
| EP | 1790203 | | 5/2007 |
| EP | 1790203 | A2 | 5/2007 |
| EP | 1 826 778 | | 8/2007 |
| EP | 1826778 | A2 | 8/2007 |
| EP | 1 454 653 | | 9/2007 |
| EP | 1 477 206 | | 1/2008 |
| EP | 1 949 404 | | 7/2008 |
| EP | 1949404 | A2 | 7/2008 |
| EP | 2026640 | A2 | 2/2009 |
| EP | 2183753 | | 2/2010 |
| EP | 2394498 | | 2/2010 |
| EP | 2 227 295 | | 5/2010 |
| EP | 2183753 | A1 | 5/2010 |
| EP | 2227295 | | 5/2010 |
| EP | 2 232 961 | | 9/2010 |
| EP | 2 232 962 | | 9/2010 |
| EP | 2227295 | | 9/2010 |
| EP | 2227295 | A1 | 9/2010 |
| EP | 2232961 | | 9/2010 |
| EP | 2232961 | A1 | 9/2010 |
| EP | 2232962 | | 9/2010 |
| EP | 2232962 | A2 | 9/2010 |
| EP | 2259664 | | 12/2010 |
| EP | 2259664 | A2 | 12/2010 |
| EP | 1 605 742 | | 6/2011 |
| EP | 2 363 170 | | 9/2011 |
| EP | 2 363 171 | | 9/2011 |
| EP | 2363170 | | 9/2011 |
| EP | 2363170 | A1 | 9/2011 |
| EP | 2363171 | | 9/2011 |
| EP | 2363171 | A1 | 9/2011 |
| EP | 2394498 | A2 | 12/2011 |
| EP | 2814304 | A1 | 12/2014 |
| EP | 2900324 | A1 | 8/2015 |
| EP | 2900325 | A2 | 8/2015 |
| EP | 2900326 | A1 | 8/2015 |
| FR | 2 560 421 | | 8/1985 |
| FR | 2560421 | A1 | 8/1985 |
| FR | 2911843 | | 8/2008 |
| FR | 2911843 | A1 | 8/2008 |
| GB | 0 957 342 | | 5/1964 |
| GB | 0957342 | A | 5/1964 |
| GB | 1360085 | A | 7/1974 |
| GB | 1485329 | A | 9/1977 |
| GB | 2 015 821 | | 9/1979 |
| GB | 2015821 | A | 9/1979 |
| GB | 1583400 | A | 1/1981 |
| GB | 2 361 523 | | 10/2001 |
| GB | 2361523 | A | 10/2001 |
| JP | 43-23267 | | 10/1968 |
| JP | S48-108098 | U | 12/1973 |
| JP | U48-108098 | | 12/1973 |
| JP | 57-162527 | | 10/1982 |
| JP | 58-141000 | | 8/1983 |
| JP | 58-141000 | | 9/1983 |
| JP | 61-80800 | | 4/1986 |
| JP | S61-80800 | A | 4/1986 |
| JP | 61-225798 | | 10/1986 |
| JP | S63-218200 | A | 10/1986 |
| JP | 62-150804 | | 7/1987 |
| JP | S62-150804 | A | 7/1987 |
| JP | 62-186500 | | 8/1987 |
| JP | S62-186500 | A | 8/1987 |
| JP | 62-186500 | | 11/1987 |
| JP | 10-071213 | | 3/1988 |
| JP | 63-149344 | | 6/1988 |
| JP | S63-149344 | A | 6/1988 |
| JP | 63-218200 | | 9/1988 |
| JP | 63-226899 | | 9/1988 |
| JP | S63-226899 | A | 9/1988 |
| JP | 64-89621 | | 4/1989 |
| JP | 10247600 | | 9/1989 |
| JP | 01-276797 | | 11/1989 |
| JP | 01-302700 | | 12/1989 |
| JP | H01-276797 | A | 12/1989 |
| JP | H01-302700 | A | 12/1989 |
| JP | 4-94198 | | 3/1992 |
| JP | 04-128717 | | 4/1992 |
| JP | 04-129768 | | 4/1992 |
| JP | 04-273409 | | 9/1992 |
| JP | 04-337300 | | 11/1992 |
| JP | 05-341352 | | 12/1993 |
| JP | 06-036893 | | 2/1994 |
| JP | H06-036893 | A | 2/1994 |
| JP | 06-233831 | | 8/1994 |
| JP | H06-233831 | A | 8/1994 |
| JP | 06-036893 | | 10/1994 |
| JP | 06-036893 | | 12/1994 |
| JP | 07-260939 | | 10/1995 |
| JP | 07-263196 | | 10/1995 |
| JP | 2007 260939 | | 10/1995 |
| JP | H07-260939 | A | 10/1995 |
| JP | H07-263196 | A | 10/1995 |
| JP | 08-173890 | | 7/1996 |
| JP | H08-173890 | A | 7/1996 |
| JP | 08-264298 | | 10/1996 |
| JP | H08-264298 | A | 10/1996 |
| JP | 09-162585 | | 6/1997 |
| JP | H09-162585 | A | 6/1997 |
| JP | 10-071213 | | 3/1998 |
| JP | H10-071213 | A | 3/1998 |
| JP | 10270200 | | 10/1998 |
| JP | 11-047287 | | 2/1999 |
| JP | 11-47287 | | 2/1999 |
| JP | 11-102800 | | 3/1999 |
| JP | 11-102800 | | 4/1999 |
| JP | H11-102800 | A | 4/1999 |
| JP | 11-243295 | | 9/1999 |
| JP | 2000-243309 | A | 9/2000 |
| JP | 2000-294399 | | 10/2000 |
| JP | 2000-294399 | A | 10/2000 |
| JP | 2001-6900 | | 1/2001 |
| JP | 2001-009050 | A | 1/2001 |
| JP | 2011 505191 | | 2/2001 |
| JP | 2001-129103 | | 5/2001 |
| JP | 2001-129103 | A | 5/2001 |
| JP | 2001-346893 | A | 12/2001 |
| JP | 2002-164686 | | 6/2002 |
| JP | 2002-164686 | A | 6/2002 |
| JP | 2003-504628 | A | 2/2003 |
| JP | 2003-517755 | | 5/2003 |
| JP | 2003-517755 | A | 5/2003 |
| JP | 2004-139944 | A | 5/2004 |
| JP | 2005-526578 | A | 9/2005 |
| JP | 2006-032282 | A | 2/2006 |
| JP | 2006233831 | A | 9/2006 |
| JP | 2007260939 | A | 10/2007 |
| JP | 2007-319439 | A | 12/2007 |
| JP | 2008-012121 | A | 1/2008 |
| JP | 05-046928 | | 3/2008 |
| JP | 2008-507826 | | 3/2008 |
| JP | 2008-507826 | A | 3/2008 |
| JP | 5046928 | | 3/2008 |
| JP | 2008-089341 | A | 4/2008 |

(56) References Cited

FOREIGN PATENT DOCUMENTS

| | | | |
|---|---|---|---|
| JP | 04-128717 | B2 | 7/2008 |
| JP | 04-129768 | B2 | 8/2008 |
| JP | 2008-270039 | A | 11/2008 |
| JP | 2009 515671 | | 4/2009 |
| JP | 2009-515671 | A | 4/2009 |
| JP | 2009-516905 | | 4/2009 |
| JP | 2009-516905 | A | 4/2009 |
| JP | 04-273409 | B2 | 6/2009 |
| JP | 04-337300 | B2 | 9/2009 |
| JP | 43-23267 | B2 | 9/2009 |
| JP | 2010-204020 | A | 9/2010 |
| JP | 2010-536130 | A | 11/2010 |
| JP | 2011-505191 | | 2/2011 |
| JP | 2011-505191 | A | 2/2011 |
| JP | 2011-505670 | | 2/2011 |
| JP | 2011-505670 | A | 2/2011 |
| JP | 2011 507151 | | 3/2011 |
| JP | 2011-507151 | A | 3/2011 |
| JP | 2011-521425 | A | 7/2011 |
| JP | 2011-210494 | A | 10/2011 |
| JP | 2011-224342 | A | 11/2011 |
| JP | 05-046928 | B2 | 10/2012 |
| JP | 05-341352 | B2 | 11/2013 |
| RU | 300137 | | 11/1969 |
| RU | 569635 | | 8/1977 |
| SU | 300137 | | 11/1969 |
| SU | 569635 | A1 | 8/1977 |
| TW | 200934682 | | 8/2008 |
| TW | 200930160 | | 7/2009 |
| TW | 200930160 | A | 7/2009 |
| TW | 2009 34682 | | 8/2009 |
| TW | 200934682 | A | 8/2009 |
| TW | 200939908 | | 9/2009 |
| TW | 200939908 | A | 9/2009 |
| TW | 200940120 | | 10/2009 |
| TW | 200940120 | A | 10/2009 |
| TW | 201422278 | A | 6/2014 |
| TW | 201422279 | A | 6/2014 |
| TW | 201424466 | A | 6/2014 |
| TW | S64-89621 | A | 6/2014 |
| TW | 201429514 | A | 8/2014 |
| TW | 201433331 | A | 9/2014 |
| TW | 201434508 | A | 9/2014 |
| TW | 201438787 | A | 10/2014 |
| WO | WO 86/07229 | | 12/1986 |
| WO | WO-8607229 | A1 | 12/1986 |
| WO | WO-9012413 | A1 | 10/1990 |
| WO | WO 92/03028 | | 2/1992 |
| WO | WO-9203028 | A1 | 2/1992 |
| WO | WO 93/02536 | | 2/1993 |
| WO | WO-9302536 | A1 | 2/1993 |
| WO | WO 98/17342 | | 4/1998 |
| WO | WO-9817342 | A2 | 4/1998 |
| WO | WO 99/39385 | | 8/1999 |
| WO | WO-9939385 | A1 | 8/1999 |
| WO | WO 00/40064 | | 7/2000 |
| WO | WO-0040064 | A2 | 7/2000 |
| WO | WO 00/49624 | | 8/2000 |
| WO | WO-0049624 | A1 | 8/2000 |
| WO | WO 01/026230 | | 4/2001 |
| WO | WO 01/126569 | | 4/2001 |
| WO | WO-0126230 | A1 | 4/2001 |
| WO | WO-01126569 | | 4/2001 |
| WO | WO-2001126569 | | 4/2001 |
| WO | WO-0207817 | | 1/2002 |
| WO | WO 03/039212 | | 5/2003 |
| WO | WO-03039212 | A1 | 5/2003 |
| WO | WO 03/092812 | | 11/2003 |
| WO | WO-2003/092340 | A1 | 11/2003 |
| WO | WO-03092812 | A1 | 11/2003 |
| WO | WO 2004/026401 | | 4/2004 |
| WO | WO-2004026401 | A1 | 4/2004 |
| WO | WO 2004/101070 | | 11/2004 |
| WO | WO-2004101070 | A1 | 11/2004 |
| WO | WO-2005/102453 | A1 | 11/2005 |
| WO | WO-2006/012452 | A1 | 2/2006 |
| WO | WO 2006/012467 | | 2/2006 |
| WO | WO-2006/012467 | A2 | 2/2006 |
| WO | WO-2006012467 | A2 | 2/2006 |
| WO | WO 2006-012467 | | 12/2006 |
| WO | WO 2007/061937 | | 5/2007 |
| WO | WO-2007061937 | A2 | 5/2007 |
| WO | WO 2007/084701 | | 7/2007 |
| WO | WO-2007084701 | A1 | 7/2007 |
| WO | WO 2007/130164 | | 11/2007 |
| WO | WO-2007130164 | A2 | 11/2007 |
| WO | WO 2007/145906 | | 12/2007 |
| WO | WO-2007145906 | A2 | 12/2007 |
| WO | WO 2008/030911 | | 3/2008 |
| WO | WO-2008030911 | A2 | 3/2008 |
| WO | WO-2008081480 | A1 | 7/2008 |
| WO | WO 2008/081480 | | 10/2008 |
| WO | WO 2009/048745 | | 4/2009 |
| WO | WO-2009048745 | A2 | 4/2009 |
| WO | WO-2009/056165 | A1 | 5/2009 |
| WO | WO 2009/070173 | | 6/2009 |
| WO | WO 2009/070588 | | 6/2009 |
| WO | WO 2009/073480 | | 6/2009 |
| WO | WO 2009/073480 | A2 | 6/2009 |
| WO | WO-2009070173 | A1 | 6/2009 |
| WO | WO-2009070588 | A1 | 6/2009 |
| WO | WO-2009073480 | A2 | 6/2009 |
| WO | WO-2009080080 | A1 | 7/2009 |
| WO | WO 2009/048745 | | 11/2009 |
| WO | WO-2010089574 | A2 | 8/2010 |
| WO | WO-2010/149740 | A1 | 12/2010 |
| WO | WO-2012/044957 | A1 | 4/2012 |
| WO | WO-2012/071142 | A2 | 5/2012 |
| WO | WO-2013/079311 | A1 | 6/2013 |
| WO | WO-2013098089 | A1 | 7/2013 |
| WO | WO-2013/142409 | A1 | 9/2013 |
| WO | WO-2014/018876 | A1 | 1/2014 |
| WO | WO-2014/052708 | A2 | 4/2014 |
| WO | WO-2014/052709 | A2 | 4/2014 |
| WO | WO-2014/052716 | A2 | 4/2014 |
| WO | WO-2014/052718 | A2 | 4/2014 |
| WO | WO-2014/052719 | A2 | 4/2014 |
| WO | WO-2014/052721 | A1 | 4/2014 |
| WO | WO-2014/052722 | A2 | 4/2014 |

OTHER PUBLICATIONS

Angert, N (GSI, Darmstadt), CAS—CERN Accelerator School : 5th General Accelerator Physics Course, Jyväskylä, Finland, Sep. 7-18, 1992, pp. 619-642 (CERN-1994-001).

Communication pursuant to Rule 71(3) EPC Annex to EPO Form 2004 for EP10175727.6, 42 pages (Jul. 28, 2017).

File history of U.S. Appl. No. 14/039,307 (downloaded Mar. 13, 2017).

Extended Search Report for EP10175727, 7 pages (Dec. 19, 2015).

First Office Action for 201380062111.9, 46 pages (Jun. 1, 2016).

International Preliminary Report on Patentability issued in PCT application No. PCT/US2013/062103 on Apr. 9, 2015, (11 pages).

Office Action for JP2015-534721, 14 pages (Feb. 3, 2016).

Pedroni, E. et al., Cancer Therapy with 200 MEV Protons at PSI. Development of a Fast Beam Scanning Method and Future Plans for a Hospital Based Facility, pp. 277-279 (1990).

U.S. Appl. No. 11/371,622, filed on Mar. 9, 2006.

File History of U.S. Appl. No. 11/187,633.

File History of U.S. Appl. No. 13/618,939.

File History of U.S. Pat. No. 7402963.

File History of U.S. Pat. No. 7626347.

File History of U.S. Pat. No. 8952634.

Communication under Rule 71(3) EPC for EP1719182.9, 36 pages (Oct. 16, 2018).

An Accelerated Collaboration Meets with Beaming Success, Lawrence Livermore National Laboratory, Apr. 12, 2006, S&TR, Livermore, California, pp. 1-3, http://www.llnl.gov/str/April06/Caporaso.html.

Cohen, R. et al., Nevis Synchrocyclotron Conversion Project, IEEE Transactions on Nuclear Science, IEEE SelVice Center, New York, NY, US, vol. 16, No. 3, Jun. 1, 1969, pp. 421-425, XP011351570,

(56) References Cited

OTHER PUBLICATIONS

ISSN: 0018-9499, DOI: 10.1109/TNS.1969.4325264 abstract; figures I-4a Chap. 1, p. 421-2; chap. 11 from p. 423, col. 2 to p. 425, col. 1. (5 pages).
Dey, M.K., et al., Coil Centering for the Kolkata Superconducting Cyclotron Magnet, Cyclotrons and their applications, Proceedings, 18th International Conference, Cyclotrons 2007, Giardini Naxo, Italy, Oct. 1-5, 2007 (3 pages).
Elo, Don, et al., Mechanical Design of Regenerative Deflector for the Berkeley 88-Inch Cyclotron, Proceedings of the International Conference on Isochronous Cyclotrons, Gatlinburg, Tennessee, Aug. 1966 (7 pages).
European Communication issued in European application No. 13774886.9 on Jun. 12, 2015, with amended claims filed on Jun. 12, 2015 (20 pages).
European Communication issued in European application No. 13783422.2 on Jun. 12, 2015 (2 pages).
File History for U.S. Appl. 14/039,307 as of Sep. 12, 2017, 836 pages (retrieved Nov. 27, 2018).
File history of U.S. Appl. No. 10/949,734 (now U.S. Pat. No. 7,208,748) (downloaded Mar. 14, 2017).
File history of U.S. Appl. No. 11/371,622 (now U.S. Pat. No. 7,402,963) (downloaded Mar. 14, 2017).
File history of U.S. Appl. No. 11/463,403 (now U.S. Pat. No. 7,656,258) (downloaded Mar. 14, 2017).
File history of U.S. Appl. No. 11/517,490 (now U.S. Pat. No. 7,701,677) (downloaded Mar. 14, 2017).
File history of U.S. Appl. No. 11/601,056 (now U.S. Pat. No. 7,728,311) (downloaded Mar. 14, 2017).
File history of U.S. Appl. No. 11/624,769 (now U.S. Pat. No. 7,541,905) (downloaded Mar. 14, 2017).
File history of U.S. Appl. No. 11/724,055 (now U.S. Pat. No. 7,718,982) (downloaded Mar. 14, 2017).
File history of U.S. Appl. No. 11/870,961 (now U.S. Pat. No. 8,003,964) (downloaded Mar. 14, 2017).
File history of U.S. Appl. No. 11/948,662 (now U.S. Pat. No. 8581523) (downloaded Mar. 14, 2017).
File history of U.S. Appl. No. 12/275,103 (now U.S. Pat. No. 8,344,340) (downloaded Mar. 14, 2017).
File history of U.S. Appl. No. 60/590,088 (downloaded Mar. 14, 2017).
File history of U.S. Appl. No. 60/850,565 (downloaded Mar. 14, 2017).
File history of U.S. Appl. No. 60/991,454 (downloaded Mar. 14, 2017).
First Chinese Office Action for CN201380062115.7, 7 pages (Dec. 12, 2016), and English translation 9 pages (Dec. 12, 2016).
International Preliminary Report on Patentability from PCT application No. PCT/US2013/062119 dated Mar. 31, 2015 (7 pages).
International Preliminary Report on Patentability from PCT application No. PCT/US2013/062137 dated Mar. 31, 2015 (9 pages).
International Search Report and Written Opinion from PCT application No. PCT/US2013/062119 dated Nov. 26, 2013 (9 pages).
Japanese Office Action for Application JP2015-534728, 6 pages (dated Mar. 28, 2016). Note: English translation has not been received from Associate.
Japanese Office Action for Application JP2015-534721, 14 pages (dated Feb. 3, 2016) (with English Translation).
Ormrod, J.H., et al., The Chalk-River Superconducting Cyclotron, Proceedings of the International Conference on Cyclotrons and their applications '79, 1979 (6 pages).
Rainwater, James, Status of the Nevis Synchrocyclotron Modification, AIP Conference Proceedings No. 9, 1972 (14 pages).
Response to European Communication issued in European application No. 13774886.9 on Jun. 12, 2015, filed on Dec. 9, 2015 (26 pages).
Response to European Communication issued in European application No. 13783422.2 on Jun. 12, 2015, filed on Dec. 8, 2015 (19 pages).
Second Chinese Office Action for CN201380062111.9, 10 pages (Apr. 5, 2017), and English Translation 16 pages (Apr. 5, 2017).
U.S. Appl. No. 13/830,792 filed on Mar. 14, 2013, including the USPTO electronic file for 13/830,792.
U.S. Appl. No. 13/949,459 filed on Jul. 24, 2013, including the USPTO electronic file for 13/949,459.
U.S. Appl. No. 61/676,377 filed Jul. 27, 2012, including the USPTO electronic file for 61/676,377.
Verster, N. F., Regenerative Beam Extraction from the 150-MeV Synchrocyclotron at the Laboratoire Curie, Proceedings of Sector-Focused Cyclotrons 1959, 1959, pp. 224-229 (6 pages).
Enchevich, I B et al. "Minimizing Phase Losses in the 680 Mev Synchrocyclotron by Correcting the Accelerating Voltage Amplitude", in Atomnaja Energya. (Soviet Atomic Energy) Soviet Atomic Energy, Atomnaja Energya. (Moscow, SU, Mar. 1, 1969), vol. 26, No. 3, pp. 315-316, XP008069829.
Extended European Search Report (EP 19165255.1) 7 pages, Sep. 24, 2019.
Amaldi, Cyclinacs, Novel Fast-Cycling Accelerators for Hadrontherapy, 2007, Cyclotrons and Their Applications, 18th International Conference, pp. 166-168.
Appun, J. "Various Problems of Magnet Fabrication for High-Energy Accelerators, " Journal for All Engineers Interested in the Nuclear Field, pp. 10-16 (1967) [Lang.: German], English bibliographic information(http://www.osti.gov/energycitations/product.biblio.jsp?osti.sub.--id=444- 2292).
Blom, Mikael, Development of a Scanning System for Proton Therapy in Uppsala, Department of Radiation Sciences, Uppsala University, 2450-2451.
Blosser, H., et. al. "A Compact Superconducting Cyclotron for the Production of High Intensity Protons," Proceedings of the 1997 Particle Accelerator Conference, vol. 1, pp. 1054-1056 (May 12-16, 1997).
Canadian Office action from Canadian application No. 2,629,333 dated Aug. 30, 2010 (5 pages).
Chichili, D.R., et al., "Fabrication of Nb.sup.3Sn Shell-Type Coils with Pre-Preg Ceramic Insulation," American Institute of Physics Conference Proceedings, AIP USA, No. 711, (XP-002436709, ISSN: 0094-243X), 2004, pp. 450-457.
Chinese Office action from Chinese application No. 200880125832.9, dated Sep. 22, 2011 (11 pages).
Chinese Office action from Chinese application No. 200880125918.1, dated Sep. 15, 2011 (111 pages).
English translation of Chinese Office action from Chinese application No. 200880125832.9, dated Jun. 5, 2012 (5 pages).
European Communication from corresponding European application No. 11/65422.4 dated Sep. 2, 2011 (5 pages).
European Communication from corresponding European application No. 11/65423.2 dated Sep. 2, 2011 (5 pages).
European Communication from European application No. 07868958.5, dated Nov. 26, 2010 (50 pages).
European Patent Office communication from European application No. 07868958.5, dated Jul. 16, 2010 (2 pages).
European Patent Office communication from European application No. 08856764.9, dated Jul. 30, 2010 (2 pages).
European Search Report from European Application No. 10175751.6 dated Nov. 18, 2010 (8 pages).
Favale, A. et al., Pre-conceptual Design of a Rapid Cycling Medical Synchrotron, The AES/BNL collaboration, 45 pages (Oct. 27, 1999).
File History for U.S. Appl. No. 14/039,307 as of Jan. 13, 2017, 343 pages.
Fish & Richardson P.C., Response to Non Final Office action dated Aug. 20, 2010 in U.S. Appl. No. 11/948,359, filed on Feb. 22, 2011 (17 pages).
Grözinger, Sven Oliver, Volume Conformal Irradiation of Moving Target Volumes with Scanned Ion Beams, Vom Fachbereich Physik der Technischen Universität Darmstadt, 110 pages (2004).
International Preliminary Report on Patentability for PCT application No. PCT/US2007/001506 dated Jul. 5, 2007 (15 pages).
International Preliminary Report on Patentability from PCT application No. PCT/US2007/086109, dated Jun. 10, 2010 (7 pages).

(56) References Cited

OTHER PUBLICATIONS

International Preliminary Report on Patentability from PCT application No. PCT/US2008/084695, dated Jun. 10, 2010 (10 pages).
International Preliminary Report on Patentability from PCT application No. PCT/US2008/084699, dated Jun. 10, 2010 (8 pages).
International Preliminary Report on Patentability issued in PCT application PCT/US2013/062103 dated Apr. 9, 2015 (11 pages).
International Search Report and Written Opinion for PCT application No. PCT/US2007/001506 dated Jul. 5, 2007, Publication No. WO 2007/084701, Published Jul. 26, 2007 (14 pages).
International Search Report and Written Opinion for PCT application No. PCT/US2008/084695 dated Jan. 26, 2009 (15 pages).
International Search Report and Written Opinion from corresponding PCT application No. PCT/US2013/062103 dated Apr. 14, 2014 (13 pages).
International Search Report for PCT/US2007/001628 dated Feb. 18, 2008 (4 pages).
Invitation to Pay Additional Fees and, where applicable, Protest Fees with partial search report for application No. PCT/US2008/077513 dated Jul. 3, 2009 (62 pages).
Jones et al., "Status Report of the NAC Particle Therapy Programme," Stralentherapie and Onkologie, vol. 175, Suppl. II, Jun. 1999, pp. 30-32.
Kanazawa, M. et al., Beam Control in the Spot Scanning Irradiation, Proceedings of the Second Asian Particle Accelerator Conference, China; 846-848 (2001).
Kawachi, K. et al., Three Dimensional Spot Beam Scanning Method for Proton Conformation Radiation Therapy, Acta Radiologica, Supplementum 364, 10 pages (1982).
Lorin, S. et al., Development of a compact proton scanning system in Uppsala with a moveable second magnet, Phys. Med. Biol, 45:1151-1163 (2000).
Murphy, M. and Lin, P., Intra-fraction dose delivery timing during stereotactic radiotherapy can influence the radiobiological effect, Med. Phys., 34(2):481-484 (2007).
Non Final Office Action from U.S. Appl. No. 12/275,103 dated Feb. 1, 2011 (6 pages).
Non Final Office Action from U.S. Appl. No. 12/618,297 dated May 13, 2011 (44 pages).
Office Action and response history of U.S. Appl. No. 11/601,056 dated Aug. 24, 2009.
Office Action and response history of U.S. Appl. No. 11/601,056 dated Mar. 24, 2009.
Office Action and response history of U.S. Appl. No. 11/601,056 up dated Jan. 14, 2010.
Office Action for JP2015-534721, 14 pages, dated (Feb. 3, 2016).
Office action from U.S. Appl. No. 11/948,662, dated Oct. 14, 2011 (5 pages).
Pardo, J. et al., Simulation of the performance of the CNAO facility's Beam Delivery System, PTCOG 46, Zibo, China, 17 pages (2007).
PCT application No. PCT/US2005/25942 filed on Jul. 21, 2005, with Publication No. WO 2006/012452.
Pourrahimi, S. et al., "Powder Metallurgy Processed Nb.sup. 3Sn(Ta) Wire for High Field NMR Magnets," IEEE Transactions on Applied Superconductivity, vol. 5, No. 2, (Jun. 1995), pp. 1603-1606.
Response to Non Final Office Action dated Feb. 1, 2011 in U.S. Appl. No. 12/275,103 filed May 2, 2011 (13 pages).
Second Office Action (English) for JP2015-534721, 5 pages (Dec. 26, 2016).
Second Office Action (Japanese) for JP2015-534721, 5 pages (Dec. 26, 2016).
Shinji Sato et al., "Dynamic Intensity Control System with RF-knockout Slow-Extraction in the HIMAC Synchrotron—" Nuclear Instruments and Methods in Physics Research A 574, 2007, pp. 226-231.
Superconducting Cyclotron Contract awarded by Paul Scherrer Institute (PSI), Villigen, Switzerland, http://www.accel.de/News/superconducting.sub.--cyclotron.sub.--contract.h- tml (Feb. 3, 2005).
Takayama, T., et al. , "Compact Cyclotron for Proton Therapy," Proceedings of the 8.sup.th Symposium on Accelerator Science and Technology, Japan (Nov. 25-27, 1991) pp. 380-382.
U.S. Appl. No. 10/949,734, filed Sep. 24, 2004, Patent No. 7,208,748, issued on Apr. 24, 2007.
U.S. Appl. No. 11/187,633, filed on Jul. 21, 2005.
U.S. Appl. No. 11/371,622, filed Mar. 9, 2006.
U.S. Appl. No. 11/463,403, filed Aug. 9, 2006.
U.S. Appl. No. 11/517,490, filed Sep. 7, 2006.
U.S. Appl. No. 11/601,056, filed Nov. 17, 2006.
U.S. Appl. No. 11/624,769, filed Jan. 19, 2007.
U.S. Appl. No. 11/724,055, filed Mar. 14, 2007.
U.S. Appl. No. 11/870,961, filed Oct. 11, 2007.
U.S. Appl. No. 11/948,662, filed Nov. 30, 2007.
U.S. Appl. No. 12/275,103, filed Nov. 20, 2008.
USPTO Non Final Office Action in U.S. Appl. No. 11/948,359, dated Aug. 20, 2010 (12 pages).
U.S. Appl. No. 60/590,088, filed Jul. 21, 2004.
U.S. Appl. No. 60/738,404, filed Nov. 18, 2005.
U.S. Appl. No. 60/850,565, filed Oct. 10, 2006.
U.S. Appl. No. 60/991,454, filed on Nov. 30, 2007.
Uli Weber et al., "Depth Scanning for a Conformal Ion Beam Treatment of Deep Seated Tumours—" Physics in Medicine and Biology IOP Publishing UK, vol. 45, No. 12, Dec. 2000, pp. 3627-3641.
Umegaki et al., "Development of an Advance Proton Beam Therapy System for Cancer Treatment" Hitachi Hyoron, 2003, 85(9):605-608 [Lang.: Japanese], English Abstract, http://www.hitachi.com/ICSFiles/afieldfile/2004/06/01/r2003.sub.--04.sub.- --104.pdfor http://www.hitachi.com/rev/archive/2003/2005649.sub.--12626.html (full text) [Hitachi, 52(4), Dec. 2003].
van Steenbergen, A. "Superconducting Synchroton Development at BNL," Proceedings of the 8.sup.th International Conference on High-Energy Accelerators CERN 1971, pp. 196-198 (1971).
Written Opinion for PCT/US2007/001628, dated Feb. 18, 2008 (11 pages).
Yudelev, M., et. al. "Hospital Based Superconducting Cyclotron for Neutron Therapy: Medical Physics Perspective," Cyclotrons and their applications 2001, 16th International Conference. American Institute of Physics Conference Proceedings, vol. 600,pp. 40-43 (May 13-17, 2001). http://www.osti.gov/energycitations/productbiblio.jsp?osti.sub.--id=20468- 164 http://adsabs. harvard.edu/abs/2001A1PC.. 600 . . . 40Y http://scitation.aip.org/getabs/servlet/GetabsServlet?prog= normal&id=APCPCS000600000001000040000001&idtype=cvips&gifs=yes.
Zherbin, E. A., et al., "Proton Beam Therapy at the Leningrad Synchrocyclotron (Clinicomethodological Aspects and Therapeutic Results)," pp. 17-22, Aug. 1987, vol. 32(8)(German with English abstract on .about.es 21-22).
Extended European Search report for EP17191182.9, 10 pages (Jan. 29, 2018).
Schneider, R., et al., "Nevis Synchrocyclotron Conversion Program—RF System," *IEEE Transactions on Nuclear Science USA ns16* (3) pp. 430-433 (Jun. 1269).
Enchevich, B., et al., "Minimizing Phase Losses in the 680 MeV Synchrocyclotron by Correcting the Accelerating Voltage Amplitude," *Atomnaya Energiya 26:*(3), pp. 315-316 (1969).
Allardyce, B.W., et al., "Performance & Prospects of the Reconstructed CERN 600 MeV Synchro-Cyclotron," *IEEE Transactions on Nuclear Science USA ns-24:* (3), pp. 1631-1633 (Jun. 1977).
Blosser, H.G., "Synchrocyclotron Improvement Programs," *IEEE Transactions on Nuclear Science USA ns16:* (3), pp. 59-65 (Jun. 1969).
Blosser, H.G., "Compact Superconducting Synchrocyclotron Systems for Proton Therapy," *Nuclear Instruments & Methods in Physics Research, B40-42,* pp. 1326-1330 (Apr. 1989).
Lecroy, W., et al., "Viewing Probe for High Voltage Pulses," *Review of Scientific Instruments USA 31:*;(12), p. 1354 (Dec. 1960).
Schneider, R., et al., "Nevis Synchrocyclotron Conversion Program-R.F.System," IEEE Transactions on Nuclear Science USA, vol. ns18, No. 3, pp. 303-306 (Jun. 1971).
18th Japan Conference on Radiation and Radioisotopes [Japanese], Nov. 25-27, 1987, 9 pages.

(56) References Cited

OTHER PUBLICATIONS

510(k) Summary: Ion Beam Applications SA, FDA, Apr. 13, 2001.
510(k) Summary: Optivus Proton Beam Therapy System, Jul. 21, 2000, 5 pages.
Abrosimov, N. K., et al,"1000MeV Proton Beam Therapy Facility at Petersburg Nuclear Physics Institute Synchrocyclotron," *Medical Radiology (Moscow) 32, 10 (1987) revised in Journal of Physics,* Conference Series 41, pp. 424-432, Institute of Physics Publishing Limited, 2006.
Abrosimov, N. K., et al., "Neutron Time-of-Fight Spectrometer Gneis At the Gatchina 1 GeV Proton Synchrocylotron," *Nuclear Instruments & Methods in Physics Research,* A242(1): 121-133 (1985).
Adachi, T., et. al. "A 150MeV FFAG Synchrotron with "Return-Yoke Free" Magnet," *Proceedings of the 2001 Particle Accelerator Conference,* Chicago (2001).
Ageyev, A.I., et. al. "The IHEP Accelerating and Storage Complex (UNK) Status Report," 11$^{th}$ *International Conference on High-Energy Accelerators,* pp. 60-70 (Jul. 7-11, 1980).
Agosteo, S., et al., "Maze Design of a Gantry Room for Proton Therapy," *Nuclear Instruments & Methods in Physics Research,* Section A, 382, pp. 573-582 (1996).
Alexeev, V.P., et al., "R4 Design of Superconducting Magnets for Proton Synchrotrons," *Proceedings of the Fifth International Cryogenic Engineering Conference,* pp. 531-533 (1974).
Allardyce, B.W., et al., "Performance and Prospects of the Reconstructed CERN 600 MeV Synchrocyclotron" *IEEE Transactions on Nuclear Science USA* NS-24:(3), pp. 1631-1633 (Jun. 1977).
Amaldi, U. "Overview of the World Landscape of Hadrontherapy and the Projects of the TERA Foundation," *Physica Medica, An International Journal Devoted to the Applications of Physics to Medicine and Biology,* vol. XIV, Supplement 1 (Jul. 1998), 6th Workshop on Heavy Charged Particles in Biology and Medicine, Instituto Scientific Europeo (ISE), Baveno, pp. 76-85 (Sep. 29-Oct. 1, 1997).
Amaldi, U., et al. , "The Italian Project for a Hadrontherapy Centre," *Nuclear Instruments and Methods in Physics Research A,* 360, pp. 297-301 (1995).
Anferov, V., et. al., "Status of the Midwest Proton Radiotherapy Institute," *Proceedings of the 2003 Particle Accelerator Conference,* pp. 699-701 (2003).
Anferov, V., et. al., "The Indiana University Midwest Proton Radiation Institute," *Proceedings of the 2001 Particle Accelerator Conference, Chicago,* pp. 645-647 (2001).
Appun, J. "Various Problems of Magnet Fabrication for High-Energy Accelerators," *Journal for All Engineers Interested in the Nuclear Field,* pp. 10-16 (1967) [Lang.: German], English bibliographic information (http://www.osti.gov/energycitations/product.biblio.jsp?osti__id=4442292).
Arduini, G., et. al., "Physical Specifications of Clinical Proton Beams From a Synchrotron," *Med. Phys.* 23 (6), pp. 939-951 (Jun. 1996).
Beeckman, W., et. al., "Preliminary Design of a Reduced Cost Proton Therapy Facility Using A Compact, High Field Isochronous Cyclotron," *Nuclear Instruments and Methods in Physics Research* B56/57, pp. 1201-1204 (1991).
Bellomo, G., et al., "The Superconducting Cyclotron Program at Michigan State University," *Bulletin of the American Physical Society,* vol. 25, No. 7, p. 767 (Sep. 1980).
Benedikt, M. And Carli, C. "Matching to Gantries for Medical Synchrotrons," *IEEE Proceedings of the 1997 Particle Accelerator Conference,* pp. 1379-1381 (1997).
Bieth, C., et. al., "A Very Compact Proton Therapy Facility Based on an Extensive Use of High Temperature Superconductors (HTS)," *Cyclotrons and their Applications 1998, Proceedings of the Fifteenth International Conference on Cyclotrons and their Applications,* Caen, France, pp. 669-672 (Jun. 14-19, 1998).
Bigham, C.B. "Magnetic Trim Rods for Superconducting Cyclotrons," *Nuclear Instruments and Methods (North-Holland Publishing Co.)* 141 (1975), pp. 223-228.
Blackmore, E.W., et. al. "Operation of the Triumf Proton Therapy Facility," *IEEE Proceedings of the 1997 Particle Accelerator Conference,* vol. 3, pp. 3831-3833 (May 12-16, 1997).
Bloch, C. "The Midwest Proton Therapy Center, " *Application of Accelerators in Research and Industry, Proceedings of the Fourteenth Int'l. Conference,* Part Two, pp. 1253-1255 (Nov. 1996).
Blosser, H. "Applications of Superconducting Cyclotrons," *Twelfth International Conference on Cyclotrons and Their Applications,* pp. 137-144 (May 8-12, 1989).
Blosser, H. G. "Compact Superconducting Synchrocyclotron Systems for Proton Therapy," *Nuclear Instruments & Methods in Physics Research,* Section B40-41, Part II, pp. 1326-1330 (1989).
Blosser, H. G. "Synchrocyclotron Improvement Programs," *IEEE Transactions on Nuclear Science USA,* http://www.nscl.msu.edu/tech/accelerators/k250photo.html (Feb. 2005).vol. 16,No. 3, Part I, pp. 405-414 (Jun. 1969).
Blosser, H., "Application of Superconductivity in Cyclotron Construction," *Ninth International Conference on Cyclotrons and their Applications,* pp. 147-157 (Sep. 1981).
Blosser, H., "Present and Future Superconducting Cyclotrons," *Bulletin of the American Physical 314 Society,* vol. 32, No. 2, p. 171 (Feb. 1987), Particle Accelerator Conference, Washington, D.C. 1987.
Blosser, H., et al., "Problems and Accomplishments of Superconducting Cyclotrons," *Proceedings 315 of the 14th International Conference, Cyclotrons and Their Applications,* pp. 674-684 (Oct. 1995).
Blosser, H., et al., "Superconducting Cyclotron for Medical Application," *IEEE Transactions on Magnetics,* vol. 25, No. 2, pp. 1746-1754 (Mar. 1989).
Blosser, H., et al., "Advances in Superconducting Cyclotrons at Michigan State University," *Proceedings of the*11$^{th}$ *International Conference on Cyclotrons and their Applications,* pp. 157-167 (Oct. 1986), Tokyo.
Blosser, H., et al., "Characteristics of a 400 (Q2/A) MeV Super-Conducting Heavy-Ion Cyclotron," *Bulletin of the American Physical Society,* p. 1026 (Oct. 1974).
Blosser, H., et al., "Preliminary Design Study Exploring Building Features Required for a Proton Therapy Facility for the Ontario Cancer Institute," *MSUCL-760a* (Mar. 1991).
Blosser, H., et al., "Medical Accelerator Projects at Michigan State Univ.," *IEEE Proceedings of the 1989 Particle Accelerator Conference,* vol. 2, pp. 742-746 (Mar. 20-23, 1989).
Blosser, H.G., "Future Cyclotrons," *AIP, The Sixth International Cyclotron Conference,* pp. 16-32 (1972).
Blosser, H.G., "Medical Cyclotrons," *Physics Today, Special Issue Physical Review Centenary,* pp. 70-73 (Oct. 1993).
Blosser, H.G., "Progress on the Coupled Superconducting Cyclotron Project," *Bulletin of the American Physical Society,* vol. 26, No. 4, p. 558 (Apr. 1981).
Blosser, H.G., "Superconducting Cyclotrons at Michigan State University," *Nuclear Instruments & Methods in Physics Research,* vol. B 24/25, part II, pp. 752-756 (1987).
Blosser, H.G., "The Michigan State University Superconducting Cyclotron Program," *Nuclear Science,* vol. NS-26, No. 2, pp. 2040-2047 (Apr. 1979).
Blosser, H.G., et al, "Superconducting Cyclotrons," *Seventh International Conference on Cyclotrons and their Applications,* pp. 584-594 (Aug. 19-22, 1975).
Botha, A.H., et al., "A New Multidisciplinary Separated-Sector Cyclotron Facility," *IEEE Transactions on Nuclear Science,* vol. NS-24, No. 3, pp. 1118-1120 (1977).
Chichili, D.R., et al., "Fabrication of $Nb^3Sn$ Shell-Type Coils with Pre-Preg Ceramic Insulation," *American Institute of Physics Conference Proceedings,* AIP USA, No. 711, (XP-002436709, ISSN: 0094-243X), 2004, pp. 450-457.
Chong, C.Y., et al., Radiology Clinic North American 7,3319 (1969).
Chu, et al., "Instrumentation for Treatment of Cancer Using Proton and Light-ion Beams," *Review of Scientific Instruments,* 64 (8), pp. 2055-2122 (Aug. 1993).
Cole, et al., "Design and Application of a Proton Therapy Accelerator," *Fermi National Accelerator Laboratory, IEEE,* (1985).

(56) References Cited

OTHER PUBLICATIONS

Conradie, et al., "Proposed New Facilities for Proton Therapy at iThemba Labs," *Proceedings of EP AC,* pp. 560-562 (2002).
CE/Source of Ions for Use in Sychro-Cyclotrons Search, Jan. 31, 2005, 9 pages.
Coupland, J.H. "High-field (5T) Pulsed Superconducting Dipole Magnet," *Proceedings of the Institution of Electrical Engineers,* vol. 121, No. 7, pp. 771-778 (Jul. 1974).
Coutrakon, G. et al., "A Prototype Beam Delivery System for the Proton Medical Accelerator At Lorna Linda," *Medical Physics,* vol. 18(6), pp. 1093-1099 (Nov./Dec. 1991).
Coutrakon, G. et al., "Proton Synchrotrons for Cancer Therapy, " *Application of Accelerators in Research and Industry—Sixteenth International Conf., American Institute of Physics,* vol. 576, pp. 861-864 (Nov. 1-5, 2000).
CPAC Highlights Its Proton Therapy Program at ESTRO Annual Meeting, TomoTherapy Incorporated, Sep. 18, 2008, Madison, Wisconsin, pp. 1-2.
Cuttone, G., "Applications of a Particle Accelerators in Medical Physics," *Istituto Nazionale di Fisica Nucleare-Laboratori Nazionali del Sud, V.S. Sofia, 44 Cantania, Italy* (17 pages). No date.
Dahl, P., "Superconducting Magnet System," *American Institute of Physics, AIP Conference Proceedings,* vol. 2, pp. 1329-1376 (1987-1988).
Dugan, G. et al. "Tevatron Status," *IEEE, Particle Accelerator Conference, Accelerator Science & Technology* (1989), pp. 426-430.
Eickhoff, et al. "The Proposed Accelerator Facility for Light Ion Cancer Therapy in Heidelberg," *Proceedings of the 1999 Particle Accelerator Conference, New York,* pp. 2513-2515 (1999).
Endo, K., et. al., "Compact Proton and Carbon Ion Synchrotrons for Radiation Therapy," *Proceedings of EPAC 2002, Paris France,* pp. 2733-2735 (2002).
Flanz, J.B. et al., "Large Medical Gantries," *1995 Particle Accelerator Conference, Massachusetts General Hospital,* pp. 1-5 (1995).
Flanz, J.B. et al., "The Northeast Proton Therapy Center at Massachusetts General Hospital," *Fifth Workshop on Heavy Charge Particles in Biology and Medicine, GSI, Darmstadt* (Aug. 1995).
Flanz, J.B. et. al. "Treating Patients with the NPTC Accelerator Based Proton Treatment Facility," *Proceedings of the 2003 Particle Accelerator Conference* (2003), pp. 690-693.
Flood, W. S. And Frazier, P. E. "The Wide-Band Driven RF System for the Berkeley 88-Inch Cyclotron," *American Institute of Physics, Conference Proceedings.,* No. 9, 459-466 (1972).
Foster, G. W. and Kashikhin, V. S. "Superconducting Superferric Dipole Magent with Cold Iron Core for the VLHC," *IEEE Transactions on Applied Superconductivity,* vol. 12, No. 1, pp. 111-115 (Mar. 2002).
Friesel, D. L. et al. "Design and Construction Progress on the IUCF Midwest Proton Radiation Institute," *Proceedings of EPAC 2002,* pp. 2736-2738 (2002).
Fukumoto, S. "Cyclotron Versus Synchrotron for Proton Beam Therapy," KEK Preprint, No. 95-122, pp. 533-536 (1995).
Fukumoto, S. et. al., "A Proton Therapy Facility Plan," *Cyclotrons and their Applications, Proceedings of the 13th International Conference, Vancouver, Canada,* pp. 258-261 (Jul. 6-10, 1992).
Gordon, M.M. et. al., "Design Study for a Compact 200 MeV Cyclotron," *AIP Conference Proceedings Sixth International Cyclotron Conference,* No. 9, pp. 78-86 (1972).
Gordon, M.M., "Extraction Studies for a 250 MeV Superconducting Synchrocyclotron," *Proceedings of the 1987 IEEE Particle Accelerator Conference: Accelerator Engineering and Technology,* pp. 1255-1257 (1987).
Goto, A. et al., "Progress on the Sector Magnets for the Riken SRC," *American Institute of Physics, CP600, Cyclotrons and Their Applications 2001, Sixteenth International Conference (2001),* pp. 319-323.
Graffman, S. et. al., "Design Studies for a 200 MeV Proton Clinic for Radiotherapy," *AIP Conference Proceedings: Cyclotrons 1972,* No. 9, pp. 603-615 (1972).
Graffman, S. et. al. "Proton radiotherapy with the Uppsala cyclotron. Experience and Plans," *Strahlentherapie,* 161, No. 12, pp. 764-770 (1985).
Graffman, S., et al., "Clinical Trials in Radiotherapy and the Merits of High Energy Protons," *Acta Radiol. Therapy Phys.* Biol. 9:1-23 (1970).
Hede, Karyn, Research Groups Promoting Proton Therapy "Lite," *Journal of the National Cancer Institute,* 98(23):1682-1684 (2006).
Heinz, W. "Superconducting Pulsed Magnetic Systems for High-Energy Synchrotrons," *Proceedings of the Fourth International Cryogenic Engineering Conference,* pp. 55-63. (May 24-26, 1972).
Hentschel, R., et. al., "Plans for the German National Neutron Therapy Centre with a Hospital-Based 70 MeV Proton Cyclotron at University Hospital Essen/Germany," *Cyclotrons and their Applications, Proceedings of the Fifteenth International Conference on Cyclotrons and their Applications,* Caen, Franco, pp. 21-23 (Jun. 14-19, 1998).
Hepburn, J.D., et. al., "Superconducting Cyclotron Neutron Source for Therapy," *International Journal of Radiation Oncology Biology Physics,* vol. 3 complete, pp. 387-391 (1977).
Hirabayashi, H. "Development of Superconducting Magnets for Beam Lines and Accelerator at KEK," *IEEE Transaction on Magnetics,* vol. Mag-17, No. 1, pp. 728-731 (Jan. 1981).
Indiana's mega-million proton therapy cancer center welcomes its first patients: [online] Press release, *Health & Medicine Week,* 2004, retrieved from NewsRx.com, Mar. 1, 2004, pp. 119-120.
Ishibashi, K. And McInturff, A. "Winding Design Study of Superconducting /OT Dipoles for a Synchrotron," *IEEE Transactions on Magnetics,* vol. MAG-19, No. 3, pp. 1364-1367 (1983).
Ishibashi, K. and McInturff, A., "Stress Analysis of Superconducting /OT Magnets for Synchrotron," *Proceedings of the Ninth International Cryogenic Engineering Conference,* pp. 513-516 (May 11-14, 1982).
Jahnke, A., et. al. "First Superconducting Prototype Magnets for a Compact Synchrotron Radiation Source in Operation," *IEEE Transactions on Magnetics,* vol. 24, No. 2 (Mar. 1988), pp. 1230-1232.
Jones, and Dershem. "Synchrotron Radiation from Proton in a 20 TEV, 10 TESLA 367 Superconducting Super Collider," *Proceedings of the 12th International Conference on High-Energy Accelerators,* pp. 138-140 (Aug. 11-16, 1983).
Jones, D.T.L. "Present Status and Future Trends of Heavy Particle Radiotherapy," *Cyclotrons and their Applications 1998, Proceedings of the Fifteenth International Conference on Cyclotrons and their Applications,* pp. 13-20 (Jun. 14-19, 1998).
Jones, D.T.L. And Mills, S.J. "The South African National Accelerator Centre: Particle Therapy and Isotope Production Programmes," *Radiation Physics and Chemistry,* vol. 51, Nos. 4-6, pp. 571-578 (Apr.-Jun. 1998).
Jones, D.T.L., et. al. "Status Report of the NAC Particle Therapy Programme," *Stralentherapie und Onkologie,* vol. 175, Suppl. II, pp. 30-32 (Jun. 1999).
Jones, D.T.L. "Progress with the 200 MeV Cyclotron Facility at the National Accelerator Centre," *Commission of the European Communities Radiation Protection Proceedings, Fifth Symposium on Neutron Dosimetry,* vol. II, pp. 989-998 (Sep. 17-21, 1984).
Jongen, Y. et al., "The Proton Therapy System for the NPTC: Equipment Description and Progress Report," *Nuclear Instruments and methods in Physics Research,* Section B, vol. 113, No. 1, pp. 522-525 (1996).
Jongen, Y., et al., "The Proton Therapy System for MGH's NPTC: Equipment Description and Progress Report," *Bulletin du Cancer Radiotherapie, Proceedings of the meeting of the European Heavy Particle Therapy Group,* vol. 83, Suppl. 1, pp. 219-222 (1996).
Jongen, Y., et al., "Development of a Low-Cost Compact Cyclotron System for Proton Therapy," National *Institute of Radiol. Sci* No. 81, pp. 189-200 (1991).
Jongen, Y., et. al. "Progress report on the IBA-SHI Small Cyclotron for Cancer Therapy," *Nuclear Instruments and Methods in Physics Research,* Section B, vol. 79, issue 1-4, pp. 885-889 (1993).
Kanai, et al., "Three-dimensional Beam Scanning for Proton Therapy," *Nuclear Instruments and Methods in Physic Research,* Sep. 1, 1983, The Netherlands, vol. 214, No. 23, pp. 491-496.

(56) References Cited

OTHER PUBLICATIONS

Karlin, D.L., et al., "Medical Protonic Tract of Synchropshylotron of the Leningrad Institute of Nuclear Physics," *Medical Radiology* (Moscow) 28,13 (1983). (English Abstract).
Karlin, D.L., et al., "The State and Prospects in the Development of the Medical Proton Tract on the Synchrocyclotron in Gatchina," *Med. Radiology,* Moscow, vol. 28(3), pp. 28-32 (Mar. 1983)(German with English Abstract on end of p. 32).
Kats, M. M. And Onosovskii, K. K. "A Planar Magnetooptical System for the Irradiation of a Lying Patient with a Proton Beam from Various Directions," *Instruments and Experimental Techniques,* vol. 39, No. 1, pp. 127-131 (1996).
Kats, M. M. And Onosovskii, K. K. "A Simple, Compact, Flat System for the Irradiation of a Lying Patient with a Proton Beam from Different Directions," *Instruments and Experimental Techniques,* vol. 39, No. 1, p. 132-134 (1996).
Kats, M.M. And Druzhinin, B.L. "Comparison of Methods for Irradiating Prone Patients" *Atomic Energy,* vol. 94, No. 2, pp. 120-123 (2003).
Khoroshkov, V. S., et al., "Moscow Hospital-Based Proton Therapy Facility Design" *Am. Journal Clinical Oncology:* CCT, vol. 17, No. 2, pp. 109-114 (1994).
Kim, J. and Blosser, H., "Optimized Magnet for a 250 MeV Proton Radiotherapy Cyclotron," *Cyclotrons and Their Applications 2001, Sixteenth International Conference,* pp. 345-347 (May 2001).
Kim, J. And Yun, C. "A Light-Ion Superconducting Cyclotron System for Multi-Disciplinary Users," *Journal of the Korean Physical Society,* vol. 43, No. 3, pp. 325-331 (Sep. 2003).
Kim, J., et al., "Design Study of a Superconducting Cyclotron for Heavy Ion Therapy," *Cyclotrons and Their Applications 2001, Sixteenth International Conference,* pp. 324-326 (May 13-17, 2001).
Kim, J., et al., "Construction of 8 T Magnet Test Stand for Cyclotron Studies," *IEEE Transactions on Applied Superconductivity,* vol. 3, No. 1, pp. 266-268 (Mar. 1993).
Kim, J.W. "An Eight Tesla Superconducting Magnet for Cyclotron Studies," *Ph.D. Dissertation, Michigan State University, Department of Physics and Astronomy* (1994).
Kim, J.W., et al., "Trim Coil System for the Riken Superconducting Ring Cyclotron," *Proceedings at the 1997 Particle Accelerator Conference, IEEE,* vol. 3, pp. 214-235 (Dec. 1981). or 3422-3424, 1998).
Kishida, N. And Yano, Y. "Beam Transport System for the RIKEN SSC (H), " *Scientific Papers of the Institute of Physical and Chemical Research,* vol. 75, No. 4, pp. 214-235 (Dec. 1981).
Koehler, A.M., et al., "Range Modulators for Protons and Heavy Ions," *Nuclear Instruments and Methods,* vol. 131, pp. 437-440 (1975).
Koto, M. And Tsujii, H. "Future of Particle Therapy," *Japanese Journal of Cancer Clinics,* vol. 47, No. 1, pp. 95-98 (2001) [Lang.: Japanese], English abstract (http://sciencelinks.jp/jeast/article/200206/00002002060 IA0511453 .mill).
Kraft, G. et al., "Hadrontherapy in Oncology," *Elsevier Science,* 1994.
Larsson, B. "Biomedical Program for the Converted 200-MeV Synchrocyclotron at the Gustaf Werner Institute," *Radiation Research,* 104, pp. S310-S318 (1985).
Larsson, B., et al., "The High-Energy Proton Beam As a Neurosurgical Tool," *Nature* vol. 182, pp. 1222-1223 (1958).
Lawrence, J.H., "Proton Irradiation of the Pituitary," *Cancer,* vol. 10, pp. 795-798 (1957).
Lawrence, J.H., et al., "Heavy Particles in Acromegaly and Cushing's Disease," *Endocrine and Norendocrine Hormone Producing Tumors,* pp. 29-61 (1973).
Lawrence, J.H., et al., "Successful Treatment of Acromegaly: Metabolic and Clinical Studies in 145 Patients," *The Journal of Clinical Endrocrinology and Metabolism,* 31 (2): (1970).
Linfoot, J.A., et al., "Acromegaly," *Hormonal Proteins and Peptides,* pp. 191-246 (1975).
Livingston, M.S., et al. "A Capillary Ion Source for the Cyclotron," *Review Science Instruments,* vol. 10, p. 9. 63-67, (1939).
LLNL, UC Davis Team Up to Fight Cancer, Lawrence Livermore National Laboratory, Apr. 28, 2006, SF-Jun. 4, 2002, Livermore, California, pp. 1-4.
Mandrillon, P. "High Energy Medical Accelerators," *EPAC 90, 2nd European Particle Accelerator Conference,* vol. 2, (Jun. 12-16, 1990), pp. 54-58.
Marti, F., et al., "High Intensity Operation of a Superconducting Cyclotron," *Proceedings of the 14th International Conference, Cyclotrons and Their Applications,* pp. 45-48 (Oct. 1995).
Martin, P. "Operational Experience with Superconducting Synchrotron Magnets," *Proceedings of the 1987 IEEE Particle Accelerator Conference,* vol. 3 of 3, pp. 1379-1382 (Mar. 16-19, 1987).
Meot, F., et al. , "ETOILE Hadrontherapy Project, Review of Design Studies," *Proceedings of EPAC 2002,* pp. 2745-2747 (2002).
Miyamoto, S., et al., "Development of the Proton Therapy System," *The Hitachi Hyoron,* vol. 79, 10, pp. 775-779 (1997) [Lang: Japanese], English abstract (http://www.hitachi.com/rev/1998/revfeb98/rev4706.htm).
Montelius, A, et al., "The Narrow Proton Beam Therapy Unit at the Svedberg Laboratory in Uppsala," *ACTA Oncologica,* vol. 30, pp. 739-745 (1991).
Moser, H.O., et al., "Nonlinear Beam Optics with Real Fields in Compact Storage Rings, " *Nuclear Instruments & Methods in Physics Research/Section B30,* Feb. 1988, No. 1, pp. 105-109.
National Cancer Institute Funding (Senate-Sep. 21, 1992) (www.thomas.loc.gov/cgi-bin/query/z?r102:S21SE2-712 (2 pages).
Nicholson, J. "Applications of Proton Beam Therapy," *Journal of the American Society of Radiologic Technologists,* vol. 67, No. 5, pp. 439-441 (May/Jun. 1996).
Nolen, J.A., et al., "The Integrated Cryogenic—Superconducting Beam Transport System Planned for MSU," *Proceedings of the 12th International Conference on High-Energy Accelerators,* pp. 549-551 (Aug. 1983).
Norimine, T., et al., "A Design of a Rotating Gantry with Easy Steering for Proton Therapy," *Proceedings of EPAC 2002,* pp. 2751-2753 (2002).
Okumura, T., et al., "Overview and Future Prospect of Proton Radiotherapy," *Japanese Journal of Cancer Clinics,* vol. 43, No. 2, pp. 209-214 (1997) [Lang.: Japanese].
Okumura, T., et al., "Proton Radiotherapy," *Japanese Journal of Cancer and Chemotherapy,* (20), No. 14, pp. 2149-2155 (1993) [Lang.: Japanese] Outstanding from Search Reports, "Accelerator of Polarized Portons at Fermilab," 20 pages, 2005.
Palmer, R. and Tollestrup, A V. "Superconducting Magnet Technology for Accelerators," *Annual Review of Nuclear and Particle Science,* vol. 34, pp. 247-284 (1984).
Patent Assignee and Keyword Searches for Synchrocyclotron, Jan. 25, 2005 (77 pages).
Patterson, "An Accelerated Collaboration Meets with Beaming Success," *Lawrence Livermore National Laboratory,* Apr. 12, 2006, S&TR Livermore, CA. pp. 1-3, http://www.llnl.gov/str/April06/Caporaso.html.
Pavlovic, M. "Beam-Optics Study of the Gantry Beam Delivery System for Light-Ion Cancer Therapy," *Nuclear Instruments and Methods in Physics Research,* Section A, vol. 399, No. 2, pp. 439-454 (1997).
Pedroni, E. "Accelerators for Charged Particle Therapy: Performance Criteria from the User Point of View," *Cyclotrons and their Applications, Proceedings of the 13th International Conference,* pp. 226-233 (1992).
Pedroni, E. "Latest Developments in Proton Therapy," *Proceedings of EPAC 2000,* pp. 240-244 (2000).
Pedroni, E. and Enge, H. "Beam Optics Design of Compact Gantry for Proton Therapy," *Medical & Biological Engineering & Computing,* vol. 33, No. 3, pp. 271-277 (May 1995).
Pedroni, E. and Jermann, M. "SGSMP: Bulletin *Mar. 2002* Proscan Project, Progress Report on the PROSCAN Project of PSI," [online] retrieved from www.sgsmp.ch/protA23.htm, (5 pages) Mar. 2002.
Pedroni, E., et al., "A Novel Gantry for Proton Therapy at the Paul Scherrer Institute," *Cycloctrons 430 and Their Applications 2001: Sixteenth International Conference. AIP Conference Proceedings,* vol. 600, pp. 13-17 (2001).

(56) References Cited

OTHER PUBLICATIONS

Pedroni, E., et al., "The 200-MeV proton therapy project at the Paul Scherrer Institute: Conceptual Design and Practical Realization," *Medical Physics,* vol. 22, No. 1, pp. 37-53 (Jan. 1995).
Potts, R., et al., "MPWP6-Therapy III: Treatment Aids and Techniques," *Medical Physics,* vol. 15, No. 5, p. 798 (Sep./Oct. 1988).
Pourrahimi, S. et al., "Powder Metallurgy Processed Nb.$^3$Sn(Ta) Wire for High Field NMR Magnets," *IEEE Transactions on Applied Superconductivity,* vol. 5, No. 2, (Jun. 1995), pp. 1603-1606.
Prieels, D., et al., "The IBA State-of-the-Art Proton Therapy System, Performances and Recent Results," *Application of Accelerators in Research and Industry—Sixteenth International. Conference, American Institute of Physics,* vol. 576, pp. 857-860 (2000).
Rabin, M. S. Z., et al., "Compact Designs for Comprehensive Proton Beam Clinical Facilities," *Nuclear Instruments and Methods in Physics Research* 40(41):1335-1339(1989).
Research & Development Magazine, "Proton Therapy Center Nearing Completion," vol. 41, No. 9, Aug. 1999 (2 pages)(www.rdmga.com).
Resmini, F., "Design Characteristics of the K=800 Superconducting Cyclotron at M.S.U.," Cyclotron Laboratory, Michigan State University, East Lansing, Michigan 48824, *IEEE Transaction on Nuclear Science,* vol. NS-26, No. 2, Apr. 1979 (8 pages).
RetroSearch "Berkeley 88-Inch Cyclotron 'RF' or 'Frequency Control," Jan. 21, 2005 (36 pages).
RetroSearch "Berkeley 88-Inch Cyclotron," Jan. 24, 2005 (170 pages).
RetroSearch "Bernard Gottschalk, Cyclotron, Beams, Compensated Upstream Modulator, Compensated Scatter," Jan. 21, 2005 (20 pages).
RetroSearch "Cyclotron with 'RF' or 'Frequency Control," Jan. 21, 2005 (49 pages).
RetroSearch "Gottschalk, Bernard, Harvard Cyclotron Wheel", Jan. 21, 2005 (20 pages).
RetroSearch "Lorna Linda University Beam Compensation," Jan. 21, 2005 (60 pages).
RetroSearch "Lorna Linda University, Beam Compensation Foil Wedge," Jan. 21, 2005 (15 pages).
Rifuggiato, D., et al., "Status Report of the LNS Superconducting Cyclotron," *Nukleonika,* vol. 48, pp. S131-S134 (Supplement 2, 2003).
Rode, C.H. "Tevatron Cryogenic System," *Proceedings of the 12th International Conference on High-Energy Accelerators , Fermi/ab,* pp. 529-535 (Aug. 11-16, 1983).
Salzburger, H., et al., "Superconducting Synchrotron Magnets Supraleitende Synchrotronmagnete," *Siemens AG.,* Erlangen (West Germany). Abteilung Technische Physik, Report No. BMFT-FB-T-75-25, Oct. 1975, p. 147, Journal Announcement: GRAI7619; STAR1415, Subm-Sponsored by Bundesmin. Fuer Forsch. U. Technol. In German; English Summary.
Schillo, M., et al., "Compact Superconducting 250 MeV Proton Cyclotron for the PSI Proscan Proton Therapy Project," *Cyclotrons and Their Applications 2001, Sixteenth International Conference,* pp. 37-39 (2001).
Schneider et al., "Superconducting Cyclotrons," *IEEE Transactions on Magnetics,* vol. MAG-11, No. 2, Mar. 1975, pp. 443-446.
Schneider, R., et al., "Nevis Synchrocyclotron Conversion Program—RF System," *IEEE Transactions on Nuclear Science USA NS* 16(3) pp. 430-433 (Jun. 1969).
Schreuder, AN., et al., "The Non-orthogonal Fixed Beam Arrangement for the Second Proton Therapy Facility at the National Accelerator Centre," *Application of Accelerators in Research and Industry, American Institute of Physics, Proceedings of the Fifteenth International Conference,* Part Two, pp. 963-966 (Nov. 1998).
Schreuder, H.W. "Recent Developments in Superconducting Cyclotrons," *Proceedings of the 1995 Particle Accelerator Conference,* vol. 1, pp. 317-321 (May 1-5, 1995).
Schubert, J.R. And Blosser, H. "Conceptual Design of a High Field Ultra-Compact Cyclotron for Nuclear Physics Research," *Proceedings of the 1997 Particle Accelerator Conference,* vol. 1, pp. 1060-1062 (May 12-16, 1997).
Schubert, J. R. "Extending the Feasibility Boundary of the Isochronous Cyclotron" *Dissertation submitted to Michigan State University,* 1997, Abstract http://adsabs.harvard.edulabs/1998PhDT..... 147S.
Shelaev, I. A., et al., "Design Features of a Model Superconducting Synchrotron of JINR" *Proceedings of the 12th International Conference on High-energy Accelerators,* pp. 416-418 (Aug. 11-16, 1983).
Shintomi, T., et al., "Technology and Materials for the Superconducting Super Collider (SSC) Project," [Lang.: Japanese], *The Iron and Steel Institute of Japan 00211575,* vol. 78, No. 8 (19920801), pp. 1305-1313, http://ci.nii.ac.jp/naid/110001493249/eni , 1992.
Sisterson, J.M. "World Wide Proton Therapy Experience in 1997," *The American Institute of Physics, Applications of Accelerators in Research and Industry, Proceedings of the Fifteenth International Conference,* Part Two, pp. 959-962 (Nov. 1998).
Sisterson, J.M. "Clinical Use of Proton and Ion Beams From a World-Wide Perspective," *Nuclear Instruments and Methods in Physics Research,* Section B, Vols. 40-41, pp. 1350-1353 (1989).
Slater, J.M., et al., "Developing a Clinical Proton Accelerator Facility: Consortium-Assisted Technology Transfer," *Conference Record of the 1991 IEEE Particle Accelerator Conference: Accelerator Science and Technology,* vol. 1 , pp. 532-536 (May 6-9 1991).
Slater, J.M., et al., "Development of a Hospital-Based Proton Beam Treatment Center," *International Journal of Radiation Oncology Biology Physics,* vol. 14, No. 4, pp. 761-775 (Apr. 1988).
Smith, A, et al., "The Northeast Proton Therapy Center at Massachusetts General Hospital," *Journal of Brachytherapy International,* pp. 137-139 (Jan. 1997).
Snyder, S.L. And Marti, F. "Central Region Design Studies for a Proposed 250 MeV Proton Cyclotron," *Nuclear Instruments and Methods in Physics Research,* Section A, vol. 355, pp. 618-623 (1995).
Soga, F. "Progress of Particle Therapy in Japan," *Application of Accelerators in Research and Industry, American Institute of Physics, Sixteenth International Conference,* pp. 869-872 (Nov. 2000).
Spiller, P., et al., "The GSI Synchrotron Facility Proposal for Acceleration of High Intensity Ion and Proton Beams," *Proceedings of the 2003 Particle Accelerator Conference,* vol. 1, pp. 589 -591 (May 12-16, 2003).
Stanford, A.L., et al., "Method of Temperature Control in Microwave Ferroelectric Measurements," *Sperry Microwave Electronics Company,* Clearwater, Florida, Sep. 19, 1960 (1 page).
Superconducting Cyclotron Contract awarded by Paul Scherrer Institute (PSI), Villigen, Switzerland, http://www.accel.de/News/superconducting_cyclotron_contract.html (Feb. 3, 2005).
Tadashi, T., et al., "Large Superconducting Super Collider (SSC) In The Planning and Materials Technology," vol. 78, No. 8 (Aug. 1, 1992), pp. 1305-1313, *The Iron and Steel Institute of Japan 00211575.*
Takada, Y. "Conceptual Design of a Proton Rotating Gantry for Cancer Therapy," *Japanese Journal of Medical Physics,* vol. 15, No. 4, pp. 270-284 (1995).
Takada, Y. "A Review of Rotating Gantries for Heavy Charged Particle Therapy," *Symposium of Research Center for Charged Particle Therapy on Fundamental* Development of the Charged Particle Therapy, Chiba (Japan), Nov. 13-14, 2001.
Teng, L. C. "The Fermilab Tevatron," *Coral Gables 1981, Proceedings, Gauge Theories, Massive Neutrinos, and Proton Decay,* pp. 43-62 (1981).
UC Davis "Crocker Nuclear Laboratory Houses a Medium-Energy Particle Accelerator," *Crocker Nuclear Laboratory, University of California* (2009).
"The Cutting Edge of Cancer Therapy Using Proton Beams," *The Journal of Practical Pharmacy,* vol. 46, No. 1, pp. 97-103 (1995). [Japanese] (English Abstract).
"The K250 Proton therapy Cyclotron," National Superconducting Cyclotron Laboratory at Michigan State University (NSCL), retrieved from: http://www.nscl.msu.edu/tech/accelerators/k250.html (Feb. 2005).

(56) References Cited

OTHER PUBLICATIONS

"The K250 Proton-therapy Cyclotron Photo Illustration," National Superconducting Cyclotron Laboratory at Michigan State University (NSCL), retrieved from: http://www.nscl.msu.edu/tech/accelerators/k250photo.html (Feb. 2005).
"The K100 Neutron-therapy Cyclotron," National Superconducting Cyclotron Laboratory at Michigan State University (NSCL), retrieved from: http://www.nscl.msu.edu/tech/accelerators/k100.html (Feb. 2005).
Tobias, C.A., et al., "Pituitary Irradiation with High-Energy Proton Beams A Preliminary Report," *Cancer Research,* vol. 18, No. 2, pp. 121-134 (1958).
Tom, J.L. "The Use of Compact Cyclotrons for Producing Fast Neutrons for Therapy in a Rotatable Isocentric Gantry," *IEEE Transaction on Nuclear Science,* vol. 26, No. 2, pp. 2294-2298 (Apr. 1979).
Trinks, U., et al., "The Tritron: A Superconducting Separated-Orbit Cyclotron," *Nuclear Instruments and Methods in Physics Research,* Section A, vol. 244, pp. 273-282 (1986).
Tsuji, H. "The Future and Progress of Proton Beam Radiotherapy," *Journal of Japanese Society for Therapeutic Radiology and Oncology,* vol. 6, No. 2, pp. 63-76 (1994).
Tsuji, H., "Cancer Therapy Using Proton Beams: the Newest State of Affairs and Future Prospects," *Isotope News,* No. 9, pp. 2-7 (1992). (English Abstract).
UC Davis School of Medicine, "Unlikely Partners Turn Military Defense into Cancer Offense," Current Issue Summer 2008, Sacramento, California, pp. 1-2.
Umezawa, M., et al., "Beam Commissioning of the New Proton Therapy System for University of Tsukuba," *Proceedings of the 2001 Particle Accelerator Conference,* vol. 1, pp. 648-650 (Jun. 18-22, 2001).
van Steenbergen, A. "The CMS, a Cold Magnet Synchrotron to Upgrade the Proton Energy Range of the BNL Facility," *IEEE Transactions on Nuclear Science,* vol. 18, Issue 3, pp. 694-698 (Jun. 1971).
Vandeplassche, D., et al., "235 MeV Cyclotron for MHG's Northeast Proton Therapy Center (NPTC): Present Status," EPAC 96, *Fifth European Partical Accelerator Conference,* vol. 3, pp. 2650-2652 (Jun. 10-14, 1996).
Vorobiev, L.G., et al., "Concepts of a compact achromatic proton gantry with a wide scanning field," *Nuclear Instruments and Methods in Physics Research,* Section A, vol. 406, No. 2, pp. 307-310 (1998).
Vrenken, H., et al., "A Design of a Compact Gantry for Proton Therapy With 2D-Scanning," *Nuclear Instruments and Methods in Physics Research,* Section A, vol. 426, No. 2, pp. 618-624 (1999).
Wikipedia, "Cyclotron," http://en.wikipedia.org/wiki/Cyclotron (originally visited Oct. 6, 2005, revisited Jan. 28, 2009)(7 pages).
Wikipedia, "Synchrotron," http://en.wikiipedia.org/wiki/Synchrotron (originally visited Oct. 6, 2005, revisited Jan. 28, 2009)(7pages).
Wu, X., "Conceptual Design and Orbit Dynamics in a 250 MeV Superconducting Synchrocyclotron," *Ph.D. Dissertation, Michigan State University, Department of Physics and Astronomy* (1990).
York, R.C., et al., "Present Status and Future Possibilities at NSCL-MSU," *EPAC 94, Fourth European Particle Accelerator Conference,* pp. 554-556 (Jun. 1994).
York, R.C., et al., "The NSCL Coupled Cyclotron Project—Overview and Status," *Proceedings of the Fifteenth International Conference on Cyclotrons and their Applications,* pp. 687-691 (Jun. 1998).
Canadian Office action from Canadian application No. 2,629,333 issued May 11, 2011 (2 pages).
Canadian Office action from Canadian application No. 2,629,333 issued Aug. 30, 2010 (5 pages).
Chinese Office action from Chinese application No. 200680051421.0 issued Aug. 22, 2011 (4 pages).
Chinese Office action from Chinese application No. 200680051421.0 issued Mar. 21, 2011 (6 pages).
Chinese Office action from Chinese application No. 200680051421.0 issued Dec. 25, 2009 (8 pages).
Chinese Office Action from Chinese Application No. 200780102281.X issued Dec. 7, 2011 with English translation (23 pages).
Chinese Office action from Chinese application No. 200880125832.9, mailed Sep. 22, 2011 (11 pages).
Chinese Office action from Chinese application No. 200880125918.1, mailed Sep. 15, 2011 (111 pages).
European Patent Office communication for application No. 06838033.6, patent No. 1949404, mailed Aug. 5, 2009 (1 page).
European Patent Office communication from European application No. 07868958.5, mailed Jul. 16, 2010 (2 pages).
European Search Report from application No. EP 06838033.6 (PCT/US2006/044853) mailed May 11, 2009 (69 pages).
International Preliminary Report on Patentability for PCT application No. PCT/US2007/001506 mailed Jul. 5, 2007 (15 pages).
International Preliminary Report on Patentability for PCT/US2007/00 1628, mailed Apr. 22,2008 (15 pages).
International Preliminary Report on Patentability from PCT application No. PCT/US2008/084695, mailed Jun. 10, 2010 (10 pages).
International Preliminary Report on Patentability from PCT application No. PCT/US2008/084699, mailed Jun. 10, 2010 (8 pages).
International Preliminary Report on Patentability from PCT application No. PCT/US2007/086109, mailed Jun. 10, 2010 (7 pages).
International Search Report and Written Opinion for PCT application No. PCT/US2008/084695 mailed Jan. 26, 2009 (15 pages).
International Search Report and Written Opinion for PCT application No. PCT/US2007/001506 mailed Jul. 5, 2007, Publication No. WO 2007/084701, Published Jul. 26, 2007 (14 pages).
International Search Report and Written Opinion mailed Oct. 1, 2009 in PCT application No. PCT/US2008/077513 (73 pages).
International Search Report dated Aug. 26, 2008 in PCT application No. PCT/US2007/086109 (6 pages).
International Search Report for PCT/US2007/001628 mailed Feb. 18, 2008 (4 pages).
Invitation to Pay Additional Fees and, where applicable, Protest Fees with partial search report for application No. PCT/US2008/077513 mailed Jul. 3, 2009 (62 pages).
PCT application No. PCT/US2005/25942 filed on Jul. 21, 2005, with Publication No. WO 2006/012452, including copy of application as filed, transaction history from PAIR (PTO website).
PCT application No. PCT/US2006/44853, filed on Nov. 17, 2006, with Publication No. WO 2007/1061937, including copy of application as filed, transaction history from PAIR (PTO website).
PCT application No. PCT/US2007/01506 filed on Jan. 19, 2007, with Publication No. WO 2007/084701, including copy of application as filed, transaction history from PAIR (PTO website).
PCT application No. PCT/US2007/01628 filed on Jan. 19, 2007, with Publication No. WO 2007/1130164, including copy of application as filed, transaction history from PAIR (PTO website).
PCT application No. PCT/US2007/086109 filed on Nov. 30, 2007, including copy of application as filed, transaction history from PAIR (PTO website).
PCT application No. PCT/US2007177693 filed on Sep. 6, 2007 with Publication No. WO 2007/177693, including copy of application as filed, transaction history from PAIR (PTO website).
PCT application No. PCT/US2008/077513, filed on Sep. 24, 2008, including copy of application as filed, transaction history from PAIR (PTO website).
PCT application No. PCT/US2008/084695 filed on Nov. 25, 2008, including copy of application as filed, transaction history from PAIR (PTO website).
PCT International Preliminary Report on Patentability of corresponding PCT application No. PCT/US2006/044853, mailed May 29, 2008 (34 pages).
PCT International Search report and Written Opinion of PCT application No. PCT/US2006/044853, mailed Oct. 5, 2007 (10 pages).
Written Opinion dated Aug. 26, 2008 in PCT application No. PCT/US2007/086109 (6 pages).
Written Opinion for PCT/US2007/001628, mailed Feb. 18, 2008 (11 pages).
Dialog Search, Jan. 31, 2005 (18 pages).

(56) References Cited

OTHER PUBLICATIONS

European Communication from corresponding European application No. 11/65422.4 mailed Sep. 2, 2011 (5 pages).
European Communication from corresponding European application No. 11/65423.2 mailed Sep. 2, 2011 (5 pages).
European Communication from European application No. 06838033.6 mailed Apr. 20, 2010 (7 pages).
European Communication from European application No. 07868958.5, mailed Nov. 26, 2010 (50 pages).
European Patent Office communication from European application No. 08855024.9, mailed Jul. 30, 2010 (2 pages).
European Patent Office communication from European application No. 08856764.9, mailed Jul. 30, 2010 (2 pages).
European Search Report from corresponding European application No. 11165422.4 mailed Aug. 8, 2011 (118 pages).
European Search Report from corresponding European application No. 11165423.2 mailed Aug. 8, 2011 (118 pages).
Literature Author and Keyword Search, Feb. 14, 2005 (44 pages).
Literature Author and Keyword Searches (Synchrotron), Jan. 25, 2005 (78 pages).
Literature Keyword Search, Jan. 24, 2005 (96 pages).
Literature Search and Keyword Search for Synchrocyclotron, Jan. 25, 2005 (68 pages).
Literature Search by Company Name/Component Source, Jan. 24, 2005 (111 pages).
Literature Search, Jan. 26, 2005 (36 pages).
"Patent Assignee Search 'Paul Scherrer Institute," Library Services at Fish & Richardson P.C., Mar. 20, 2007 (40 pages).
"Patent Prior Art Search for 'Proton Therapy System'," Library Services at Fish & Richardson P.C., Mar. 20, 2007 (46 pages).
Response to Chinese Office action of Jan. 25, 2010 in Chinese application No. 200680051421.0, filed Jun. 24, 2010 (34 pages).
Response to European Communication of Apr. 20, 2010, from European application No. 06838033.6, filed Nov. 2, 2010 (13 pages).
Response to European Communication of Jul. 16, 2010 in European application No. 07868958.5 filed Aug. 26, 2010 (9 pages).
Response to European Communication of Nov. 26, 2010 in European application No. 07868958.5, filed Mar. 28, 2011 (9 pages).
Revised Patent Keyword Search, Jan. 25, 2005 (88 pages).
Voluntary amendment filed Apr. 18, 2011 in corresponding Chinese application No. CN200780102281.X, including English translation of claim amendments (10 pages).
Worldwide Patent Assignee Search, Jan. 24, 2005 (224 pages).
Worldwide Patent Keyword Search, Jan. 24, 2005 (94 pages).
Office Action and response history of U.S. Appl. No. 11/601,056 to Aug. 24, 2009.
Office Action and response history of U.S. Appl. No. 11/601,056 to Mar. 24, 2009.
Office Action and response history of U.S. Appl. No. 11/601,056 up to Jan. 14, 2010.
U.S. Appl. No. 10/949,734, filed on Sep. 24, 2004, Patent No. 7,208,748, issued on Apr. 24, 2007, including copy of application as filed, transaction history from PAIR (PTO website), and allowed claims.
U.S. Appl. No. 11/187,633, filed on Jul. 21, 2005, including copy of application as filed, transaction history from PAIR (PTO website), and pending claims.
U.S. Appl. No. 11/371,622, filed on Mar. 9, 2006, including copy of application as filed, transaction history from PAIR (PTO website), and pending claims.
U.S. Appl. No. 11/463,403, filed on Aug. 9, 2006, including copy of application as filed (including pending claims), transaction history from PAIR (PTO website).
U.S. Appl. No. 11/724,055, filed on Mar. 14, 2007, including copy of application as filed (including pending claims), transaction history from PAIR (PTO website).
U.S. Appl. No. 11/948,662, filed on Nov. 30, 2007, including copy of application as filed, transaction history from PAIR (PTO website), and pending claims.
U.S. Provisional Appl. No. 60/590,088, filed on Jul. 21, 2004, including copy of application as filed, transaction history from PAIR (PTO website).
U.S. Provisional Appl. No. 60/850,565, filed on Oct. 10, 2006, including copy of application as filed, transaction history from PAIR (PTO website).
U.S. Provisional Appl. No. 60/991,454, filed on Nov. 30, 2007, including copy of application as filed, transaction history from PAIR (PTO website).
U.S. Provisional Appl. No. 60/738,404, filed on Nov. 18, 2005, including copy of application as filed, transaction history from PAIR (PTO website).
U.S. Appl. No. 11/517,490, filed on Sep. 7, 2006, including copy of application as filed (including pending claims), transaction history from PAIR (PTO website).
U.S. Appl. No. 11/601,056, filed on Nov. 17, 2006, including copy of application as filed (including pending claims), transaction history from PAIR (PTO website).
U.S. Appl. No. 11/624,769, filed on Jan. 19, 2007, including copy of application as filed (including pending claims), transaction history from PAIR (PTO website).
U.S. Appl. No. 11/870,961, filed on Oct. 11, 2007, including copy of application as filed (including pending claims), transaction history from PAIR (PTO website).
U.S. Appl. No. 12/275,103, filed on Nov. 20, 2008, including copy of application as filed (including pending claims), transaction history from PAIR (PTO website).
Non Final Office Action from U.S. Appl. No. 12/275,103 mailed Feb. 1, 2011 (6 pages).
Non Final Office Action from U.S. Appl. No. 12/618,297 mailed May 13, 2011 (44 pages).
Office action from U.S. Appl. No. 11/948,662, mailed Oct. 14, 2011 (5 pages).
Response to Non Final Office Action issued Feb. 1, 2011 in U.S. Appl. No. 12/275,103 filed May 2, 2011 (13 pages).
Response to Office action mailed Oct. 14, 2011 from U.S. Appl. No. 11/648,662, filed Dec. 14, 2011 (12 pages).
Chinese Office action from Chinese application No. 200880125832.9, mailed Jun. 5, 2012. English Translation will follow upon receipt (5 pages).
International Search Report and Written Opinion of the International Searching Authority from International application No. PCT/US2008/084699, mailed Feb. 4, 2009 (11 pages).
U.S. Examiner EPHREM ALEMU, USPTO Non Final Office Action in U.S. Appl. No. 11/948,359, dated Aug. 20, 2010 (12 pages).
Fish & Richardson P.C., Response to Non Final Office action mailed Aug. 20, 2010 in U.S. Appl. No. 11/948,359, filed on Feb. 22, 2011 (17 pages).
Office action from corresponding Canadian Application No. 2,574,122 mailed Nov. 14, 2012 (6 pages).
Response in English of Office Action from Chinese application No. 200880125832.9 mailed Jun. 5, 2012, filed Oct. 12, 2012 (6 pages).
English translation of Chinese Office action from Chinese application No. 200880125832.9, mailed Jun. 5, 2012 (5 pages).
Response with English translation to Chinese Office Action from Chinese application No. 200880125832.9 issued Sep. 22, 2011, filed on Apr. 9, 2012 (23 pages).
Chinese Office action with English translation from Chinese Application No. 200880125832.9, issued Mar. 4, 2013 (8 pages).
Blosser, H. et al, "Progress Toward an Experiment to Study the Effect of RF Grounding in an Internal Ion Source on Axial Oscillations of the Beam in a Cyclotron", Cyclotrons and Their Applications 2001, 16th International Conference, 2001 American Institute of Physics, Belgium and Michigan, USA, pp. 274-276 (2001).
Flanz, et al., "Operation of a Cyclotron Based Proton Therapy Facility", Massachusetts General Hospital, Boston, MA 02114, pp. 1-4, retrieved from Internet in 2009.
Krevet, et al, "Design of a Strongly Curved Superconducting Bending Magnet for a Compact Synchrotron Light Source", Advances in Cryogenic Engineering, vol. 33, pp. 25-32 (Dec. 3, 1988).

(56) References Cited

OTHER PUBLICATIONS

Lawrence, J.H., et al., "Treatment of Pituitary Tumors With Heavy Particles", *Diagnosis and Treatment of Pituitary Tumors,* pp. 253-262 (1970).
Toyoda, E., "Proton Therapy System", Sumitomo Heavy Industries, Ltd. (2004).
Source Search Cites of U.S. and Foreign Patents/Published applications in the name of Mitsubishi Denki Kabushiki Kaisha and Containing the Keywords (Proton and Synchrocyclotron), 8 pages (2009).
Flanz, et al., "Scanning Beam Technologies", PTCOG 2008, 28 pages.
Gordon et al., "Design Study for a Compact 200 MeV Cyclotron" AIP Conference Proceedings Sixth International Cyclotron Conference, 1972, No. 9:78-86.
Gordon, "Extraction Studies fo a 250 MeV Superconducting Synchrocyclotron," Proceedings of the 1987 IEEE Particle Accelerator Conference: Accelerator Engineering an Technology, 1987, pp. 1255-1257.
Renner et al., "Preliminary Results of a Raster Scanning Beam Delivery System", IEEE, 1989, 3 pages.
Single Room Proton Therapy Facility, ACCEL, Oct. 2006, 1 page.
Timmer, "The ACCEL Single Room Proton Therapy Facility" ACCEL Instruments GmbH, PTCOG 45, Oct. 2006, Houston, Texas, 18 pages.
Non-Final Office Action with English translation from Japanese Patent Office 2010-536131, Jun. 4, 2013, 10 pages JP action first cited and filed with USPTO on Jun. 13, 2012.
Office action issued in Taiwan IPO Pat. Application No. 097138794, recieved Feb. 8, 2012, 7 pages.
Response to Chinese Office Action from Corresponding Chinese application No. 200880125832.9, issued Sep. 22, 2011, filed on Apr. 9, 2012, 23 pages (with English translation).
Response to Chinese Patent application No. 200880125832.9 office action filed May 20, 2013, 6 pages.
Response to Office action from Canadian Application No. 2,574,122 mailed Nov. 14, 2012, filed May 13, 2013, 32 pages.
"Beam Delivery and Properties," Journal of the ICRU , 2007, 7(2):20 pages.
"510(k) Summary: Ion Beam Applications S.A.", FDA, Jul. 12, 2001, 5 pages.
"510(k) Summary: Optivus Proton Beam Therapy System", Jul. 21, 2000, 5 page.
"An Accelerated Collaboration Meets with Beaming Success," Lawrence Livermore National Laboratory, Apr. 12, 2006, S&TR, Livermore, California, pp. 1-3, http://www.llnl.gov/April06/Caporaso.html.
"Indiana's mega-million proton therapy cancer center welcomes first patients"[online] Press release, Health & Medicine Week, 2004, retrieved from NewsRx.com, Mar. 1, 2004, pp. 119-120.
"LLNL, UC Davis Team UP to Fight Cancer," Lawrence Livermore National Laboratory, Apr. 28, 2006, SF-06-04-02, Livermore, California, pp. 1-4.
"Patent Assignee Search 'Pau; Scherrer Institute," Library Services at Fish & Richardson P.C., Mar. 20, 2007, 40 pages.
"Superconducting Cyclotron Contract" awarded by Paul Scherrer Institute (PSI), Villigen, Switzerland, http://www.accel.de/News/superconducting_cyclotron_contract.htm, Jan. 2009, 1 page.
"The Davis 76-Inch Isochronous Cyclotron", Beam On: Crocker Nuclear Laboratory, University of California, 2009, 1 page.
"The K100 Neutron-therapy Cyclotron," National Superconducting Cyclotron Laboratory at Michigan State University (NSCL), retrieved from: http://www.nscl.msu.edu/tech/accelerators/k100, Feb. 2005, 1 page.
"The K250 Proton therapy Cyclotron," National Superconducting Cyclotron Laboratory at Michigan State University (NSCL), retrieved from: http://www.nscl.msu.edu/tech/accelerators/k250.html, Feb. 2005, 2 pages.
"The K250 Proton-therapy Cyclotron Photo Illustration," National Superconducting Cyclotron Laboratory at Michigan State University (NSCL), retrieved from: http://www.nscl.msu.edu/media/image/experimental-equipment-technology/250.html, Feb. 2005, 2 pages.
Abrosimov et al., "1000MeV Proton Beam Therapy Facility at Petersburg Nuclear Physics Institute Synchrocyclotron," Medical Radiology (Moscow) 32, 10 (1987) revised in Journal of Physics, Conference Series 41, 2006, pp. 424-432, Institute of Physics Publishing Limited.
Adachi et al., "A 150MeV FFAG Synchrotron with Return-Yoke Free Magent," *Proceedings of the 2001 Particle Accelerator Conference,* Chicago, 2001, 3 pages.
Ageyev et al., "The IHEP Accelerating and Storage Complex (UNK) Status Report," *11th International Conference on High-nergy Accelerators,* 1980, pp. 60-70.
Agosteo et al., "Maze Design of a gantry room for proton therapy," *Nuclear Instruments & Methods In Physics Research,* 1996, Section A, 382, pp. 573-582.
Alexeev et al., "R4 Design of Superconducting Magents for Proton Synchrotrons," *Proceedings of the Fifth International Cryogenic Engineering Conference,* 1974, pp. 531-533.
Allardyce et al., "Performance and Prospects o the Reconstructed CERN 600 MeV Synchrocyclotron," *IEEE Transactions on Nuclear Science USA,* Jun. 1977, ns-24:(3)1631-1633.
Alonso, "Magnetically Scanned Ion Beams for Radiation Therapy," Accelerator & Fusion Research Division, Lawrence Berkeley Laboratory, Berkeley, CA, Oct. 1988, 13 pages.
Amaldi et al., "The Italian project for a hadrontherapy centre" *Nuclear Instruments and Methods in Physics Research A,* 1995, 360, pp. 297-301.
Amaldi, "Overview of the world landscape of Hadrontherapy and the projects of the TERA foundation," Physica Medica, An International journal Devoted to the Applications of Physics to Medicine and Biology, Jul. 1998, vol. XIV, Supplement 1, 6th Workshop on Heavy Charged Particles in Biology and Medicine, Instituto Scientific Europeo (ISE), Sep. 29-Oct. 1, 1977, Baveno, pp. 76-85.
Anferov et al., "Status of the Midwest Proton Radiotherapy Institute," Proceedings of the 2003 particle Accelerator Conference, 2003, pp. 699-701.
Anferov et al., "The Indiana University Midwest Proton Radiation Institute," Proceedings of the 2001 Particle Accelerator Conference, 2001, Chicago, pp. 645-647.
Appun, "Various problems of magnet fabrication for high-energy accelerators," *Journal for All Engineers Interested in the Nuclear Field,* 1967, pp. 10-16 (1967) [Lang.: German], English bibliographic information (http://www.osti.gov/energycitations/product.biblio.jsp?osti_id=4442292).
Arduini et al. "Physical specification of clinical proton beams from a synchrotron," Med. Phys, Jun. 1996, 23 (6): 939-951.
Badano et al., "Proton-Ion Medical Machine Study (PIMMS) Part I," PIMMS, Jan. 1999, 238 pages.
Beeckman et al., "Preliminary design of a reduced cost proton therapy facility using a compact, high field isochronous cyclotron," *Nuclear Instruments and Methods in Physics Reasearch B56/57,* 1991, pp. 1201-1204.
Bellomo et al., "The Superconducting Cyclotron Program at Michigan State University," *Bulletin of the American Physical Society,*Sep. 1980, 25(7):767.
Benedikt an Carli, "Matching to Gantries for Medical Synchrotrons" *IEEE Proceedings of the 1997 Particle Accelerator Conference,* 1997, pp. 1379-1381.
Bieth et al., "A Very Compact Protontherapy Facility Based on an Extensive Use of High Temperature Superconductors (HTS)" *Cyclotrons and their Applications 1998,* Proceedings o the Fifteenth International Conference on Cyclotrons an their Applications, Caen, Jun. 14-19, 1998, pp. 669-672.
Bigham, "Magnetic Trim Rods for Superconducting Cyclotrons," Nuclear Instruments and Methods (North-Holland Publishing Co.), 1975, 141:223-228.
Bimbot, "First Studies of the External Beam from the Orsay S.C. 200 MeV," Institut de Physique Nucleaire, BP 1, Orsay France, *IEEE,* 1979, pp. 1923-1926.
Blackmore et al., "Operation of the Triumf Proton Therapy Facility," *IEEE Proceedings of the 1997 Particle Accelerator Conferenc,* May 12-16, 19973:3831-3833.

(56) References Cited

OTHER PUBLICATIONS

Bloch,"The Midwest Proton Therapy Center," Application of Accelerators in Research and Industry, Proceedings of the Fourteenth Int'l. Conf., Part Two, Nov. 1996, pp. 1253-1255.
Blosser et al., "Problems and Accomplishments of Superconducting Cyclotrons," Proceeding of the 14th International Conference, Cyclotrons and Their Applications, Oct. 1995, pp. 674-684.
Blosser et al., "Superconducting Cyclotrons", Seventh International Conference on Cylotrons and their Applications, Aug. 19-22, 1975, pp. 584-594.
Blosser et al., "Progress toward an experiment to study the effect of RF grounding in an internal ion source on axial oscillations o the beam in a cyclotron," National Superconducting Cyclotron Laboratory, Michigan State University, Report MSUCL-760, CP600, Cyclotrons and their Applications 2011, Sixteenth International Conference, 2001, pp. 274-276.
Blosser et al., "A Compact Superconducting Cyclotron for the Production of High Intensity Protons," Proceedings of the 1997 Particle Accelerator Conference, May 12-16, 1997, 1:1054-1056.
Blosser et al., "Advances in Superconducting Cyclotrons at Michigan State University," Proceedings of the 11th International Conference on Cyclotrons and their Applications, Oct. 1986, pp. 157-167, Tokyo.
Blosser et al., "Characteristics of a 400 (Q2/A) MeV Super-Conducting Heavy-Ion Cyclotron," Bulletin of the American Physical Society, Oct. 1974, p. 1026.
Blosser et al., "Medical Accelerator Projects at Michigan State Univ." IEEE Proceedings of the 1989 Particle Accelerator Conference, Mar. 20-23, 1989, 2:742-746.
Blosser et al., "Superconducting Cyclotron for Medical Application", *IEEE Transactions on Magnetics,* Mar. 1989, 25(2): 1746-1754.
Blosser, "Application of Superconductivity in Cyclotron Construction," *Ninth International Conference on Cyclotrons and their Applications,* Sep. 1981, pp.147-157.
Blosser, "Applications of Superconducting Cyclotrons," Twelfth International Conference on Cyclotrons and Their Applications, May 8-12, 1989, pp. 137-144.
Blosser, "Future Cyclotron," AIP, *The Sixth International Cyclotron Conference,* 1972, pp. 16-32.
Blosser, "Medical Cyclotrons," *Physics Today,* Special Issue Physical Review Centenary, Oct. 1993, pp. 70-73.
Blosser, "Preliminary Design Study Exploring Building Features Required for a Proton therapy Facility for the Ontario Cancer Institute", Mar. 1991, MSUCL-760a, 53 pages.
Blosser, "Progress on the Coupled Superconducting Cyclotron Project," *Bulletin of the American Physical Society,* Apr. 1981, 26(4):558.
Blosser, "Synchrocyclotron Improvement Programs," *IEEE Transactions on Nuclear Science USA,* Jun. 1969, 16(3):Part I, pp. 405-414.
Blosser, "The Michigan State University Superconducting Cyclotron Program," *Nuclear Science,* Apr. 1979, NS-26(2):2040-2047.
Blosser, H., Present and Future Superconducting Cyclotrons, *Bulletin of the American Physical Society,* Feb. 1987, 32(2):171 Partical Accelerator Conference, Washington, D.C.
Blosser, H.G., "Superconducting Cyclotrons at Michigan State Univesity", Nuclear Instruments & Methods in Physics Research, 1987, vol. B 24/25, part II, pp. 752-756.
Botha et al., "A New Multidisciplinary Separated-Sector Cyclotron Facility," *IEEE Transactions on Nuclear Science,* 1977, NS-24(3):1118-1120.
Canadian Office action issued in Canadian application No. 2,629,333 issued Aug. 30, 2010, 5 pages.
Chichili et al., "Fabrication of Nb3Sn Shell-Type Coils with Pre-Preg Ceramic Insulation," American Institute of Physics Conference Proceedings, AIP USA, No. 711, (XP-002436709, ISSN:0094-243X), 2004, pp. 450-457.
Chinese Office action from Corresponding Chinese application No. 200880125832.9, mailed Jun. 5, 2012, 6 pages.
Chinese Office Action issued in Chinese Application No. 200780102281.X, dated Dec. 7, 2011, 23 pages (with English translation).
Chinese Office action issued in Chinese application No. 200880125832.9, dated Sep. 22, 2011, 111 pages.
Chinese Office action issued in Chinese application No. 200880125918.1, dated Sep. 15, 2011, 111 pages.
Chong et al., Radiology Clinic North American 7, 3319, 1969, 27 pages.
Chu et al., "Performance Specifications for Proton Medical Facility," Lawrence Berkeley Laboratory, University of California, Mar. 1993, 128 pages.
Chu et al., "Instrumentation for Treatment of Cancer Using Proton and Light-ion Beams," Review of Scientific Instruments, Aug. 1993, 64 (8):2055-2122.
Chu, "Instrumentation in Medical Systems," Accelerator an Fusion Research Division, Lawrence Berkeley Laboratory, University of California, Berkeley, CA, May 1995, 9 pages.
Cole et al., "Design and Application of a Proton Therapy Accelerator," Fermi National Accelerator Laboratory, *IEEE,* 1985, 5 pages.
Collins, et al., "The Indiana University Proton Therapy Systems," Proceedings of EPAC 2006, Edinburgh, Scotland, 2006, 3 pages.
Conradi et al., "Proposed New Facilities fo Proton Therapy at iThemba Labs," *Proceedings of EPAC,* 2002, pp. 560-562.
Source Search "Cites of U.S. and Foreign Patents/Published applications in the name of Mitsubishi Denki Kabushiki Kaisha and Containing the Keywords (Proton and Synchrocyclotron)," Jan. 2005, 8 pages.
Cosgrove et al., "Microdosimetric Studies on the Orsay Proton Synchrocyclotron at73 and 200 MeV," Radiation Protection Dosimetry, 1997, 70(1-4):493-496.
Coupland, "High-field (5 T) pulsed superconducting dipole magnet," Proceedings of the Institution of Electrical Engineers, Jul. 1974, 121(7):771-778.
Coutrakon et al., "Proton Synchrotrons for Cancer Therapy," Application of Accelerators in Research and Industry—Sixteenth International Conf., American Institute of Physics, Nov. 1-5, 2000, vol. 576, pages 861-864.
Coutrakon et al., "A Prototype beam delivery system for the proton medical accelerator at Loma Linda," *Medical Physics,* Nov./Dec. 1991, 18(6):1093-1099.
Cuttone, "Applications of a Particle Accelerators in Medical Physics," Istituto Nazionale di Fisica Nucleare-Laboratori Nazionali del Sud, V.S. Sofia, 44 Cantania, Italy, Jan. 2010, 17 pages.
Dahl P, "Superconducting Magnet System," Amerian Institute of Physics, AIP Conference Proceedings, 1987-1988, 2: 1329-1376.
Dialog Search, Jan. 31, 2005, 17 pages.
Dugan et al., "Tevatron Status" IEEE, Particle Accelerator Conference, Accelerator Science & Technology, 1989, pp. 426-430.
Eickhoff et al., "The Proposed Accelerator Facility for Light Ion Cancer Therapy in Heidelberg," Proceedings of the 1999 Particle Accelerator Conference, New York, 1999, pp. 2513-2515.
Enchevich et al., "Minimizing Phase Losses in the 680 MeV Synchrocyclotron by Correcting the Accelerating Voltage Amplitude," *Atomnaya Energiya,* 1969, 26:(3):315-316.
Endo et al., "Compact Proton an Carbon Ion Synchrotrons for Radiation Therapy," Proceedings of EPAC 2002, Paris France, 2002, pp. 2733-2735.
European Communication issued in corresponding European application No. 11165422.4, dated Sep. 2, 2011, 5 pages.
European Communication issued in European application No. 07868958.5, dated Nov. 26, 2010, 50 pages.
European Patent Office communication issued in European application No. 08856764.9, dated Jul. 30, 2010, 2 pages.
European Patent Office communication issued in European application No. 07868958.5, dated Jul. 16, 2010, 2 pages.
European Search Report issued in European Application No. 11165423.2, dated Aug. 8, 2011, 118 pages.
Flanz et al., "Treating Patients with the NPTC Accelerator Based Proton Treatment Facility," Proceedings of the 2003 Particle Accelerator Conference, 2003, pp. 690-693.
Flanz et al., "Large Medical Gantries," Particle Accelerator Conference, Massachusetts General Hospital, 1995, pp. 1-5.

(56) References Cited

OTHER PUBLICATIONS

Flanz et al., "The Northeast Proton Therapy Center at Massachusetts General Hospital," fifth Workshop on Heavy Charge Particle in Biology and Medicine, GSI, Darmstadt, Aug. 1995, 11 pages.
Flood and Frazier,. "The Wide-Band Driven RF System for the Berkeley 88-Inch Cyclotron," American Institute of Physics, Conference Proceedings., No. 9, 1972, 459-466.
Foster and Kashikhin, "Superconducting Superferric Dipole Magent with Cold Iron Core for the VLHC," *IEEE Transactions on Applied Superconductivity,* Mar. 2002, 12(1):111-115.
Friesel et al., "Design and Construction Progress on the IUCF Midwest Proton Radiation Institute," Proceedings of EPAC 2002, 2002, pp. 2736-2738.
Fukumoto et al., "A Proton Therapy Facility Plan" Cyclotron and their Applications, Proceedings of the 13th Intenational Conference, Vancouver, Canada, Jul. 6-10, 1992, pp. 258-261.
Goto et al., "Progress on the Sector Magnets for the Riken SRC," American Institute of Physics, CP600, Cyclotrons and Their Applications 2001, Sixteenth International Conference, 2001, pp. 319-323.
Graffman et al., "Design Studies for a 200 MeV Proton Clinic Radiotherapy," AIP Conference Proceedings: Cyclotrons—1972, 1972, No. 9, pp. 603-615.
Graffman et al., *Acta Radiol. Therapy Phys. Biol.* 1970, 9, 1 (1970).
Graffman, et al. "Proton radiotherapy with the Uppsala cyclotron. Experience and plans" *Strahlentherapie,* 1985, 161(12):764-770.
Hede, "Research Groups Promoting Proton Therapy Lite," Journal of the National Cancer Institute, Dec. 6, 2006, 98(23):1682-1684.
Heinz, "superconducting Pulsed Magnetic Systems for High-Energy Synchrotrons," *Proceedings o th Fourth International Cryogenic Engineering Conference,* May 24-26, 1972, pp. 55-63.
Hentschel et al., "Plans for the German National Neutron Therapy Centre with a Hospital-Based 70 MeV Proton Cyclotron at University Hospital Essen/Germany," Cyclotrons and their Applications, Caen, Franco, Jun. 14-19, 1998, pp. 21-23.
Hepburn et al., "Superconducting Cyclotron Neutron Source for Therapy," *International Journal o Radiation Oncology Biology Physics,* vol. 3 complete, 1977, pp. 387-391.
Hirabayashi, "Development of Superconducting Magnets for Beam Lines and Accelerator at KEK," *IEEE Transactionon Magnetics,* Jan. 1981, Mag-17(1):728-731.
International Preliminary Report on Patentability issued in PCT Application No. PCT/US2008/084695, dated Jun. 10, 2010, 10 pages.
International Preliminary Report on Patentability issued in PCT Application No. PCT/US2008/084699, dated Jun. 10, 2010, 8 pages.
International Preliminary Report on Patentability issued in PCT Application No. PCT/US2007/086109, dated Jun. 10, 2010, 7 pages.
International Preliminary Report on Patentability in Internation Application No. PCT/US2006/44853, dated May 29, 2008, 8 pages.
International Preliminary Report on Patentability in Internation Application No. PCT/US2007/001506, dated Jul. 5, 2007, 15 pages.
International Preliminary Report on Patentability in Internation Application No. PCT/US2007/001628, dated Apr. 22, 2008, 15 pages.
International Search Report and Written Opinion in International Application No. PCT/US2006/44853, dated Oct. 5, 2007, 3 pages.
International Search Report and Written Opinion in International Application No. PCT/US2007/001506, dated Jul. 5, 2007, Publication No. WO2007/084701, Published Jul. 26, 2007, 14 pages.
International Preliminary Report on Patentability on International Application No. PCT/US2008/077513, dated Apr. 22, 2010.
International Search Report and Written Opinion in International Application No. PCT/US2008/077513, dated Oct. 1, 2009, 73 pages.
International Search Report and Written Opinion in International Application No. PCT/US2008/084695, dated Jan. 26, 2009, 15 pages.
International Search Report in International Application No. PCT/US2007/001628, dated Feb. 18, 2008, 4 pages.
International Search Report and Written Opinion in International Application No. PCT/US2007/086109, dated Aug. 26, 2008, 6 pages.
International Search Report and Written Opinion in International Application No. PCT/US2008/084699, dated Feb. 4, 2009, 11 pages.
Ishibashi an McInturff, "Winding Design Study of Superconducting 10 T Dipoles for a Synchrotron," *IEEE Transactions on Magnetics,* MAG-19(3):1364-1367.
Ishibashi and McInturff, "Stress Analysis of Superconducting 10T Magnets fo Synchrotron," Proceedings of the Ninth International Cryogenic Engineering Conference, May 11-14, 1982, pp. 513-516.
Jahnke et al., "First Superconducting Prototype Magnets for a Compact Synchrotron Radiation Source in Operation," *IEEE Transactions on Magnetics,* Mar. 1988, 24(2):1230-1232.
Jones and Dershem, "Synchrotron Radiation from Proton in a 20 TEV, 10 TESLA Superconducting Super Collide," *Procedings of the 12th International Conference on High-Energy Accelerator,* Aug. 11-16, 1983, pp. 138-140.
Jones and Mills, "The South African National Accelerator Centre: Particle Therapy an Isotope Production Programmes," *Radiation Physics and Chemistry,* Apr.-Jun. 1998, 51(4-6):571-578.
Jones et al., "Status Report of the NAC Particle Therapy Programme," *Stralentherapie und Onkologie,* vol. 175, Suppl. II, Jun. 1999, pp. 30-32.
Jones, "Progress with the 200 MeV Cyclotron Facility at the National Accelerator Centre," Commission of the European Communities Radiation Protection Procedings, fifth Symposium on Neuton Dosimetry, Sep. 17-21, 1984, vol. II, pp. 989-998.
Jones "Present Status and Future Trends of Heavy Particle Radiotherapy," Cyclotrons and their Applications 1998, Proceedings of the Fifteenth International Conference on Cyclotrons and their Applications, Jun. 14-19, 1998, pp. 13-20.
Jongen et al., "Development of a Low-cost Compact Cyclotron System for Proton Therapy," *National Institute of Radiol. Sci, 1991,* No. 81, pp. 189-200.
Jongen et al., "Progress report on the IBA-SHI small cyclotron for cancer therapy" *Nuclear Instruments and Methods in Physics Research,* Section B, vol. 79, issue 1-4, 1993, pp. 885-889.
Jongent et al., "The Proton therapy system for the NPTC: Equipment Description and Progress report," *Nuclear Instruments and methods in physics research,* 1996, Section B, 113(1): 522-525.
Jongen et al., "The proton therapy system for MGH's NPTC: equipment description and progress report," *Bulletin du Cancer/Radiotherapie, Proceedings of the meeting of the European Heavy Particle Therapy Group,* 1996, 83 (Suppl. 1):219-222.
Kanai et al., "Three-dimensional Beam Scanning for Proton Therapy," Nuclear Instruments and Methods on Physic Research, Sep. 1, 1983, The Netherlands, 214(23):491-496.
Karlin et al., "Medical Radiology" (Moscow), 1983, 28, 13.
Karlin et al., "The State and Prospects in the Development of the Medical Proton Tract on the Synchrocyclotron in Gatchina," Med. Radiol., Moscow, 28(3):28-32 (Mar. 1983) (German with English Abstract on end of page 32).
Kats and Druzhinin, "Camparison of Methods for Irradiation Prone Patients," *Atomic Energy,* Feb. 2003, 94(2):120-123.
Kats and Onosovskii, "A Simple, Compact, Flat System for the Irradiation of a Lying Patient with a Proton Beam from Different Direction," *Instruments an Experimental Techniques,* 1996, 39(1):132-134.
Kats and Onosovskii, "A Planar Magnetooptical Systems for the Irradiation of a Lying Patient with a Proton Beam from Various Directions," *Instruments and Experimental Techniques,* 1996, 39(1):127-131.
Khoroshkov et al., "Moscow Hospital-Based Proton Therapy Facility Design," *Am. Journal Clinical Oncology: CCT,* Apr. 1994, 17(2):109-114.
Kim and Blosser, "Optimized Magnet for a 250 MeV Proton Radiotherapy Cyclotron," Cyclotrons an Their Applications 2001, May 2001, *Sixteenth International Conference,* pp. 345-347.

(56) References Cited

OTHER PUBLICATIONS

Kim and Yun, "A Light-Ion Superconducting Cyclotron System for Multi-Disciplinary Users," *Journal of the Korean Physical Society,* Sep. 2003, 43(3):325-331.
Kim et al., "Construction of 8T Magnet Test Stand for Cyclotron Studies," *IEEE Transactions on Applied Superconductivity,* Mar. 1993, 3(1):266-268.
Kim et al., "Design Study of a Superconducting Cyclotron for Heavy Ion Therapy," *Cyclotrons and Their Applications 2001, Sixteenth International Conference,* May 13-17, 2001, pp. 324-326.
Kim et al., "Trim Coil System for the Riken Cyclotron Ring Cyclotron," *Proceedings of the 1997 Particle Accelerator Conference, IEEE,* Dec. 1981, vol. 3, pp. 214-235 OR 3422-3424, 1998.
Kim, "An Eight Tesla Superconducting Magnet for Cyclotron Studies," Ph.D. Dissertation, Michigan State University, Department of Physics and Astronomy, 1994, 138 pages.
Kimstrand, "Beam Modelling for Treatment Planning of Scanned Proton Beams," Digital Comprehensive Summaries of Uppsala dissertations for the Faculty of Medicine 330, Uppsala Universitet, 2008, 58 pages.
Kishida and Yano, "Beam Transport System for the RIKEN SSC (II)," *Scientific Papers of the Institute of Physical and Chemical Research,* Dec. 1981, 75(4):214-235.
Koehler et al., "Range Modulators for Protons and Heavy Ions," *Nuclear Instruments and Methods,* 1975, vol. 131, pp. 437-440.
Koto and Tsujii, "Future of Partical Therapy," *Japanese Journal of Cancer Clinics, 2001, 47(1):95-98* [*Lang.:Japanese*], *English Abstract* (http://sciencelinks.jp/j-east/article/200206/000020020601A0511453.php).
Kraft et al., "Hadrontherapy in Oncology," U. Amaldi and Larrsson, editors Elsevier Science, 1994, 390 pages.
Krevet et al., "Design of a Strongly Curved Superconducting Bending Magnet for a Compact Synchrotron Light Source," *Advances in Cryogenic Engineering,* 1988, vol. 33, pp. 25-32.
Laisne et al., "The Orsay 200 MeV Synchrocyclotron," *IEEE Transactions on Nuclear Science,* Apr. 1979, NS-26(2):1919-1922.
Larsson et al., Nature 1958 , 182:1222.
Larsson, "Biomedical Program for the Converted 200-MeV Synchrocyclotron at the Gustaf Werner Institute," *Radiation Research,* 1985, 104:S310-S318.
Lawrence et al., "Heavy particles in acromegaly and Cushing's Disease," in Endocrine and Norendocrine Hormone Producing Tumors (Year Book Medical Chicago, 1973, pp. 29-61.
Lawrence et al., "Successful Treatment of Acromegaly: Metabolic and Clinical Studies in 145 Patients," *The Journal of Clinical Endocrinology and Metabolism,* Aug. 1970, 31(2), 21 pages.
Lawrence et al., "Treatment of Pituitary Tumors," (Excerpta medica, Amsterdam/American Elsevier, New York, 1973, pp. 253-262.
Lawrence, Cancer, 1957, 10:795.
Lecroy et al., "Viewing Probe for High Voltage Pulses," *Review of Scientific Instruments USA, Dec. 1960,* 31(12):1354.
Lin et al., "Principles and 10 Year Experience of the Beam Monitor System at the PSI Scanned Proton Therapy Facility", Center for Proton Radiation Therapy, Paul Scherrer Institute, CH-5232, Villigen PSI, Switzerland, 2007, 21 pages.
Linfoot et al., "Acromegaly," in Hormonal Proteins and Peptides, edited by C.H. Li, 1975, pp. 191-246.
Literature Keyword Search, Jan. 24, 2005, 98 pages.
Livingston et al., "A Capillary ion source for the cyclotron," *Review Science Instruments,* Feb. 1939, 10:63.
Mandrillon, "High Energy Medical Accelerators," *EPAC 90, 2nd European Particle Accelerator Conference,* Jun. 12-16, 1990, 2:54-58.
Marchand et al., "IBA Proton Pencil Beam Scanning: an Innovative Solution for Cancer Treatment," Proceedings of EPAC 2000, Vienna, Austria, 3 pages.
Marti et al., "High Intensity Opeation of a Superconducting Cyclotron," *Proceedings of the 14the International Conference, Cyclotrons and Their Applications,* Oct. 1995, pp. 45-48 (Oct. 1995).
Martin, "Operational Experience with Superconducting Synchrotron Magnets" *Proceedings of the 1987 IEEE Particle Accelerator Conference,* Mar. 16-19, 1987, vol. 3 of 3:1379-1382.
Meote et al., "ETOILE Hadrontherapy Project, Review of Design Studies" *Proceedings of EPAC 2002,* 2002, pp. 2745-2747.
Miyamoto et al., "Development of the Proton Therapy System," *The Hitachi Hyoron,* 79(10):775-779 (1997) [Lang: Japanese], English abstract (http://www.hitachi.com/rev/1998/revfeb98/rev4706.htm).
Montelius et al., "The Narrow Proton Beam Therapy Unit at the Svedberg Laboratory in Uppsala," *ACTA Oncologica,* 1991, 30:739-745.
Moser et al., "Nonlinear Beam Optics with Real Fields in Compact Storage Rings," Nuclear Instruments & Methods in Physics Research/Section B, B30, Feb. 1988, No. 1, pp. 105-109.
Moyers et al., "A Continuously Variable Thickness Scatterer for Proton Beams Using Self-compensating Dual Linear Wedges" Lorna Linda University Medical Center, Dept. of Radiation Medicine, Lorna Linda, CA, Nov. 2, 1992, 21 pages.
*National Cancer Institute Funding (Senate-Sep. 12, 1992)* (www.thomas.loc.gov/cgi-bin/query/z?r102:S21SE2-712 (2 pages).
Nicholson, "Applications of Proton Beam Therapy," *Journal of the American Society of Radiologic Technologists,* May/Jun. 1996, 67(5): 439-441.
Nolen et al., "The Integrated Cryogenic—Superconducting Beam Transport System Planned for MSU," *Proceedings of the 12th International Conference on High-Energy Accelerators,* Aug. 1983, pp. 549-551.
Norimine et al., "A Design of a Rotating Gantry with Easy Steering for Proton Therapy," *Proceedings of EPAC 2002,* 2002, pp. 2751-2753.
Ogino, Takashi, "Heavy Charged Particle Radiotherapy-Proton Beam", Division of Radiation Oncology, National Cancer Hospital East, Kashiwa, Japan, Dec. 2003, 7 pages.
Okumura et al., "Overview and Future Prospect of Proton Radiotherapy," *Japanese Journal of Cancer Clinics,* 1997, 43(2):209-214 [Lang.: Japanese].
Okumura et al., "Proton Radiotherapy" *Japanese Journal of Cancer and Chemotherapy,* 1993, 10. 20(14):2149-2155 [Lang.: Japanese].
Outstanding from Search Reports, "Accelerator of Polarized Portons at Fermilab," 2005, 20 pages.
Paganetti et al., "Proton Beam Radiotherapy—The State of the Art," Springer Verlag, Hidelberg, ISBN 3-540-00321-5, Oct. 2005, 36 pages.
Palmer and Tollestrup, "Superconducting Magnet Technology for Accelerators," *Annual Review of Nuclear and Particle Science,* 1984, vol. 34, pp. 247-284.
Patent Assignee and Keyword Searches for Synchrocyclotron, Jan. 25, 2005, 78 pages.
Pavlovic, "Beam-optics study of the gantry beam delivery system for light-ion cancer therapy," *Nuclear Instruments and Methods in Physics Research,* Section A, Nov. 1997, 399(2):439-454(16).
Pedroni and Enge, "Beam optics design of compact gantry for proton therapy" *Medical & Biological Engineering & Computing,* May 1995, 33(3):271-277.
Pedroni and Jermann, . "SGSMP: Bulletin 3/2002 Proscan Project, Progress Report on the PROSCAN Project of PSI" [online] retrieved from www.sgsmp.ch/protA23.htm, Mar. 2002, 5 pages.
Pedroni et al., "A Novel Gantry for Proton Therapy at the Paul Scherrer Institute," *Cycloctrons and Their Applications 2001: Sixteenth International Conference. AIP Conference Proceedings,* 2001, 600:13-17.
Pedroni et al., "The 200 MeV proton therapy project at the Paul Scherrer Institute: Conceptual design and Practical Realization," *Medical Physics,* Jan. 1995, 22(1):37-53.
Pedroni, "Accelerators for Charged Particle Therapy: Performance Criteria from the User Point of View," *Cyclotrons and their Applications, Proceedings of the 13th International Conference,* Jul. 6-10, 1992, pp. 226-233.
Pedroni, "Latest Developments in Proton Therapy" *Proceedings of EPAC 2000,* 2000, pp. 240-244.
Pedroni, "Status of Proton Therapy: results and future trends," Paul Scherrer Institute, Division of Radiation Medicine, 1994, 5 pages.

(56) References Cited

OTHER PUBLICATIONS

Peggs et al., "A Survey of Hadron Therapy Accelerator Technologies," Particle Accelerator Conference, Jun. 25-29, 2007, 7 pages.
Potts et al., "MPWP6-Therapy III: Treatment Aids and Techniques" *Medical Physics,* Sep./Oct. 1988, 15(5):798.
Pourrahimi et al., "Powder Metallurgy Processed Nb3Sn(Ta) Wire for High Field NMR magnets," *IEEE Transaction on Applied Superconductivity,* Jun. 1995, 5(2):1603-1606.
Prieels et al., "The IBA State-of-the-Art Proton Therapy System, Performances and Recent Results," *Application of Accelerators in Research and industry—Sixteenth Int'l. Conf., American Institute of Physics,* Nov. 1-5, 2000, 576:857-860.
Rabin et al., "Compact Designs for Comprehensive Proton Beam Clinical Facilities," *Nuclear Instruments & Methods in Physics Research,* Apr. 1989, Section B, vol. 40-41, Part II, pp. 1335-1339.
Research & Development Magazine, "Proton Therapy Center Nearing Completion," Aug. 1999, 41(9):2 pages, (www.rdmag.com).
Resmini, , "Design Characteristics of the K=800 Superconducting Cyclotron at M.S.U.," Cyclotron Laboratory, Michigan State University, East Lansing, Michigan 48824, IEEE Transaction on Nuclear Science, vol. NS-26, No. 2, Apr. 1979, 8 pages.
RetroSearch "Loma Linda University Beam Compensation," Jan. 21, 2005, 60 pages.
RetroSearch "Loma Linda University, Bam Compensation Foil Wedge," Jan. 21, 2005, 15 pages.
Rifuggiato et, al., "Status Report of the LNS Superconducting Cyclotron" *Nukleonika,* 2003, 48:S131-S134, Supplement 2.
Rode, "Tevatron Cryogenic System," *Proceedings of the 12th International Conference on High-energy Accelerators, Fermilab,* Aug. 11-16, 1983, pp. 529-535.
Salzburger et al., "Superconducting Synchrotron Magnets Supraleitende Synchrotronmagnete," Siemens A.G., Erlangen (West Germany). Abteilung Technische Physik, Report No.: BMFT-FB-T-75-25, Oct. 1975, p. 147, Journal Announcement: GRAI7619; STAR1415, Subm-Sponsored by Bundesmin. Fuer Forsch. U. Technol. In German; English Summary.
Schillo et al., "Compact Superconducting 250 MeV Proton Cyclotron for the PSI Proscan Proton Therapy Project," *Cyclotrons and Their Applications 2001, Sixteenth International Conference,* 2001, pp. 37-39.
Schneider et al., "Nevis Synchrocyclotron Conversion Program—RF System," *IEEE Transactions on Nuclear Science USA, Jun. 1969, ns* 16(3):430-433.
Schneider et al., "Superconducting Cyclotrons," IEEE Transactions on Magnetics, vol. MAG-11, No. 2, Mar. 1975, New York, pp. 443-446.
Schreuder et al., "The Non-orthogonal Fixed Beam Arrangement for the Second Proton Therapy Facility at th National Accelerator Centre," *Application of Accelerators in Research and Industry, American Institute o Physics, Proceedings of the Fifteenth International Conference,* Nov. 1998, Part Two, pp. 963-966.
Schreuder, "Recent Developments in Superconducting Cyclotrons," *Proceedings of the 1995 Particle Accelerator Conference,* May 1-5, 1995, vol. 1, pp. 318-321.
Schubert and Blosser, "Conceptual Design of a High Field Ultra-Compact Cyclotron for Nuclear Physics Research," *Proceedings of the 1997 Particle Accelerator Conference,* May 12-16, 1997, vol. 1, pp. 1060-1062.
Schubert, "Extending the Feasibility Boundary of the Isochronous Cyclotron," Dissertation submitted to Michigan State University, 1997, Abstract http://adsabs.harvard.edu/abs/1998PhDt. . . .147S.
Shelaev et al., "Design Features of a Model Superconducting Synchrotron of JINR," *Proceedings of the 12th International Conference on High-energy Accelerators,* Aug. 11-16, 1983, pp. 416-418.
Shintomi et. al, "Technology and Materials for the Superconducting Super Collider (SSC) Project," [Lang.:Japanese], The Iron and Steel Institute of Japan 00211575, 78(8): 1305-1313, 1992, http://ci.nii.ac.jp/naid/110001493249/en/.
Sisterson, "World Wide Proton Therapy Experience in 1997," *The American Institute of Physics, Applications of Accelerators in Research and Industry, Proceedings of the fifteenth International Conference,* Part Two, Nov. 1998, pp. 959-962.
Sisterson, "Clinical use of Proton and ion beams from a world-wide perspective," *Nuclear Instruments and Methods in Physics Research,* Section B, 1989, 40-41:1350-1353.
Slater et al., "Developing a Clinical Proton Accelerator Facility: Consortium-Assisted Technology Transfer," *Conference Record of the 1991 IEEE Particle Accelerator Conference: Accelerator Science and Technology,* vol. 1, May 6-9, 1991, pp. 532-536.
Slater et al., "Development of a Hospital-Based Proton Beam Treatment Center," *International Journal of Radiation Oncology Biology Physics,* Apr. 1988, 14(4):761-775.
Smith et al., "The Northeast Proton Therapy Center at Massachusetts General Hospital" *Journal of Brachytherapy International,* Jan. 1997, pp. 137-139.
Snyder and Marti, "Central region design studies for a proposed 250 MeV proton cyclotron," *Nuclear Instruments and Methods in Physics Research,* Section A, 1995, vol. 355, pp. 618-623.
Soga, "Progress of Particle Therapy in Japan," Application of Accelerators in Research and Industry, American Institute of Physics, Sixteenth International Conference, Nov. 2000, pp. 869-872.
Spiller et al., "The GSI Synchrotron Facility Proposal or Acceleration of High Intensity Ion and Proton Beams" *Proceedings of the 2003 Particle Accelerator Conference,* May 12-16, 2003, vol. 1, pp. 589-591.
Stanford et al., "Method of Temperature Control in Microwave Ferroelectric Meansurements," Sperry Microwave Electronics Company, Clearwater, Florida, Sep. 19, 1960, 1 page.
Tadashi et al., "Large superconducting super colloder (SSC) in the planning and materials technology," 1992, 78(8):1305-1313, The Iron and Steel Institute of Japan 00211575.
Takada, "Conceptual Design of a Proton Rotating Gantry for Cancer Therapy," *Japanese Journal of Medical Physics,* 1995, 15(4):270-284.
Teng, "The Fermilab Tevatron," Coral Gables 1981, Proceedings, Gauge Theories, Massive Neutrinos, and Proton Decay, 1981, pp. 43-62.
The Journal of Practical Pharmacy, 1995, 46(1):97-103 [Japanese].
Tilly et al., "Development and verification of the pulsed scanned proton beam at The Svedberg Laboratory in Uppsala," *Phys. Med. Biol.,* 2007, 52:2741-2754.
Tobias et al., *Cancer Research,* 1958, 18, 121 (1958).
Tom, "The Use of Compact Cyclotrons for Producing Fast Neutrons for Therapy in a Rotatable Isocentric Gantry," *IEEE Transaction on Nuclear Science,* Apr. 1979, 26(2):2294-2298.
Toyoda, "Proton Therapy System", Sumitomo Heavy Industries, Ltd., 2000, 5 pages.
Trinks et al., "The Tritron: A Superconducting Separated-Orbit Cyclotron," *Nuclear Instruments and Methods in Physics Research,* Section A, 1986, vol. 244, pp. 273-282.
Tsuji, "The Future Methods and Progress of Proton Beam Radiotherapy," *Journal of Japanese Society for Therapeutic Radiology and Oncology,* 1994, 6(2):63-76.
Umegaki et al., "Development of an Advance Proton Beam Therapy System for Cancer Treatment" *Hitachi Hyoron, 2003, 85(9):605-608* [*Lang.: Japanese*], *English Abstract,* http://www.hitachi.com/ICSFiles/afieldfile/2004/06/01/r2003_04_104.pdf or http://www.hitachi.com/rev/archive/2003/2005649_12626.html (full text) [Hitachi, 52(4), Dec. 2003].
Umezawa et al., "Beam Commissioning of the new Proton Therapy System for University of Tsukuba," *Proceedings of the 2001 Particle Accelerator Conference,* vol. 1, Jun. 18-22, 2001, pp. 648-650.
van Steenbergen, "Superconducting Synchrotron Development at BNL," *Proceedings of the 8th International Conference on High Energy Accelerators CERN 1971,* 1971, pp. 196-198.
van Steenbergen, "The CMS, a Cold Magnet Synchrotron to Upgrade the Proton Energy Range of the BNL Facility," *IEEE Transactions on Nuclear Science,* Jun. 1971, 18(3):694-698.

(56) References Cited

OTHER PUBLICATIONS

Vandeplassche et al., "235 MeV Cyclotron for MGH's Northeast Proton Therapy Center (NPTC): Present Status," EPAC 96, *Fifth European Partical Accelerator Conference,* vol. 3, Jun. 10-14, 1996, pp. 2650-2652.
Vorobiev et al., "Concepts of a Compact Achromatic Proton Gantry with a Wide Scanning Field", Nuclear Instruments and Methods in Physics Research, Section A., 1998, 406(2):307-310.
Vrenken et al., "A Design of a Compact Gantry for Proton Therapy with 2D-Scanning," *Nuclear Instruments and Methods in Physics Research,* Section A, 1999, 426(2):618-624.
Wikipedia, "Synchrotron" http://en.wikipedia.org/wiki/Synchrotron (originally visited Oct. 6, 2005, revisited Jan. 28, 2009), 7 pages.
Written Opinion in PCT Application No. PCT/US2007/001628, dated Feb. 18, 2008, 11 pages.
Wu, "Conceptual Design and Orbit Dynamics in a 250 MeV Superconducting Synchrocycloton," Ph. D. Dissertation, Michigan State University, Department of Physics and Astronomy, 1990, 172 pages.
York et al., "Present Status and Future Possibilities at NSCL-MSU," EPAC 94, Fourth European Particle Accelerator Conference, pp. 554-556, Jun. 1994.
York et al., "The NSCL Coupled Cyclotron Project—Overview and status," *Proceedings of the Fifteenth International Conference on Cyclotrons and their Applications,* Jun. 1998, pp. 687-691.
Yudelev et al., "Hospital Based Superconducting Cyclotron For Neutron Therapy: Medical Physics Perspective," *Cyclotrons and their applications 2001, 16th International Conference. American Institute of Physics Conference Proceedings,* vol. 600, May 13-17, 2001, pp. 40-43.
Zherbin et al., "Proton Beam Therapy at the Leningrad Synchrocyclotron (Clinicomethodological Aspects and Therapeutic Results)", Aug. 1987, 32(8):17-22, (German with English Abstract on pp. 21-22).
Ofice action with English translation from Taiwanese application No. 097144546 issued Oct. 25, 2013 (27 pages).
Tilly, et al., "Development and verification of the Pulsed scanned proton beam at the Svedberg Laboratory in Uppsala", Physics in Medicine and Biology, Phys. Med. Biol. 52, pp. 2741-2454, 2007.
Voluntary amendment filed in Canadian Application No. 2707075 on Oct. 13, 2013 (8 pages).
Response with English translation to office action dated Oct. 25, 2013 in Taiwanese Application No. 097144546, filed on Mar. 28, 2014 (34 pages).
European Search Report issued in European Application No. 08856764.9 on Jun. 4, 2014 (3 pages).
Response with English translation to Japanese Office action filed Mar. 1, 2012 in Japanese Application No. 2007-522777 (14 pages).
Office Action with English translation from Japanese Application No. 2007-522777 mailed Oct. 4, 2011 (15 pages).
European Search Report from European Application No. 10175751.6 mailed Nov. 18, 2010 (8 pages).
Response to examination search report filed in European Application No. 05776532.3 on Dec. 20, 2011 (14 pages).
European Communication issued in European Application No. 05776532.3 mailed Jun. 10, 2011 (10 pages).
Office action with English Translation issued in Chinese Application No. 201010581384.2 on Nov. 10, 2011 (19 pages).
Voluntary amendment filed in Canadian Application No. 2,574,122 on Jul. 26, 2010 (16 pages).
Voluntary amendment filed in Canadian Application No. 2,574,122 on Nov. 5, 2010 (15 pages).
Response with English translation to Chinese Office action filed in Chinese Application No. 200880125832.9 on Dec. 16, 2013 (12 pages).
Voluntary Amendment filed in Canadian Application No. 2707075 on Oct. 18, 2013 (8 pages).
Canadian office action from corresponding Canadian application No. 2574122 dated Aug. 14, 2014 (6 pages).

* cited by examiner

PROGRAMMABLE RADIO FREQUENCY WAVEFORM GENERATOR FOR A SYNCHROCYCLOTRON

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application is *a reissue application of U.S. application Ser. No. 12/603,934 filed on Oct. 22, 2009 now U.S. Pat. No. 8,952,634, which is* a continuation of U.S. application Ser. No. 12/011,466, filed Jan. 25, 2008 now U.S. Pat. No. 7,626,347, which is a continuation of U.S. application Ser. No. 11/371,622, filed Mar. 9, 2006, now U.S. Pat. No. 7,402,963, which is a continuation of U.S. application Ser. No. 11/187,633, filed Jul. 21, 2005, now abandoned, which claims the benefit of U.S. Provisional Application No. 60/590,089, filed on Jul. 21, 2004.

The entire teachings of the above applications are incorporated herein by reference.

BACKGROUND OF THE INVENTION

In order to accelerate charged particles to high energies, many types of particle accelerators have been developed since the 1930s. One type of particle accelerator is a cyclotron. A cyclotron accelerates charged particles in an axial magnetic field by applying an alternating voltage to one or more "dees" in a vacuum chamber. The name "dee" is descriptive of the shape of the electrodes in early cyclotrons, although they may not resemble the letter D in some cyclotrons. The spiral path produced by the accelerating particles is normal to the magnetic field. As the particles spiral out, an accelerating electric field is applied at the gap between the dees. The radio frequency (RF) voltage creates an alternating electric field across the gap between the dees. The RF voltage, and thus the field, is synchronized to the orbital period of the charged particles in the magnetic field so that the particles are accelerated by the radio frequency waveform as they repeatedly cross the gap. The energy of the particles increases to an energy level far in excess of the peak voltage of the applied radio frequency (RF) voltage. As the charged particles accelerate, their masses grow due to relativistic effects. Consequently, the acceleration of the particles becomes non-uniform and the particles arrive at the gap asynchronously with the peaks of the applied voltage.

Two types of cyclotrons presently employed, an isochronous cyclotron and a synchrocyclotron, overcome the challenge of increase in relativistic mass of the accelerated particles in different ways. The isochronous cyclotron uses a constant frequency of the voltage with a magnetic field that increases with radius to maintain proper acceleration. The synchrocyclotron uses a decreasing magnetic field with increasing radius and varies the frequency of the accelerating voltage to match the mass increase caused by the relativistic velocity of the charged particles.

In a synchrocyclotron, discrete "bunches" of charged particles are accelerated to the final energy before the cycle is started again. In isochronous cyclotrons, the charged particles can be accelerated continuously, rather than in bunches, allowing higher beam power to be achieved.

In a synchrocyclotron, capable of accelerating a proton, for example, to the energy of 250 MeV, the final velocity of protons is 0.61 c, where c is the speed of light, and the increase in mass is 27% above rest mass. The frequency has to decrease by a corresponding amount, in addition to reducing the frequency to account for the radially decreasing magnetic field strength. The frequency's dependence on time will not be linear, and an optimum profile of the function that describes this dependence will depend on a large number of details.

SUMMARY OF THE INVENTION

Accurate and reproducible control of the frequency over the range required by a desired final energy that compensates for both relativistic mass increase and the dependency of magnetic field on the distance from the center of the dee has historically been a challenge. Additionally, the amplitude of the accelerating voltage may need to be varied over the accelerating cycle to maintain focusing and increase beam stability. Furthermore, the dees and other hardware comprising a cyclotron define a resonant circuit, where the dees may be considered the electrodes of a capacitor. This resonant circuit is described by Q-factor, which contributes to the profile of voltage across the gap.

A synchrocyclotron for accelerating charged particles, such as protons, can comprise a magnetic field generator and a resonant circuit that comprising electrodes, disposed between magnetic poles. A gap between the electrodes can be disposed across the magnetic field. An oscillating voltage input drives an oscillating electric field across the gap. The oscillating voltage input can be controlled to vary over the time of acceleration of the charged particles. Either or both the amplitude and the frequency of the oscillating voltage input can be varied. The oscillating voltage input can be generated by a programmable digital waveform generator.

The resonant circuit can further include a variable reactive element in circuit with the voltage input and electrodes to vary the resonant frequency of the resonant circuit. The variable reactive element may be a variable capacitance element such as a rotating condenser or a vibrating reed. By varying the reactance of such a reactive element and adjusting the resonant frequency of the resonant circuit, the resonant conditions can be maintained over the operating frequency range of the synchrocyclotron.

The synchrocyclotron can further include a voltage sensor for measuring the oscillating electric field across the gap. By measuring the oscillating electric field across the gap and comparing it to the oscillating voltage input, resonant conditions in the resonant circuit can be detected. The programmable waveform generator can be adjusting the voltage and frequency input to maintain the resonant conditions.

The synchrocyclotron can further include an injection electrode, disposed between the magnetic poles, under a voltage controlled by the programmable digital waveform generator. The injection electrode is used for injecting charged particles into the synchrocyclotron. The synchrocyclotron can further including an extraction electrode, disposed between the magnetic poles, under a voltage controlled by the programmable digital waveform generator. The extraction electrode is used to extract a particle beam from the synchrocyclotron.

The synchrocyclotron can further include a beam monitor for measuring particle beam properties. For example, the beam monitor can measure particle beam intensity, particle beam timing or spatial distribution of the particle beam. The programmable waveform generator can adjust at least one of the voltage input, the voltage on the injection electrode and the voltage on the extraction electrode to compensate for variations in the particle beam properties.

This invention is intended to address the generation of the proper variable frequency and amplitude modulated signals for efficient injection into, acceleration by, and extraction of charged particles from an accelerator.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

This invention relates to the devices and methods for generating the complex, precisely timed accelerating voltages across the "dee" gap in a synchrocyclotron. This invention comprises an apparatus and a method for driving the voltage across the "dee" gap by generating a specific waveform, where the amplitude, frequency and phase is controlled in such a manner as to create the most effective particle acceleration given the physical configuration of the individual accelerator, the magnetic field profile, and other variables that may or may not be known a priori. A synchrocyclotron needs a decreasing magnetic field in order to maintain focusing of the particles beam, thereby modifying the desired shape of the frequency sweep. There are predictable finite propagation delays of the applied electrical signal to the effective point on the dee where the accelerating particle bunch experiences the electric field that leads to continuous acceleration. The amplifier used to amplify the radio frequency (RF) signal that drives the voltage across the dee gap may also have a phase shift that varies with frequency. Some of the effects may not be known a priori, and may be only observed after integration of the entire synchrocyclotron. In addition, the timing of the particle injection and extraction on a nanosecond time scale can increase the extraction efficiency of the accelerator, thus reducing stray radiation due to particles lost in the accelerating and extraction phases of operation.

Figure 1A:
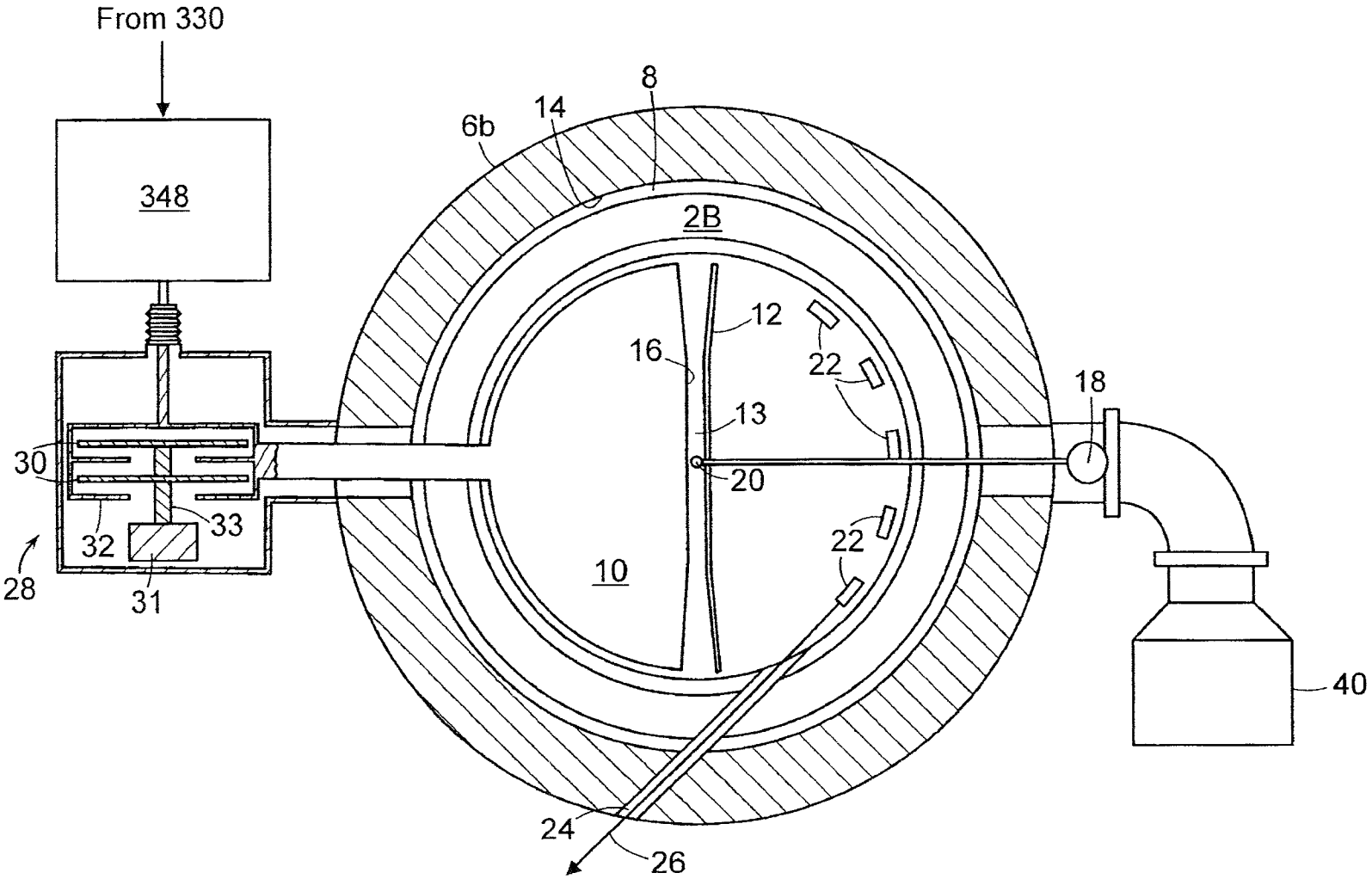
FIG. 1A is a plan cross-sectional view of a synchrocyclotron of the present invention.
Figure 1B:
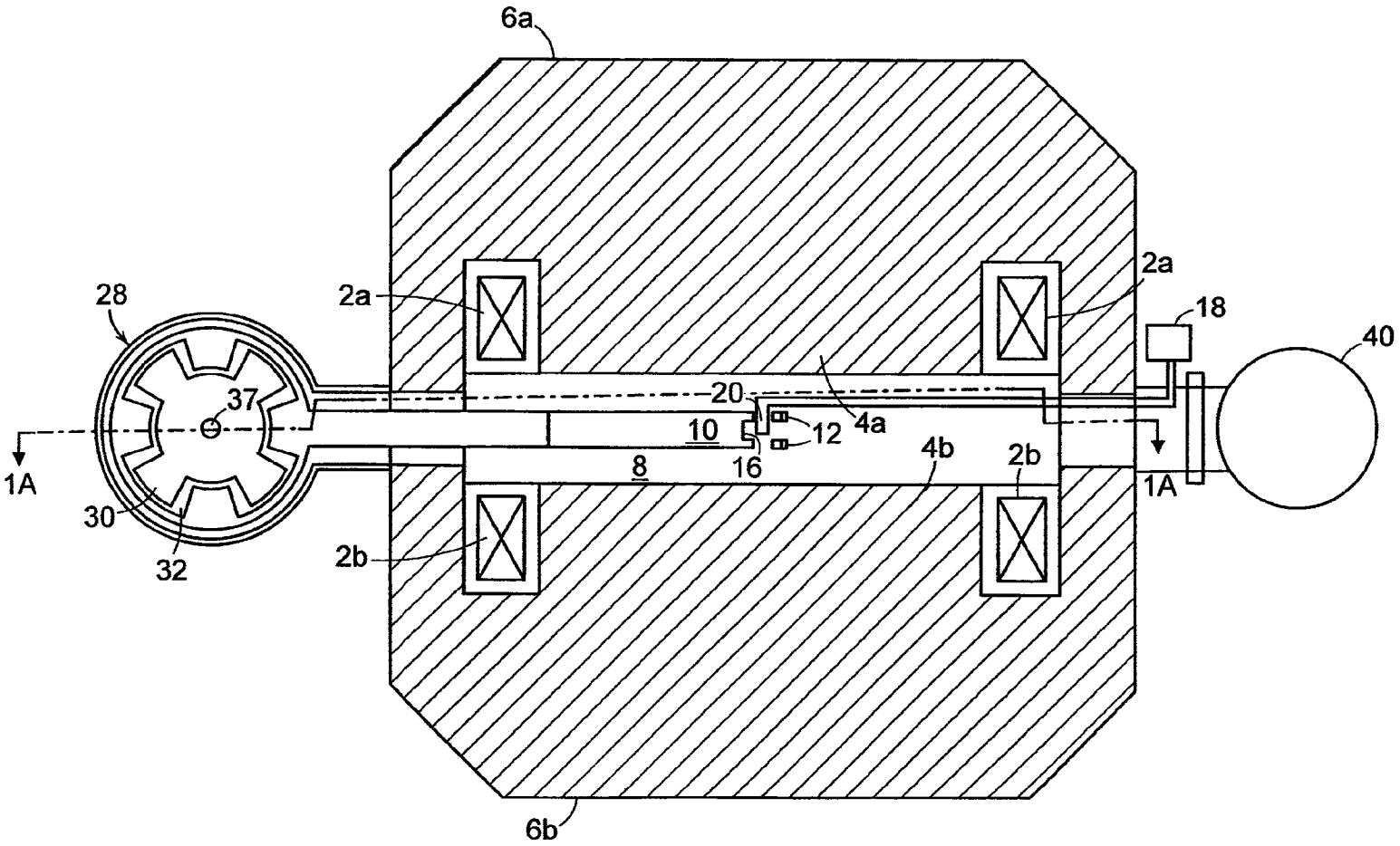
FIG. 1B is a side cross-sectional view of the synchrocyclotron shown in FIG. 1A.

Referring to FIGS. 1A and 1B, a synchrocyclotron of the present invention comprises electrical coils 2a and 2b around two spaced apart metal magnetic poles 4a and 4b configured to generate a magnetic field. Magnetic poles 4a and 4b are defined by two opposing portions of yoke 6a and 6b (shown in cross-section). The space between poles 4a and 4b defines vacuum chamber 8 or a separate vacuum chamber can be installed between the poles 4a and 4b. The magnetic field strength is generally a function of distance from the center of vacuum chamber 8 and is determined largely by the choice of geometry of coils 2a and 2b and shape and material of magnetic poles 4a and 4b.

The accelerating electrodes comprise "dee" 10 and "dee" 12, having gap 13 therebetween. Dee 10 is connected to an alternating voltage potential whose frequency is changed from high to low during the accelerating cycle in order to account for the increasing relativistic mass of a charged particle and radially decreasing magnetic field (measured from the center of vacuum chamber 8) produced by coils 2a and 2b and pole portions 4a and 4b. The characteristic profile of the alternating voltage in dees 10 and 12 is show in FIG. 2 and will be discussed in details below. Dee 10 is a half-cylinder structure, hollow inside. Dee 12, also referred to as the "dummy dee", does not need to be a hollow cylindrical structure as it is grounded at the vacuum chamber walls 14. Dee 12 as shown in FIGS. 1A and 1B comprises a strip of metal, e.g. copper, having a slot shaped to match a substantially similar slot in dee 10. Dee 12 can be shaped to form a mirror image of surface 16 of dee 10.

Ion source 18 that includes ion source electrode 20, located at the center of vacuum chamber 8, is provided for injecting charged particles. Extraction electrodes 22 are provided to direct the charge particles into extraction channel 24, thereby forming beam 26 of the charged particles. The ion source may also be mounted externally and inject the ions substantially axially into the acceleration region.

Dees 10 and 12 and other pieces of hardware that comprise a cyclotron, define a tunable resonant circuit under an oscillating voltage input that creates an oscillating electric field across gap 13. This resonant circuit can be tuned to keep the Q-factor high during the frequency sweep by using a tuning means.

As used herein, Q-factor is a measure of the "quality" of a resonant system in its response to frequencies close to the resonant frequency. Q-factor is defined as $$Q=1/R\times\sqrt{(L/C)},$$

where R is the active resistance of a resonant circuit, L is the inductance and C is the capacitance of this circuit.

Tuning means can be either a variable inductance coil or a variable capacitance. A variable capacitance device can be a vibrating reed or a rotating condenser. In the example shown in FIGS. 1A and 1B, the tuning means is rotating condenser 28. Rotating condenser 28 comprises rotating blades 30 driven by a motor 31. During each quarter cycle of motor 31, as blades 30 mesh with blades 32, the capacitance of the resonant circuit that includes "dees" 10 and 12 and rotating condenser 28 increases and the resonant frequency decreases. The process reverses as the blades unmesh. Thus, resonant frequency is changed by changing the capacitance of the resonant circuit. This serves the purpose of reducing by a large factor the power required to generate the high voltage applied to the "dees" and necessary to accelerate the beam. The shape of blades 30 and 32 can be machined so as to create the required dependence of resonant frequency on time.

The blade rotation can be synchronized with the RF frequency generation so that by varying the Q-factor of the RF cavity, the resonant frequency of the resonant circuit, defined by the cyclotron, is kept close to the frequency of the alternating voltage potential applied to "dees" 10 and 12.

The rotation of the blades can be controlled by the digital waveform generator, described below with reference to FIG. 3 and FIG. 4, in a manner that maintains the resonant frequency of the resonant circuit close to the current frequency generated by the digital waveform generator. Alternatively, the digital waveform generator can be controlled by means of an angular position sensor (not shown) on the rotating condenser shaft 33 to control the clock frequency of the waveform generator to maintain the optimum resonant condition. This method can be employed if the profile of the meshing blades of the rotating condenser is precisely related to the angular position of the shaft.

A sensor that detects the peak resonant condition (not shown) can also be employed to provide feedback to the clock of the digital waveform generator to maintain the highest match to the resonant frequency. The sensors for detecting resonant conditions can measure the oscillating voltage and current in the resonant circuit. In another example, the sensor can be a capacitance sensor. This method can accommodate small irregularities in the relationship between the profile of the meshing blades of the rotating condenser and the angular position of the shaft.

A vacuum pumping system 40 maintains vacuum chamber 8 at a very low pressure so as not to scatter the accelerating beam.

To achieve uniform acceleration in a synchrocyclotron, the frequency and the amplitude of the electric field across the "dee" gap needs to be varied to account for the relativistic mass increase and radial (measured as distance from the center of the spiral trajectory of the charged particles) variation of magnetic field as well as to maintain focus of the beam of particles.

Figure 2:
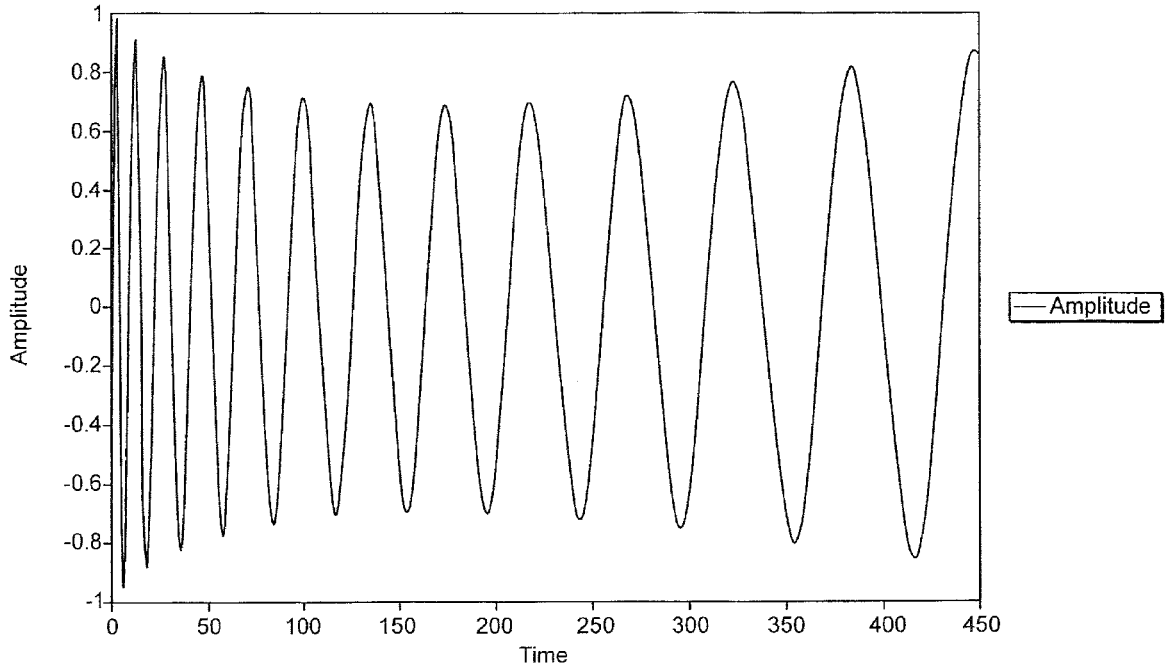
FIG. 2 is an illustration of an idealized waveform that can be used for accelerating charged particles in a synchrocyclotron shown in FIGS. 1A and 1B.

FIG. 2 is an illustration of an idealized waveform that may be required for accelerating charged particles in a synchrocyclotron. It shows only a few cycles of the waveform and does not necessarily represent the ideal frequency and amplitude modulation profiles. FIG. 2 illustrates the time varying amplitude and frequency properties of the waveform used in a given synchrocyclotron. The frequency changes from high to low as the relativistic mass of the particle increases while the particle speed approaches a significant fraction of the speed of light.

The instant invention uses a set of high speed digital to analog converters (DAC) that can generate, from a high speed memory, the required signals on a nanosecond time scale. Referring to FIG. 1A, both a radio frequency (RF) signal that drives the voltage across dee gap 13 and signals that drive the voltage on injector electrode 20 and extractor electrode 22 can be generated from the memory by the DACs. The accelerator signal is a variable frequency and amplitude waveform. The injector and extractor signals can be either of at least three types: continuous; discrete signals, such as pulses, that may operate over one or more periods of the accelerator waveform in synchronism with the accelerator waveform; or discrete signals, such as pulses, that may operate at precisely timed instances during the accelerator waveform frequency sweep in synchronism with the accelerator waveform. (See below with reference to FIGS. 8A-C.)

Figure 3A:
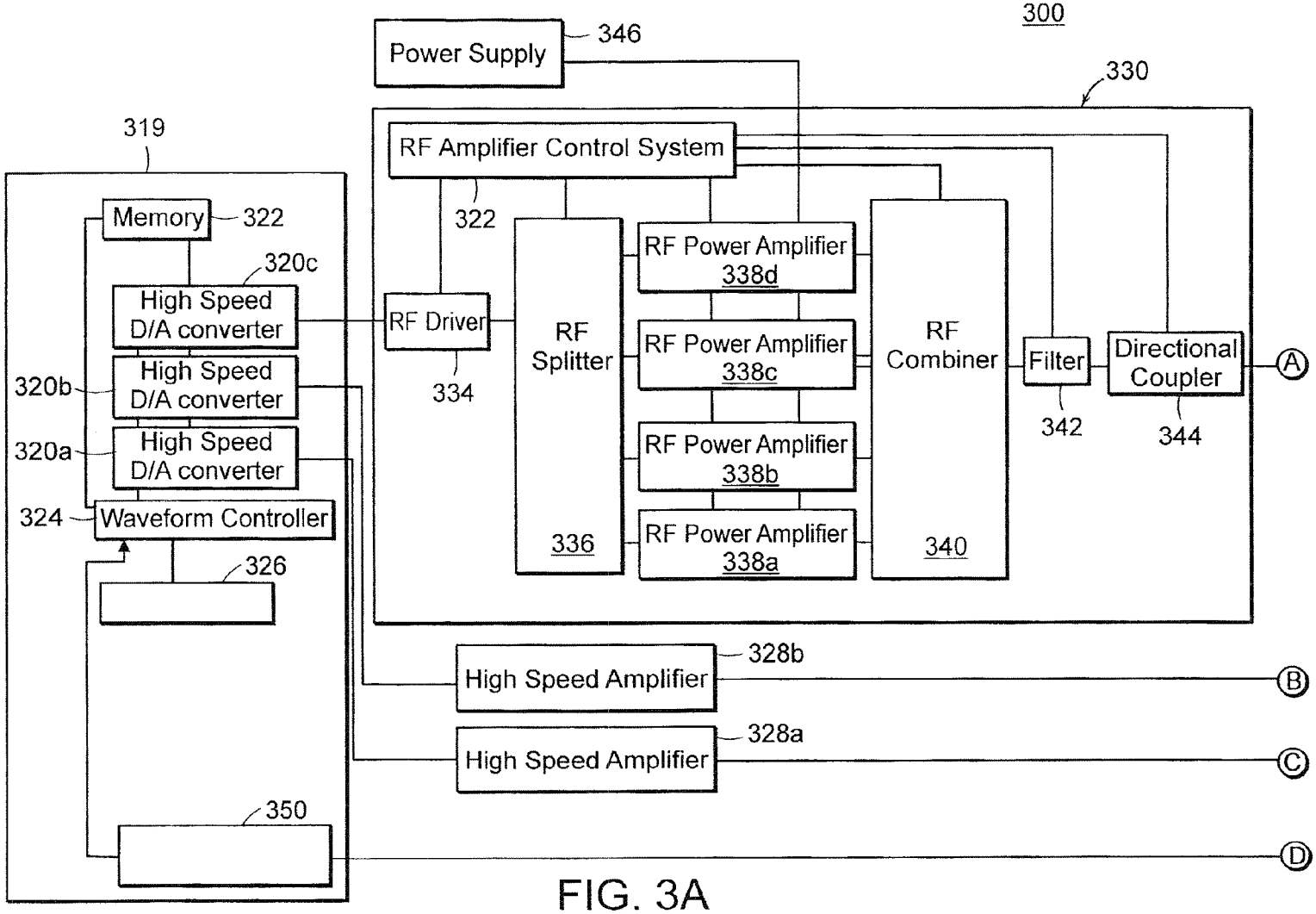
FIG. 3A depicts a portion of a block diagram of a synchrocyclotron of the present invention that includes a waveform generator system.
Figure 3B:
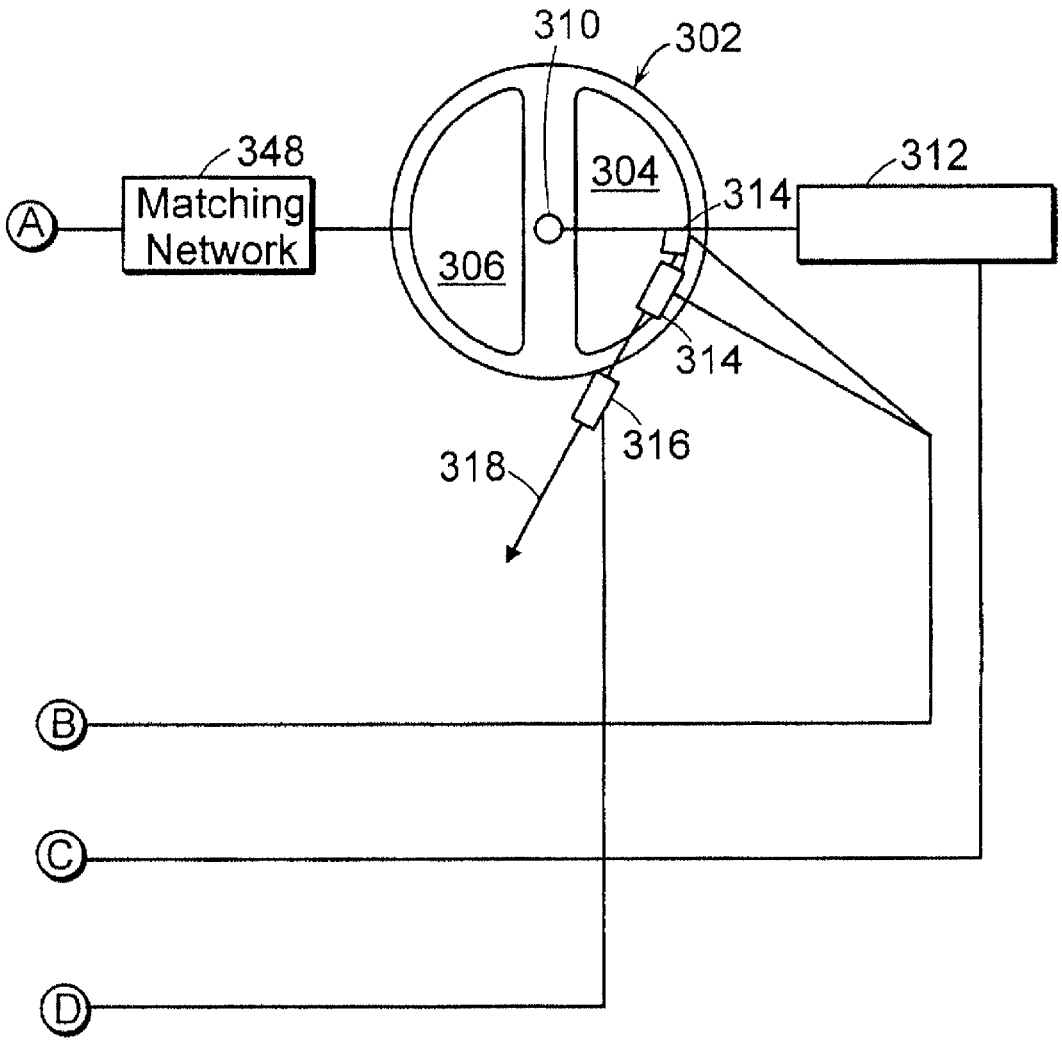
FIG. 3B depicts a portion of a block diagram of a synchrocyclotron of the present invention that includes a waveform generator system.
Figure 4:
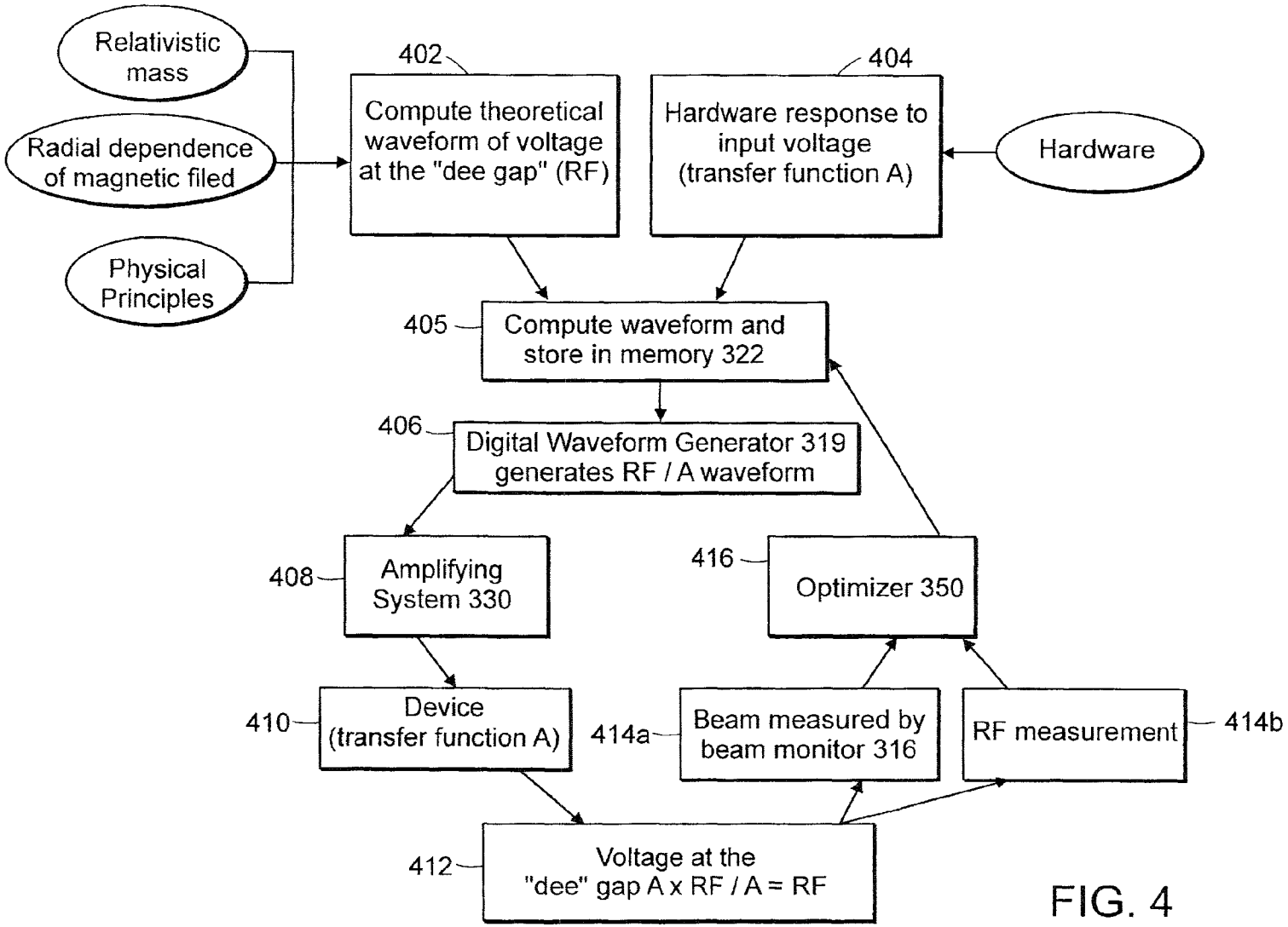
FIG. 4 is a flow chart illustrating the principles of operation of a digital waveform generator and an adaptive feedback system (optimizer) of the present invention.

FIG. 3 depicts a block diagram of a synchrocyclotron of the present invention 300 that includes particle accelerator 302, waveform generator system 319 and amplifying system 330. FIG. 3 also shows an adaptive feedback system that includes optimizer 350. The optional variable condenser 28 and drive subsystem to motor 31 are not shown.

Referring to FIG. 3, particle accelerator 302 is substantially similar to the one depicted in FIGS. 1A and 1B and includes "dummy dee" (grounded dee) 304, "dee" 306 and yoke 308, injection electrode 310, connected to ion source 312, and extraction electrodes 314. Beam monitor 316 monitors the intensity of beam 318.

Synchrocyclotron 300 includes digital waveform generator 319. Digital waveform generator 319 comprises one or more digital-to-analog converters (DACs) 320 that convert digital representations of waveforms stored in memory 322 into analog signals. Controller 324 controls addressing of memory 322 to output the appropriate data and controls DACs 320 to which the data is applied at any point in time. Controller 324 also writes data to memory 322. Interface 326 provides a data link to an outside computer (not shown). Interface 326 can be a fiber optic interface.

The clock signal that controls the timing of the "analog-to-digital" conversion process can be made available as an input to the digital waveform generator. This signal can be used in conjunction with a shaft position encoder (not shown) on the rotating condenser (see FIGS. 1A and 1B) or a resonant condition detector to fine-tune the frequency generated.

FIG. 3 illustrates three DACs 320a, 320b and 320c. In this example, signals from DACs 320a and 320b are amplified by amplifiers 328a and 328b, respectively. The amplified signal from DAC 320a drives ion source 312 and/or injection electrode 310, while the amplified signal from DAC 320b drives extraction electrodes 314.

The signal generated by DAC 320c is passed on to amplifying system 330, operated under the control of RF amplifier control system 332. In amplifying system 330, the signal from DAC 320c is applied by RF driver 334 to RF splitter 336, which sends the RF signal to be amplified by an RF power amplifier 338. In the example shown in FIG. 3, four power amplifiers, 338a, b, c and d, are used. Any number of amplifiers 338 can be used depending on the desired extent of amplification. The amplified signal, combined by RF combiner 340 and filtered by filter 342, exits amplifying system 330 though directional coupler 344, which ensures that RF waves do not reflect back into amplifying system 330. The power for operating amplifying system 330 is supplied by power supply 346.

Upon exit from amplifying system 330, the signal from DAC 320c is passed on to particle accelerator 302 through matching network 348. Matching network 348 matches impedance of a load (particle accelerator 302) and a source (amplifying system 330). Matching network 348 includes a set of variable reactive elements.

Synchrocyclotron 300 can further include optimizer 350. Using measurement of the intensity of beam 318 by beam monitor 316, optimizer 350, under the control of a programmable processor can adjust the waveforms produced by DACs 320a, b and c and their timing to optimize the operation of the synchrocyclotron 300 and achieve a optimum acceleration of the charged particles.

The principles of operation of digital waveform generator 319 and adaptive feedback system 350 will now be discussed with reference to FIG. 4.

The initial conditions for the waveforms can be calculated from physical principles that govern the motion of charged particles in magnetic field, from relativistic mechanics that describe the behavior of a charged particle mass as well as from the theoretical description of magnetic field as a function of radius in a vacuum chamber. These calculations are performed at step 402. The theoretical waveform of the voltage at the dee gap, RF(ω, t), where ω is the frequency of the electrical field across the dee gap and t is time, is computed based on the physical principles of a cyclotron, relativistic mechanics of a charged particle motion, and theoretical radial dependency of the magnetic field.

Departures of practice from theory can be measured and the waveform can be corrected as the synchrocyclotron operates under these initial conditions. For example, as will be described below with reference to FIGS. 8A-C, the timing of the ion injector with respect to the accelerating waveform can be varied to maximize the capture of the injected particles into the accelerated bunch of particles.

The timing of the accelerator waveform can be adjusted and optimized, as described below, on a cycle-by-cycle basis to correct for propagation delays present in the physical arrangement of the radio frequency wiring; asymmetry in the placement or manufacture of the dees can be corrected by placing the peak positive voltage closer in time to the subsequent peak negative voltage or vice versa, in effect creating an asymmetric sine wave.

In general, waveform distortion due to characteristics of the hardware can be corrected by pre-distorting the theoretical waveform RF(ω, t) using a device-dependent transfer function A, thus resulting in the desired waveform appearing at the specific point on the acceleration electrode where the protons are in the acceleration cycle. Accordingly, and referring again to FIG. 4, at step 404, a transfer function A(ω, t) is computed based on experimentally measured response of the device to the input voltage.

Figure 6A:
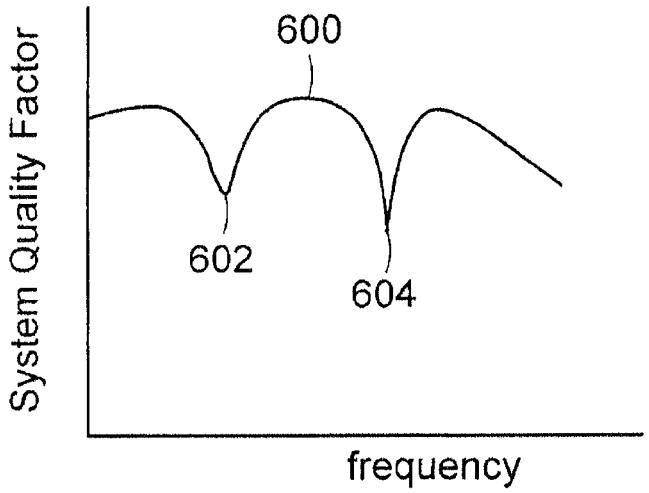
FIG. 6A shows an illustrative frequency response of the resonant system with variations due to parasitic circuit effects.

At step 405, a waveform that corresponds to an expression RF(ω, t)/A(ω,t) is computed and stored in memory 322. At step 406, digital waveform generator 319 generates RF /A waveform from memory. The driving signal RF(ω, t)/A(ω, t) is amplified at step 408, and the amplified signal is propagated through the entire device 300 at step 410 to generate a voltage across the dee gap at step 412. A more detailed description of a representative transfer function A(ω,t) will be given below with reference to FIGS. 6A-C.

After the beam has reached the desired energy, a precisely timed voltage can be applied to an extraction electrode or device to create the desired beam trajectory in order to extract the beam from the accelerator, where it is measured by beam monitor at step 414a. RF voltage and frequency is measured by voltage sensors at step 414b. The information about beam intensity and RF frequency is relayed back to digital waveform generator 319, which can now adjust the shape of the signal RF(ω, t)/A(ω, t) at step 406.

The entire process can be controlled at step 416 by optimizer 350. Optimizer 350 can execute a semi- or fully automatic algorithm designed to optimize the waveforms and the relative timing of the waveforms. Simulated annealing is an example of a class of optimization algorithms that may be employed. On-line diagnostic instruments can probe the beam at different stages of acceleration to provide feedback for the optimization algorithm. When the optimum conditions have been found, the memory holding the optimized waveforms can be fixed and backed up for continued stable operation for some period of time. This ability to adjust the exact waveform to the properties of the individual accelerator decreases the unit-to-unit variability in operation and can compensate for manufacturing tolerances and variation in the properties of the materials used in the construction of the cyclotron.

The concept of the rotating condenser (such as condenser 28 shown in FIGS. 1A and 1B) can be integrated into this digital control scheme by measuring the voltage and current of the RF waveform in order to detect the peak of the resonant condition. The deviation from the resonant condition can be fed back to the digital waveform generator 319 (see FIG. 3) to adjust the frequency of the stored waveform to maintain the peak resonant condition throughout the accelerating cycle. The amplitude can still be accurately controlled while this method is employed.

The structure of rotating condenser 28 (see FIGS. 1A and 1B) can optionally be integrated with a turbomolecular vacuum pump, such as vacuum pump 40 shown in FIGS. 1A and 1B, that provides vacuum pumping to the accelerator cavity. This integration would result in a highly integrated structure and cost savings. The motor and drive for the turbo pump can be provided with a feedback element such as a rotary encoder to provide fine control over the speed and angular position of rotating blades 30, and the control of the motor drive would be integrated with the waveform generator 319 control circuitry to insure proper synchronization of the accelerating waveform.

Figure 5A:
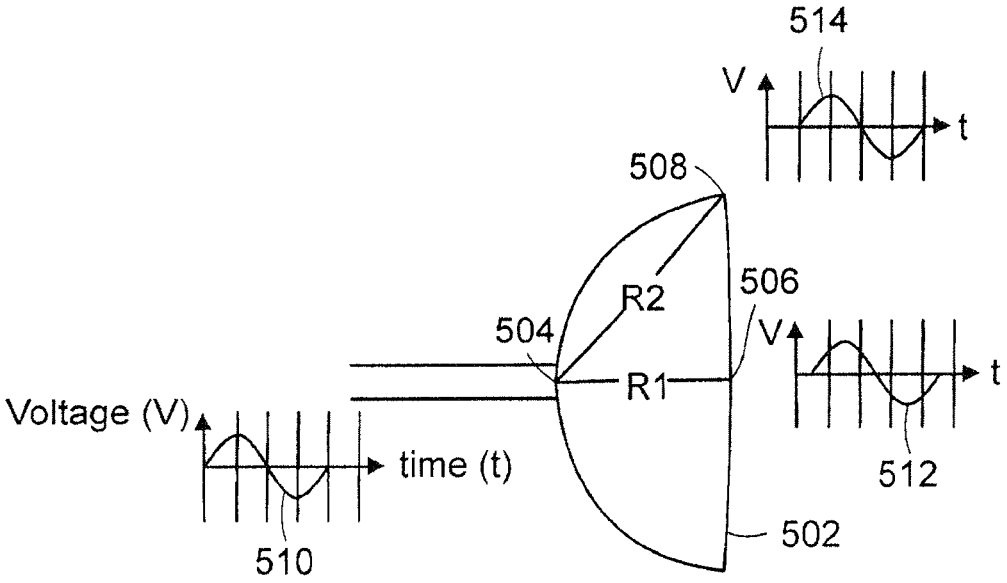
FIG. 5A shows the effect of the finite propagation delay of the signal across different paths in an accelerating electrode ("dee") structure.

As mentioned above, the timing of the waveform of the oscillating voltage input can be adjusted to correct for propagation delays that arise in the device. FIG. 5A illustrate an example of wave propagation errors due to the difference in distances R1 and R2 from the RF input point 504 to points 506 and 508, respectively, on the accelerating surface 502 of accelerating electrode 500. The difference in distances R1 and R2 results in signal propagation delay that affects the particles as they accelerate along a spiral path (not shown) centered at point 506. If the input waveform, represented by curve 510, does not take into account the extra propagation delay caused by the increasing distance, the particles can go out of synchronization with the accelerating waveform. The input waveform 510 at point 504 on the accelerating electrode 500 experiences a variable delay as the particles accelerate outward from the center at point 506. This delay results in input voltage having waveform 512 at point 506, but a differently timed waveform 514 at point 508. Waveform 514 shows a phase shift with respect to waveform 512 and this can affect the acceleration process. As the physical size of the accelerating structure (about 0.6 meters) is a significant fraction of the wavelength of the accelerating frequency (about 2 meters), a significant phase shift is experienced between different parts of the accelerating structure.

Figure 5B:
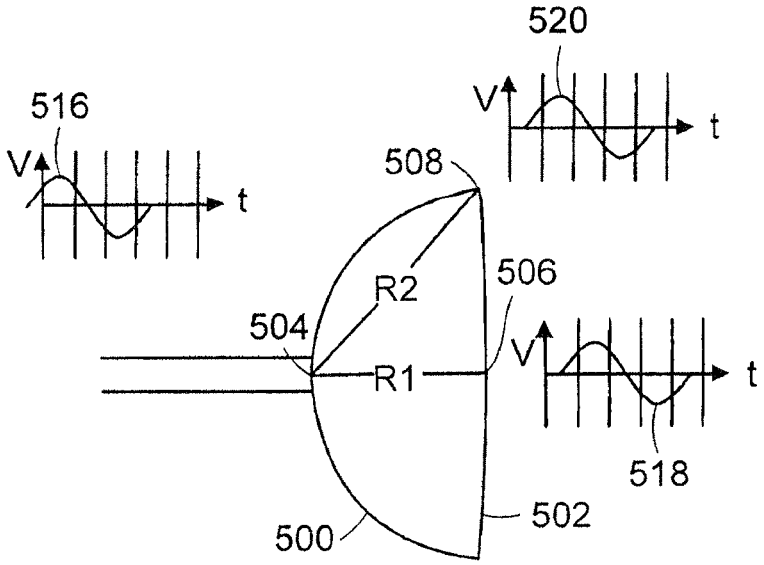
FIG. 5B shows the input waveform timing adjusted to correct for the variation in propagation delay across the "dee" structure.

In FIG. 5B, the input voltage having waveform 516 is pre-adjusted relative to the input voltage described by waveform 510 to have the same magnitude, but opposite sign of time delay. As a result, the phase lag caused by the different path lengths across the accelerating electrode 500 is corrected. The resulting waveforms 518 and 520 are now correctly aligned so as to increase the efficiency of the particle accelerating process. This example illustrates a simple case of propagation delay caused by one easily predictable geometric effect. There may be other waveform timing effects that are generated by the more complex geometry used in the actual accelerator, and these effects, if they can be predicted or measured can be compensated for by using the same principles illustrated in this example.

Figure 6B:
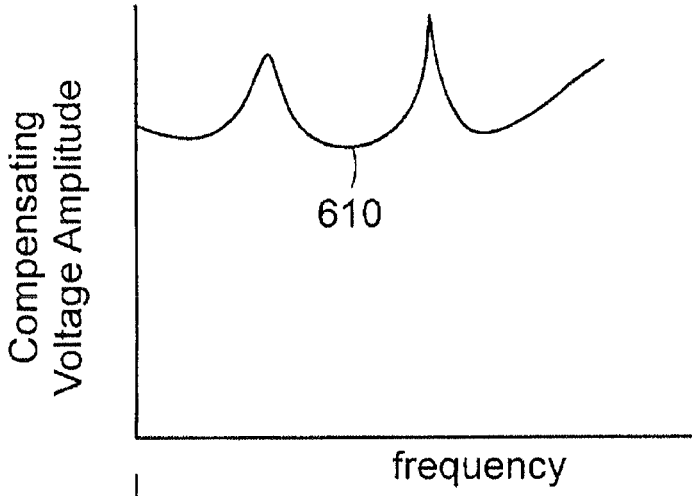
FIG. 6B shows a waveform calculated to correct for the variations in frequency response due to parasitic circuit effects.
Figure 6C:
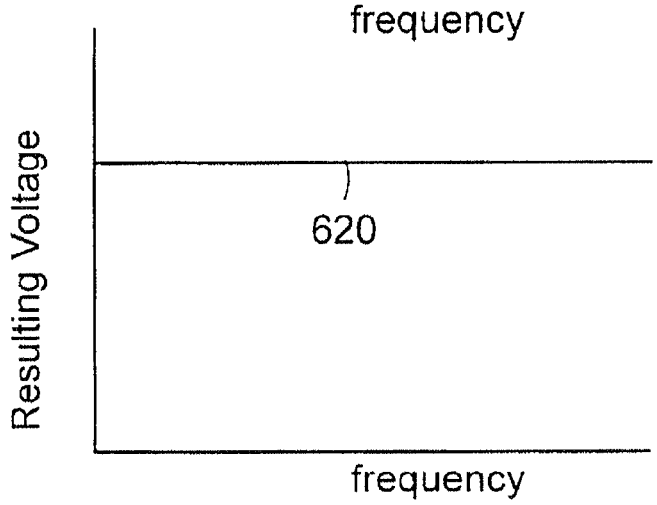
FIG. 6C shows the resulting "flat" frequency response of the system when the waveform shown in FIG. 6B is used as input voltage.

As described above, the digital waveform generator produces an oscillating input voltage of the form $RF(\omega, t)/A(\omega, t)$, where $RF(\omega, t)$ is a desired voltage across the dee gap and $A(\omega, t)$ is a transfer function. A representative device-specific transfer function A, is illustrated by curve 600 in FIG. 6A. Curve 600 shows Q-factor as a function of frequency. Curve 600 has two unwanted deviations from an ideal transfer function, namely troughs 602 and 604. These deviation can be caused by effects due to the physical length of components of the resonant circuit, unwanted self-resonant characteristics of the components or other effects. This transfer function can be measured and a compensating input voltage can be calculated and stored in the waveform generator's memory. A representation of this compensating function 610 is shown in FIG. 6B. When the compensated input voltage 610 is applied to device 300, the resulting voltage 620 is uniform with respect to the desired voltage profile calculated to give efficient acceleration.

Another example of the type of effects that can be controlled with the programmable waveform generator is shown in FIG. 7. In some synchrocyclotrons, the electric field strength used for acceleration can be selected to be somewhat reduced as the particles accelerate outward along spiral path 705. This reduction in electric field strength is accomplished by applying accelerating voltage 700, that is kept relatively constant as shown in FIG. 7A, to accelerating electrode 702. Electrode 704 is usually at ground potential. The electric field strength in the gap is the applied voltage divided by the gap length. As shown in FIG. 7B, the distance between accelerating electrodes 702 and 704 is increasing with radius R. The resulting electric field strength as a function or radius R is shown as curve 706 in FIG. 7C.

Figure 7A:
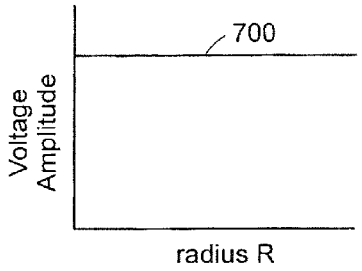
FIG. 7A shows a constant amplitude input voltage applied to the accelerating electrodes shown in FIG. 7B.
Figure 7B:
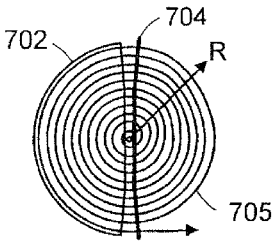
FIG. 7B shows an example of the accelerating electrode geometry wherein the distance between the electrodes is reduced toward the center.
Figure 7C:
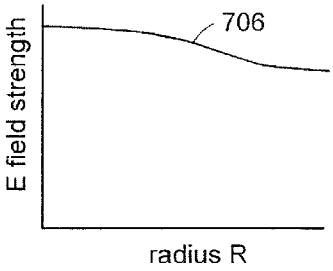
FIG. 7C shows the desired and resultant electric field strength in the electrode gap as a function of radius that achieves a stable and efficient acceleration of charged particles by applying input voltage as shown in FIG. 7A to the electrode geometry shown in FIG. 7B.
Figure 7D:
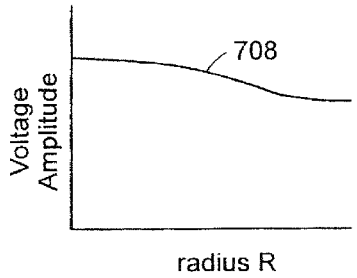
FIG. 7D shows input voltage input as a function of radius that directly corresponds to the electric field strength desired and can be produced using a digital waveform generator.
Figure 7E:
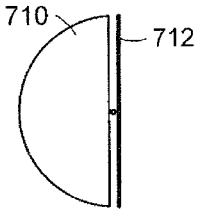
FIG. 7E shows a parallel geometry of the accelerating electrodes which gives a direct proportionality between applied voltage and electric field strength.
Figure 7F:
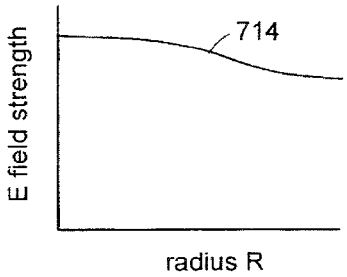
FIG. 7F shows the desired and resultant electric field strength in the electrode gap as a function of radius that achieves a stable and efficient acceleration of charged particles by applying input voltage as shown in FIG. 7D to the electrode geometry shown in FIG. 7E.

With the use of the programmable waveform generator, the amplitude of accelerating voltage 708 can be modulated in the desired fashion, as shown in FIG. 7D. This modulation allows to keep the distance between accelerating electrodes 710 and 712 to remain constant, as shown in FIG. 7E. As a result, the same resulting electric field strength as a function of radius 714, shown in FIG. 7F, is produced as shown in FIG. 7C. While this is a simple example of another type of control over synchrocyclotron system effects, the actual shape of the electrodes and profile of the accelerating voltage versus radius may not follow this simple example.

Figure 8A:
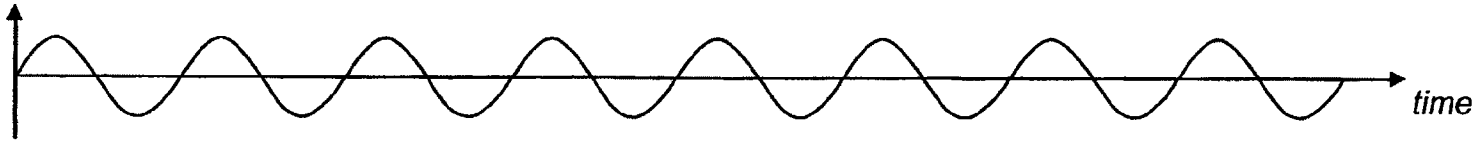
FIG. 8A shows an example of a waveform of the accelerating voltage generated by the programmable waveform generator.
Figure 8B:
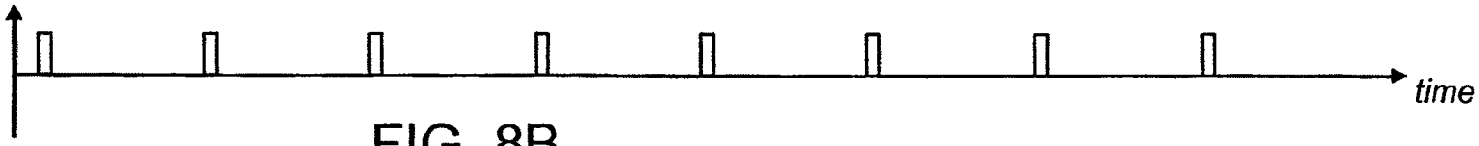
FIG. 8B shows an example of a timed ion injector signal.

As mentioned above, the programmable waveform generator can be used to control the ion injector (ion source) to achieve optimal acceleration of the charged particles by precisely timing particle injections. FIG. 8A shows the RF accelerating waveform generated by the programmable waveform generator. FIG. 8B shows a precisely timed cycle-by-cycle injector signal that can drive the ion source in a precise fashion to inject a small bunch of ions into the accelerator cavity at precisely controlled intervals in order to synchronize with the acceptance phase angle of the accelerating process. The signals are shown in approximately the correct alignment, as the bunches of particles are usually traveling through the accelerator at about a 30 degree lag angle compared to the RF electric field waveform for beam stability. The actual timing of the signals at some external point such as the output of the digital-to-analog converters, may not have this exact relationship as the propagation delays of the two signals is likely to be different. With the programmable waveform generator, the timing of the injection pulses can be continuously varied with respect to the RF waveform in order to optimize the coupling of the injected pulses into the accelerating process. This signal can be enabled or disabled to turn the beam on and off. The signal can also be modulated via pulse dropping techniques to maintain a required average beam current. This beam current regulation is accomplished by choosing a macroscopic time interval that contains some relatively large number of pulses, on the order of 1000,and changing the fraction of pulses that are enabled during this interval.

Figure 8C:
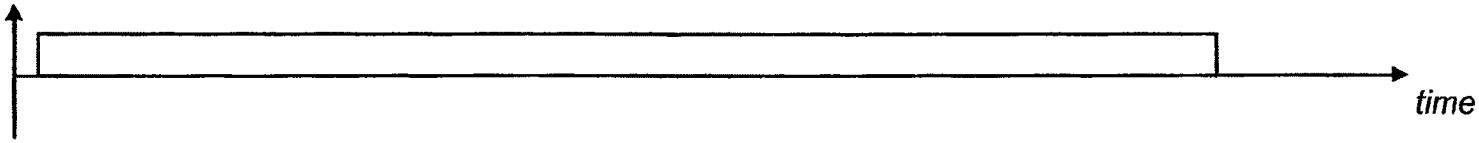
FIG. 8C shows another example of a timed ion injector signal.

FIG. 8C shows a longer injection control pulse that corresponds to a multiple number of RF cycles. This pulse is generated when a bunch of protons are to be accelerated. The periodic acceleration process captures only a limited number of particles that will be accelerated to the final energy and extracted. Controlling the timing of the ion injection can result in lower gas load and consequently better vacuum conditions which reduces vacuum pumping requirements and improves high voltage and beam loss properties during the acceleration cycle. This can be used where the precise timing of the injection shown in FIG. 8B is not required for acceptable coupling of the ion source to the RF waveform phase angle. This approach injects ions for a number of RF cycles which corresponds approximately to the number of "turns" which are accepted by the accelerating process in the synchrocyclotron. This signal is also enabled or disabled to turn the beam on and off or modulate the average beam current.

While this invention has been particularly shown and described with references to preferred embodiments thereof, it will be understood by those skilled in the art that various changes in form and details may be made therein without departing from the scope of the invention encompassed by the appended claims.

What is claimed is:

1. A synchrocyclotron comprising:

a magnetic field generator *to produce a magnetic field*;

a resonant circuit, comprising:

electrodes, disposed *within a cavity* between magnetic poles, having a gap therebetween across [a] *the* magnetic field; and a variable reactive element in circuit with the electrodes to vary a resonant frequency of the resonant circuit; [and]

*an extraction channel to receive charged particles from the cavity and to output a particle beam from the synchrocyclotron;*

*a sensor to measure a voltage in the resonant circuit; and* a voltage input generator to [provide] *adjust* a *frequency of a* voltage input to the resonant circuit *based on an intensity of the particle beam output by the synchrocyclotron and a frequency of the voltage measured in the resonant circuit*, the voltage input being an oscillating voltage that varies in frequency over a time of acceleration of *the* charged particles.

2. The synchrocyclotron as claimed in claim 1 wherein an amplitude of the voltage input is varied.

3. The synchrocyclotron of claim 1 further including an ion source for injecting charged particles into the synchrocyclotron.

4. The synchrocyclotron of claim 1 further including an extraction electrode disposed between the magnetic poles for extracting [a] *the* particle beam from the synchrocyclotron.

5. The synchrocyclotron of claim 1 [further including a] *wherein the* sensor *is* for detecting resonant conditions in the resonant circuit.

6. The synchrocyclotron of claim 5 further including means for adjusting at least one of [a] *the* frequency of the voltage input, reactance of the variable reactive element, and resonant frequency of the resonant circuit based on the resonant conditions.

7. The synchrocyclotron of claim 1 further including a beam monitor for detecting a particle beam extracted from the synchrocyclotron.

8. The synchrocyclotron of claim 7 wherein the beam monitor is configured to measure at least one of particle beam intensity, particle beam timing, and spatial distribution of the particle beam.

9. The synchrocyclotron as claimed in claim 1 [further including] *wherein the voltage input generator comprises* a programmable digital waveform generator for generating the oscillating voltage.

10. The synchrocyclotron of claim 9 wherein the programmable waveform generator is configured to compensate for at least one of variations in resonant conditions of the resonant circuit and variations in [a] *the* particle beam extracted from the synchrocyclotron.

11. A method of accelerating particles in a synchrocyclotron, comprising:

providing particles in *a cavity of* the synchrocyclotron;

providing a resonant circuit *in the cavity*, the resonant circuit comprising accelerating electrodes having a gap therebetween across a magnetic field; [and]

*using a sensor to measure a voltage in the resonant circuit;*

[with] *using* a voltage input generator, [applying an oscillating] *adjusting, based on an intensity of a particle beam output by the synchrocyclotron and a frequency of a voltage measured in the resonant circuit, a frequency of a* voltage input [that varies in frequency during acceleration of the particles] to the resonant circuit, the [oscillating] voltage input creating an oscillating electric field across the gap that accelerates the particles in the [synchrocyclotron] *cavity; and*

*receiving the particles from the cavity in an extraction channel and outputting a particle beam from the extraction channel.*

12. The method as in claim 11, further including generating the [oscillating] voltage input.

13. The method of claim 11, further including varying an amplitude of the [oscillating] voltage input.

14. The method of claim 11, wherein providing particles includes injecting particles into the synchrocyclotron.

15. The method of claim 11, further including detecting resonant conditions in the resonant circuit.

16. The method of claim 15, further including adjusting at least one of a frequency of the [oscillating] voltage input, a reactance of a variable reactive element, and a resonant frequency of the resonant circuit based on the resonant conditions.

17. The method of claim 11, further including extracting accelerated particles from the synchrocyclotron to form [a] *the* particle beam.

18. The method as in claim 17, further including detecting variations in the particle beam.

19. The method as in claim 18, wherein the variations include variations in at least one of particle beam intensity, particle beam timing, and spatial distribution of the particle beam.

20. The method as in claim 18, further including compensating for detected variations in the particle beam.

*21. A particle accelerator configured to generate a particle beam, the particle accelerator comprising:*

*an ion source to provide pulses of charged particles that are accelerated in a cavity to form the particle beam;*

*a beam monitor to obtain information about the particle beam, the information comprising information about an intensity of the particle beam; and*

*a waveform generator comprising a controller to receive the information about the intensity and to write data to memory, the waveform generator comprising a driver to provide voltage to the cavity to accelerate the charged particles; and*

*circuitry to control operation of the ion source based on the information about the intensity so that the pulses are provided at timed instances in synchronism with a sweep of a frequency of the voltage that accelerates the charged particles.*

*22. The particle accelerator of claim 21, further comprising:*

*magnetic pole pieces that border the cavity, the cavity housing at least part of the ion source;*

*wherein the voltage comprises an oscillating voltage having a frequency that varies over a time to accelerate the charged particles.*

*23. The particle accelerator of claim 21, wherein the voltage comprises an oscillating voltage having a frequency that varies over a time to accelerate the charged particles.*

*24. The particle accelerator of claim 21, further comprising:*

*magnetic pole pieces that border the cavity, the cavity housing at least part of the ion source;*

*wherein the voltage comprises an oscillating voltage having a frequency that varies over a time to accelerate the charged particles; and*

*wherein the ion source is controlled to provide pulses of charged particles at a same point in each cycle of the oscillating voltage.*

*25. The particle accelerator of claim 21, wherein the operation of the ion source is controlled by turning the ion source on and off during a time interval in order to obtain a desired beam current.*

*26. The particle accelerator of claim 21, wherein the operation of the ion source is controlled by selecting a time*

*interval and by dropping a number of pulses that occur during the time interval to obtain a desired beam current.*

*27. The particle accelerator of claim 21, wherein the particle accelerator comprises a synchrocyclotron.*

*28. The particle accelerator of claim 21, wherein the waveform generator comprises digital circuitry, the digital circuitry comprising a digital-to-analog converter (DAC) to generate an analog signal based on the data, the analog signal for controlling the ion source.*

*29. A particle accelerator configured to generate a particle beam, the particle accelerator comprising:*

*an ion source to inject charged particles into a resonant cavity;*

*magnetic pole pieces that border the resonant cavity, the resonant cavity having a radio frequency (RF) voltage to accelerate the charged particles to produce the particle beam;*

*a feedback system to provide at least one property of the particle beam; and*

*circuitry to receive an injection control pulse that extends over multiple cycles of the RF voltage and to control, based on the at least one property, the injection control pulse based on cycles of the RF voltage so that charged particles are injected continuously over at least some of the multiple cycles.*

*30. The particle accelerator of claim 29, wherein the at least one property comprises an intensity of the particle beam.*

*31. The particle accelerator of claim 29, wherein the at least one property comprises a spatial distribution of the particle beam.*

*32. The particle accelerator of claim 29, wherein the at least one property comprises a timing associated with the particle beam.*

*33. The particle accelerator of claim 29, wherein the injection control pulse controls operation of the ion source by turning the ion source on and off during a time interval in order to maintain a beam current.*

*34. The particle accelerator of claim 29, wherein the injection control pulse controls operation of the ion source by selecting a time interval and wherein the circuitry is configured to drop a number of pulses that occur during the time interval to maintain a beam current.*

*35. The particle accelerator of claim 29, wherein the particle accelerator comprises a synchrocyclotron.*

*36. The particle accelerator of claim 29, wherein the feedback system comprises a beam monitor to monitor the particle beam to obtain the at least one property.*

*37. The particle accelerator of claim 29, wherein the circuitry comprises a digital waveform generator.*

*38. A synchrocyclotron comprising:*

*magnetic pole pieces that border a cavity;*

*an ion source to provide, to the cavity, ions that are accelerated to form a particle beam;*

*a voltage generator to provide voltage to the cavity, the voltage comprising an oscillating voltage having a frequency that varies over a time of acceleration of the ions;*

*a sensor to measure the oscillating voltage in the cavity; and*

*a control circuit to control, based on the oscillating voltage measured by the sensor, a timing at which ions are provided by the ion source, the timing being controlled so that ions are provided into the cavity for a limited time and at a same point in each of multiple frequency sweeps of the oscillating voltage, at least part of the control circuit comprising digital circuitry, the digital circuitry comprising an interface that provides a data link to a computer.*

*39. The synchrocyclotron of claim 38, further comprising:*

*a beam monitor to provide information about the particle beam, the information comprising information based on an intensity of the particle beam;*

*wherein the control circuit is configured to control the timing based also on the information based on the intensity.*

*40. The synchrocyclotron of claim 38, further comprising:*

*a beam monitor to provide information about the particle beam, the information comprising information based on a spatial distribution of the particle beam;*

*wherein the control circuit is configured to control the timing based also on the information based on the spatial distribution.*

*41. The synchrocyclotron of claim 38, further comprising:*

*a beam monitor to provide information about the particle beam, the information comprising information based on a timing of the particle beam;*

*wherein the control circuit is configured to control the timing based also on the information based on a timing of the particle beam.*

*42. The synchrocyclotron of claim 38, wherein the at least part of the control circuit comprises a programmable processor.*

*43. The synchrocyclotron of claim 38, wherein the control circuit is configured to control the timing so as to cause the ion source to provide particles into the cavity over a number of cycles of the oscillating voltage.*

*44. The synchrocyclotron of claim 38, wherein the control circuit is configured to control the timing by turning the ion source on and off during a time interval in order to maintain a beam current.*

*45. The synchrocyclotron of claim 38, wherein the digital circuitry comprises a programmable processor.*

*46. The synchrocyclotron of claim 38, wherein voltage generator comprises a digital waveform generator that includes the control circuit.*

*47. A synchrocyclotron comprising:*

*a particle source to provide charged particles into a cavity having a magnetic field;*

*a voltage circuit to cause acceleration of the charged particles in the cavity via an oscillating electric field, the oscillating electric field to vary over a time of acceleration of the charged particles, the voltage circuit comprising a resonant circuit that comprises accelerating electrodes having a gap therebetween across the magnetic field and a driver to drive an oscillating voltage input to produce the oscillating electric field across the gap, the oscillating voltage input to vary over the time of acceleration of the charged particles; and*

*a control circuit to control the particle source to provide the charged particles for a limited time during each of multiple frequency sweeps of the oscillating electric field across the gap, the limited time synchronizing with an acceptance phase angle of the synchrocyclotron, at least part of the control circuit comprising digital circuitry, the digital circuitry comprising an interface that provides a data link to a computer.*

*48. The synchrocyclotron of claim 47, further comprising:*

*a beam monitor to provide information about a particle beam, the information comprising information based on an intensity of the particle beam;*

*wherein the control circuit is configured to control the particle source based also on the information based on the intensity.*

*49. The synchrocyclotron of claim 47, further comprising:*

*a beam monitor to provide information about a particle beam, the information comprising information based on a spatial distribution of the particle beam;*

*wherein the control circuit is configured to control the particle source based also on the information based on the spatial distribution.*

*50. The synchrocyclotron of claim 47, further comprising:*

*a beam monitor to provide information about a particle beam, the information comprising information based on a timing of the particle beam;*

*wherein the control circuit is configured to control the particle source based also on the information based on a timing of the particle beam.*

*51. The synchrocyclotron of claim 47, wherein the control circuit is configured to control the particle source based on variations of the oscillating electric field over time.*

*52. The synchrocyclotron of claim 47, wherein the control circuit is configured to control the particle source so as to cause the particle source to inject particles at a same point in each cycle of the oscillating electric field.*

*53. The synchrocyclotron of claim 47, wherein the control circuit is configured to control the particle source by turning the particle source on and off during a time interval in order to obtain a desired beam current.*

*54. The synchrocyclotron of claim 47, wherein the digital circuitry comprises a programmable processor.*

*55. The synchrocyclotron of claim 47, wherein voltage circuit and the control circuit are components of a digital waveform generator.*

*56. A particle accelerator comprising:*

*a cavity having a magnetic field;*

*an ion source to provide charged particles to the cavity;*

*a digital waveform generator to apply an oscillating voltage input to a resonant circuit that comprises accelerating electrodes having a gap therebetween across the magnetic field to drive an oscillating electric field across the gap and accelerate the charged particles within the cavity;*

*a beam monitor to measure a property of a particle beam comprised of the charged particles that have been accelerated;*

*wherein the digital waveform generator is configured to control the oscillating voltage input and the ion source to compensate for variations in the property of the particle beam; and*

*a programmable processor to control at least part of the digital waveform generator.*

*57. The particle accelerator of claim 56, wherein digital waveform generator is configured to vary an amplitude of the oscillating voltage input.*

*58. The particle accelerator of claim 56, wherein digital waveform generator is configured to vary a frequency of the oscillating voltage input.*

*59. The particle accelerator of claim 56, wherein digital waveform generator is configured to vary an amplitude and a frequency of oscillating voltage input.*

*60. The particle accelerator of claim 59, wherein digital waveform generator is configured to vary a frequency of the oscillating voltage input in order to maintain resonant conditions in the cavity.*

*61. The particle accelerator of claim 60, further comprising:*

*a variable reactive element in circuit with the oscillating voltage input and the accelerating electrodes.*

*62. The particle accelerator of claim 56, wherein the property comprises particle beam timing.*

*63. The particle accelerator of claim 56, wherein the property comprises spatial distribution of the particle beam.*

*64. A particle accelerator comprising*

*magnetic pole pieces that border a cavity;*

*a voltage generator to provide voltage to the cavity, the voltage comprising an oscillating voltage having a frequency that varies over a time of acceleration of charged particles;*

*an ion source that is controllable to output, over a period of time, pulses of charged particles that are accelerated in the cavity based on the oscillating voltage to form a particle beam;*

*control circuitry to regulate a current of the particle beam by controlling the ion source so as not to output at least some of the pulses during the period of time; and*

*a beam monitor to obtain at least one property of the particle beam;*

*wherein the control circuitry is configured to control a timing at which some of the pulses are output based on the oscillating voltage and an acceptance phase angle of the synchrocyclotron and to control, based on the at least one property, the ion source so as to change a number of the pulses that are not output during the period of time across different cycles of the voltage.*

*65. The particle accelerator of claim 64, wherein the at least one property comprises an intensity of the particle beam.*

*66. The particle accelerator of claim 64, wherein the at least one property comprises a timing associated with the particle beam.*

*67. The particle accelerator of claim 64, wherein the at least one property comprises a spatial distribution of the particle beam.*

*68. The particle accelerator of claim 64, further comprising:*

*a resonant circuit, comprising:*

*electrodes, disposed between magnetic pole pieces, having a gap therebetween across the magnetic field; and*

*a variable reactive element in circuit with the electrodes to vary a resonant frequency of the resonant circuit; and*

*wherein the voltage generator is configured to provide the voltage to the resonant circuit.*

*69. The particle accelerator of claim 68, wherein the voltage generator is digitally controllable to change an amplitude of the voltage.*

*70. The particle accelerator of claim 69, wherein the control circuit is configured to regulate the current based on the at least one property.*

*71. A particle accelerator configured to generate a particle beam, the particle accelerator comprising:*

*an ion source to provide charged particles into a resonant cavity;*

*electrodes in the resonant cavity, the electrodes being separated by a gap;*

*a voltage circuit to output a radio frequency (RF) voltage to at least one of the electrodes to produce an oscillating electric field across the gap, the RF voltage having a frequency that varies to accelerate the charged particles to form the particle beam; and*

*a feedback system to detect information about the frequency of the oscillating electric field, and to adjust a*

*timing of operation of the voltage circuit and the ion source based on the information so that the charged particles are provided to the resonant cavity in synchronism with a variation in the frequency of the RF voltage.*

*72. The particle accelerator of claim 71, wherein the feedback system comprises a voltage sensor configured to measure the oscillating electric field across the gap.*

*73. The particle accelerator of claim 71, wherein the feedback system comprises a digital control circuit configured to write data based on the information to memory, and to output data from memory to generate one or more waveforms upon which future outputs of the RF voltage are based.*

*74. The particle accelerator of claim 71, wherein the feedback system comprises:*

*a beam monitor to detect an intensity of the particle beam; and*

*a control circuit to control operation of the ion source based on the intensity detected.*

*75. The particle accelerator of claim 72, wherein the particle accelerator is a synchrocyclotron.*

*76. The particle accelerator of claim 71, wherein the timing of operation of the voltage circuit is varied to compensate for physical features of the particle accelerator.*

*77. The particle accelerator of claim 71, wherein the information comprises a peak resonant condition of the resonant cavity; and*

*wherein the feedback system is configured to control the timing of operation of the voltage circuit based on the peak resonant condition.*

*78. The particle accelerator of claim 77, wherein the timing of operation of the voltage circuit is controlled so that the RF voltage output matches a voltage of the resonant circuit corresponding to the peak resonant condition.*

*79. The particle accelerator of claim 71, wherein the feedback system comprises a programmable processor to control the timing of operation of at least one of the voltage circuit or the ion source based on the information.*

*80. A synchrocyclotron configured to output a particle beam, the synchrocyclotron comprising:*

*an ion source to provide charged particles to a resonant cavity for orbital acceleration to form the particle beam, the particle beam comprising multiple pulses;*

*a voltage source to provide a radio frequency (RF) voltage to the resonant cavity, the voltage source comprising an amplifier to change an amplitude of the RF voltage before providing the RF voltage to the resonant cavity;*

*a control system to control operation of the ion source in order to control intensities of individual pulses among the multiple pulses comprising the particle beam, the control system comprising a programmable processor to control the operation of the ion source based on a frequency of the RF voltage in the resonant cavity; and*

*a beam monitor to detect an intensity of the particle beam;*

*wherein the programmable processor is configured to control operation of the ion source based also on information about the detected intensity.*

*81. The synchrocyclotron of claim 80, wherein the operation of the ion source is controlled by turning the ion source on and off during a time interval.*

*82. The synchrocyclotron of claim 80, wherein the operation of the ion source is controlled by selectively providing charged particles from the ion source over a number of cycles of the frequency of the RF voltage.*

*83. The synchrocyclotron of claim 80, wherein the operation of the ion source is controlled to control a timing at which the charged particles are provided.*

*84. The synchrocyclotron of claim 80, wherein the operation of the ion source is controlled to inject the charged particles at a same time relative to each cycle among multiple cycles of the frequency of the RF voltage.*

*85. The synchrocyclotron of claim 80, wherein the operation of the ion source is controlled to inject the charged particles continuously over multiple cycles of the frequency of the RF voltage.*

*86. The synchrocyclotron of claim 80, further comprising:*

*magnetic pole pieces that border the resonant cavity in which the charged particles accelerate; and*

*a resonant circuit to control a resonant frequency within the resonant cavity;*

*wherein the voltage source is configured to provide the RF voltage to the resonant circuit, the RF voltage comprising an oscillating voltage that varies over a time of acceleration of the charged particles; and*

*wherein the voltage source comprises a digital waveform generator that includes the control system.*

*87. The synchrocyclotron of claim 80, wherein the operation of the ion source is controlled to inject the charged particles so as to compensate for detected variations of the particle beam.*

*88. The synchrocyclotron of claim 80, wherein the operation of the ion source is controlled to inject the charged particles periodically.*

*89. The synchrocyclotron of claim 80, wherein controlling intensities of individual pulses comprises controlling pulse widths of the individual pulses.*

*90. A synchrocyclotron comprising:*

*magnetic pole pieces that border a cavity in which charged particles accelerate;*

*a resonant circuit to control a resonant frequency within the cavity;*

*a voltage circuit to provide voltage to the resonant circuit, the voltage comprising an oscillating voltage that varies over a time of acceleration of the charged particles; and*

*a feedback system to detect parameters based on operation of the resonant circuit, and to control the voltage circuit based on a least one of the parameters so as to maintain a resonant condition in the resonant circuit;*

*wherein the parameters comprises an amplitude of the voltage and a frequency of the voltage, and wherein the voltage circuit comprises an amplifier to change the amplitude of the voltage to maintain beam focusing.*

*91. The synchrocyclotron of claim 90, wherein the feedback system comprises a control circuit to control a property of the voltage based on the at least one parameter.*

*92. The synchrocyclotron of claim 91, wherein the control circuit is configured to control the property of the voltage by writing data about the property to memory.*

*93. The synchrocyclotron of claim 90, further comprising:*

*an ion source to provide the charged particles to the cavity, the charged particles to accelerate in the cavity to form a particle beam;*

*an extraction channel to output the particle beam from the synchrocyclotron; and*

*a beam monitor to obtain information about a property of the particle beam;*

*wherein the feedback system is configured to receive the information about the property of the particle beam, and to use the information to control operation of the ion source.*

*94. The synchrocyclotron of claim 93, wherein the property of the particle beam is an intensity of the particle beam.*

*95. The synchrocyclotron of claim 93, wherein the property of the particle beam is particle beam timing or spatial distribution of the particle beam.*

*96. The synchrocyclotron of claim 90, wherein the resonant circuit comprises:*

*electrodes in the cavity, the electrodes having a gap therebetween across a magnetic field in the cavity produced by the magnetic pole pieces; and*

*a variable reactive element in circuit with the electrodes to vary the resonant frequency.*

*97. The synchrocyclotron of claim 96, further comprising:*

*an angular position sensor associated with the variable reactive element to output information about a position of the variable reactive element;*

*wherein at least one parameter comprises the information about the position.*

*98. The synchrocyclotron of claim 90, wherein at least part of the voltage circuit comprises digital circuitry.*

*99. The synchrocyclotron of claim 90, wherein at least one parameter comprises a timing parameter.*

*100. The synchrocyclotron of claim 93, wherein the feedback system is configured to use the information to generate, based on digital data, timing waveforms to control the voltage circuit.*

*101. The synchrocyclotron of claim 90, wherein the feedback system is adaptive.*

*102. A synchrocyclotron comprising:*

*a magnetic field generator;*

*a resonant circuit comprising a variable reactive element to vary a resonant frequency of the resonant circuit;*

*a source to provide a voltage input to the resonant circuit, the voltage input being an oscillating voltage that varies over a time of acceleration of charged particles;*

*a feedback system to vary at least one property of the voltage input to the resonant circuit; and*

*one or more sensors to detect that there has been a deviation from a peak resonant condition in the resonant circuit;*

*wherein the voltage input is controlled by the feedback system based on the deviation in order to maintain the peak resonant condition.*

*103. The synchrocyclotron of claim 102, wherein the at least one property comprises amplitude of the voltage input.*

*104. The synchrocyclotron of claim 102, wherein the at least one property comprises frequency of the voltage input.*

*105. The synchrocyclotron of claim 102, wherein the at least one property comprises amplitude of the voltage input and frequency of the voltage input.*

*106. The synchrocyclotron of claim 102, wherein the feedback system is configured to maintain the peak resonant condition.*

*107. The synchrocyclotron of claim 102, further comprising:*

*an ion source to provide the charged particles that form a particle beam following acceleration; and*

*a beam monitor to monitor the at least one property of the particle beam;*

*wherein the feedback system comprises control circuitry to receive the at least one property of the particle beam, and to control at least one of the voltage input or the ion source based on the at least one property to compensate for variations in the particle beam.*

*108. The synchrocyclotron of claim 107, wherein the at least one property comprises beam intensity, beam timing, or beam spatial distribution.*

*109. The synchrocyclotron of claim 107, wherein the voltage input is generated by a programmable digital waveform generator.*

* * * * *